US008631320B2

(12) United States Patent
Miyamoto

(10) Patent No.: US 8,631,320 B2
(45) Date of Patent: Jan. 14, 2014

(54) INFORMATION PROCESSING APPARATUS AND INFORMATION PROCESSING METHOD

(75) Inventor: Daijiro Miyamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1359 days.

(21) Appl. No.: 11/748,578

(22) Filed: May 15, 2007

(65) Prior Publication Data

US 2007/0268522 A1 Nov. 22, 2007

(30) Foreign Application Priority Data

May 16, 2006 (JP) ................... 2006-135998

(51) Int. Cl.
*G06F 17/21* (2006.01)
*G06F 17/24* (2006.01)

(52) U.S. Cl.
USPC ........... 715/243; 715/244; 715/250; 715/253; 715/255; 715/271

(58) Field of Classification Search
USPC ................. 715/243, 244, 250, 253, 255, 271; 283/67
See application file for complete search history.

(56) References Cited

U.S. PATENT DOCUMENTS

| | | | | |
|---|---|---|---|---|
| 5,765,874 A | * | 6/1998 | Chanenson et al. | 283/67 |
| 5,895,476 A | * | 4/1999 | Orr et al. | 715/202 |
| 6,038,567 A | * | 3/2000 | Young | 1/1 |
| 7,272,789 B2 | * | 9/2007 | O'Brien | 715/247 |
| 7,389,471 B2 | * | 6/2008 | Croney et al. | 715/209 |
| 7,500,194 B2 | * | 3/2009 | Collins et al. | 715/732 |
| 2005/0094205 A1 | * | 5/2005 | Lo et al. | 358/1.18 |

FOREIGN PATENT DOCUMENTS

| | | |
|---|---|---|
| JP | 2000-209433 | 7/2000 |
| JP | 2001-175654 | 6/2001 |

OTHER PUBLICATIONS

"Copy object to multiple pages", published: Feb. 25, 2004, Publisher: OpenOffice.org Forum, pp. 1-5.*
"Clicking Sheet Tab Deselects Grouped Sheets", published: Aug. 15, 2003, publisher: support.microsoft.com, pp. 1-2.*
Ed Bott and Woody Leonhard, "Special Edition Using Microsoft Office 2003", published: Sep. 15, 2003, pp. 597A, 597B, 598A, 633.*

* cited by examiner

*Primary Examiner* — Stephen Hong
*Assistant Examiner* — Wilson Tsui
(74) *Attorney, Agent, or Firm* — Cowan, Liebowitz & Latman, P.C.

(57) ABSTRACT

An information processing apparatus which performs variable printing processing to print by inserting different contents data into a variable area of document data for each predetermined unit. The apparatus sets variable area information for defining at least a position and size of a variable area laid out in document data and creates output data in which the variable area containing the contents data is laid out in each document page in accordance with the variable area information.

7 Claims, 49 Drawing Sheets

F I G. 3-2

| DOCUMENT DATA (1) | DOCUMENT DATA (2) | DOCUMENT DATA (3) | DOCUMENT DATA (4) | ~304 |

FIG. 4-1

| NO | PROPERTIES INFORMATION | | REMARKS |
|---|---|---|---|
| 1 | PRINT METHOD | SINGLE-SIDED, DOUBLE-SIDED, AND BOOKLET PRINT | |
| 2 | SHEET SIZE | MANUSCRIPT SIZE OR FIXED SIZE | • Z-FOLD DESIGNATION IN THE CASE OF DESIGNATION OF "A4+ A3", "B4+ B3", AND "LETTER+ LEDGER (11×17)"<br>• AUTOMATICALLY SELECT MANUSCRIPT SIZE OF FIRST CHAPTER / FIRST PAGE UPON DESIGNATION OF BOOKLET PRINT OR N-UP PRINT |
| 3 | SHEET ORIENTATION | PORTRAIT AND LANDSCAPE | • SELECTABLE ONLY FOR FIXED SIZE |
| 4 | BINDING MARGIN / BINDING DIRECTION | | • ALLOW SHIFT AND ENLARGEMENT / REDUCTION DESIGNATION |
| 5 | N-up PRINT DESIGNATION | NUMBER OF PAGES, LAYOUT ORDER, BOUNDARY LINE, LAYOUT POSITION, ETC. | • NINE PATTERNS OF LAYOUT POSITIONS<br>• ALLOW EQUAL-MAGNIFICATION PRINT DESIGNATION |
| 6 | ENLARGEMENT / REDUCTION | ON / OFF | AUTOMATIC ON DESIGNATION UPON SELECTION OF SHEET SIZE = FIXED SIZE OR N-up PRINT; ALLOW OFF DESIGNATION |
| 7 | WATERMARK | | • ALLOW INDEPENDENT DESIGNATION FOR RESPECTIVE LOGICAL PAGES AND RESPECTIVE PHYSICAL PAGES<br>• FOR ALL CHAPTERS / ALL PAGES |

FIG. 4-2

| 8 | HEADER / FOOTER | | • ALLOW INDEPENDENT DESIGNATION FOR RESPECTIVE LOGICAL PAGES AND RESPECTIVE PHYSICAL PAGES<br>• FOR ALL CHAPTERS / ALL PAGES |
|---|---|---|---|
| 9 | DISCHARGE METHOD | STAPLING / PUNCH HOLE | • ALLOW STAPLING OR PUNCH HOLE DESIGNATION ONLY FOR SINGLE-SIDED / DOUBLE-SIDED PRINT<br>• 1 OR 2 STAPLING POSITIONS AVAILABLE |
| 10 | BOOKBINDING DETAILS | OPENING DIRECTION, SADDLE STITCHING, ENLARGEMENT / REDUCTION DESIGNATION, BINDING MARGIN, SEPARATE BINDING DESIGNATION, ETC. | • ONLY IN BOOKLET PRINT |
| 11 | FRONT COVER / BACK COVER | | • PRINT DESIGNATION FOR FRONT COVER 1/2 AND BACK COVER 1/2<br>• PAPER FEED PORT (INCLUDING INSERTER) DESIGNATION |
| 12 | INDEX SHEET | | • ALLOW SETTING CHARACTER STRING PRINT ON INDEX PART AND ANNOTATION ON INDEX SHEET<br>• NOT ALLOW DESIGNATING BOOKLET PRINT |
| 13 | INTERLEAF | | • PAPER FEED PORT (INCLUDING INSERTER) DESIGNATION<br>• ALLOW PRINTING MANUSCRIPT DATA ON INSERTED SHEET<br>• NOT ALLOW DESIGNATING BOOKLET PRINT |
| 14 | CHAPTER DIVISION | "NONE", "CHANGE FOR PAGE", AND "CHANGE FOR SHEET" | • FIX "CHANGE FOR SHEET" UPON DESIGNATION OF INDEX SHEET OR INTERLEAF<br>• "CHANGE FOR SHEET" IN SINGLE-SIDED PRINT |

FIG. 5

| NO | PROPERTIES INFORMATION | | REMARKS |
|---|---|---|---|
| 1 | SHEET SIZE | MANUSCRIPT SIZE OR FIXED SIZE | • AUTOMATICALLY DESIGNATE "CHANGE FOR SHEET" UPON SELECTION OF FIXED SIZE<br>• ALLOW CHANGING ONLY DESIGNATED SHEET UPON SELECTION OF PLURAL SHEETS IN BOOK; ALLOW CHANGING SHEET SIZE IN DESIGNATION TO FIT TO BOOK |
| 2 | SHEET ORIENTATION | PORTRAIT OR LANDSCAPE | • ALLOW DESIGNATING ONLY IN THE CASE OF FIXED SIZE |
| 3 | N-up PRINT DESIGNATION | NUMBER OF PAGES, LAYOUT ORDER, BOUNDARY LINE, LAYOUT POSITION, ETC. | • NINE PATTERNS OF ALLOCATION POSITIONS<br>• ALLOW EQUAL-MAGNIFICATION PRINT DESIGNATION |
| 4 | ENLARGEMENT / REDUCTION | ON / OFF | • AUTOMATIC ON DESIGNATION UPON SELECTION OF SHEET SIZE = FIXED SIZE OR N-up PRINT; ALLOW OFF DESIGNATION |
| 5 | WATERMARK | DISPLAY / NON-DISPLAY | • DESIGNATE WHETHER OR NOT TO DISPLAY ALL WATERMARKS DESIGNATED IN BOOK |
| 6 | HEADER / FOOTER | DISPLAY / NON-DISPLAY | • DESIGNATE WHETHER OR NOT TO DISPLAY ALL HEADERS / FOOTERS DESIGNATED IN BOOK |
| 7 | DISCHARGE METHOD | STAPLING | • ALLOW DESIGNATING OFF IN THE CASE OF STAPLING DESIGNATION IN BOOK; DEFAULT = ON |

FIG. 6

| NO | PROPERTIES INFORMATION | | REMARKS |
|---|---|---|---|
| 1 | PAGE ROTATION DESIGNATION | | • ALLOW DESIGNATING 0, 90, 180, OR 270 |
| 2 | WATERMARK | DISPLAY / NON-DISPLAY | • DESIGNATE WHETHER OR NOT TO DISPLAY ALL WATERMARKS DESIGNATED IN BOOK |
| 3 | HEADER / FOOTER | DISPLAY / NON-DISPLAY | • DESIGNATE WHETHER OR NOT TO DISPLAY ALL HEADERS / FOOTERS DESIGNATED IN BOOK |
| 4 | ZOOM | 50%—200% | • DESIGNATE RELATIVE SCALE TO HAVE SIZE THAT FITS VIRTUAL LOGICAL PAGE REGION AS 100% |
| 5 | LAYOUT POSITION | | • DESIGNATE FIXED NINE PATTERNS AND ARBITRARY POSITION |
| 6 | ANNOTATION | | |
| 7 | VARIABLE ITEM | | |
| 8 | PAGE DIVISION | | |

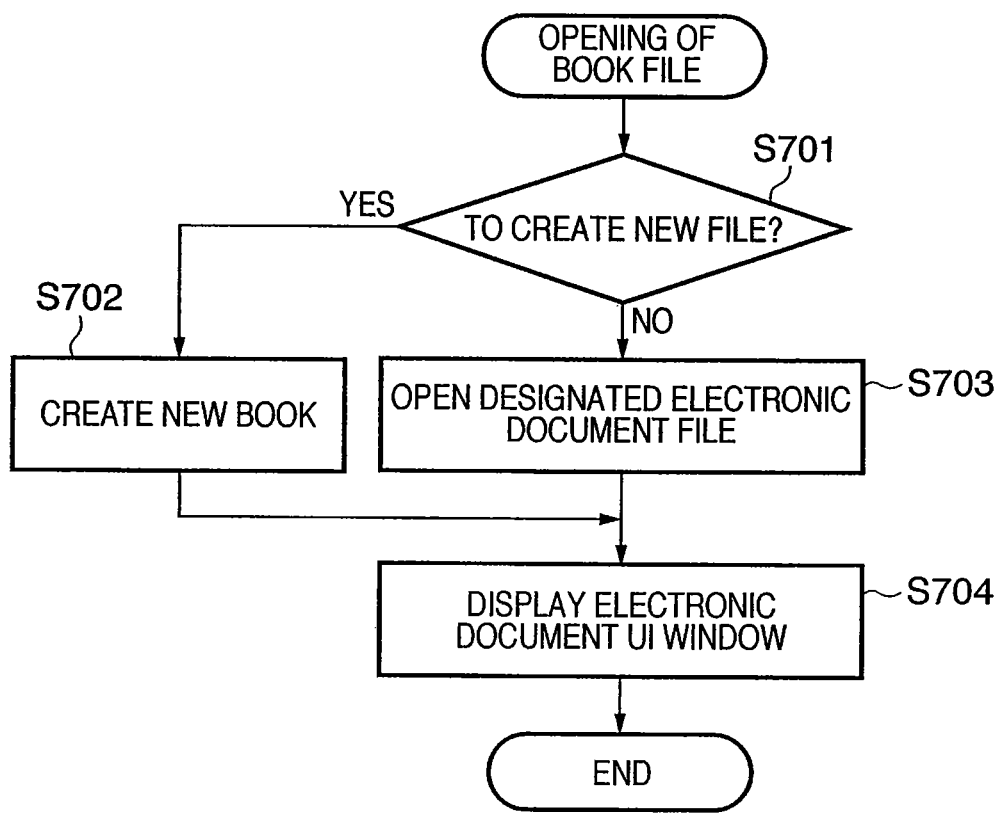

FIG. 14
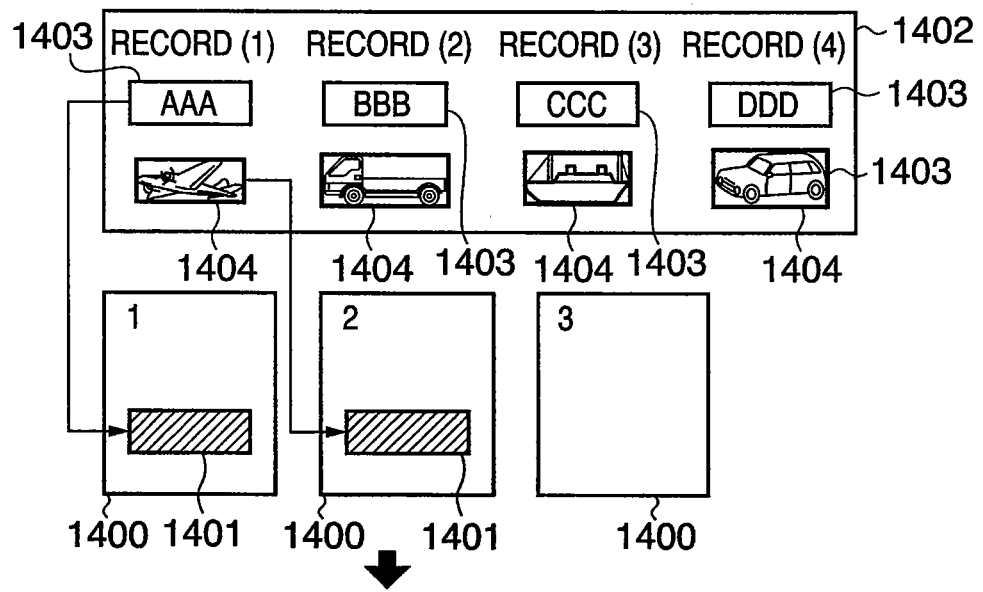
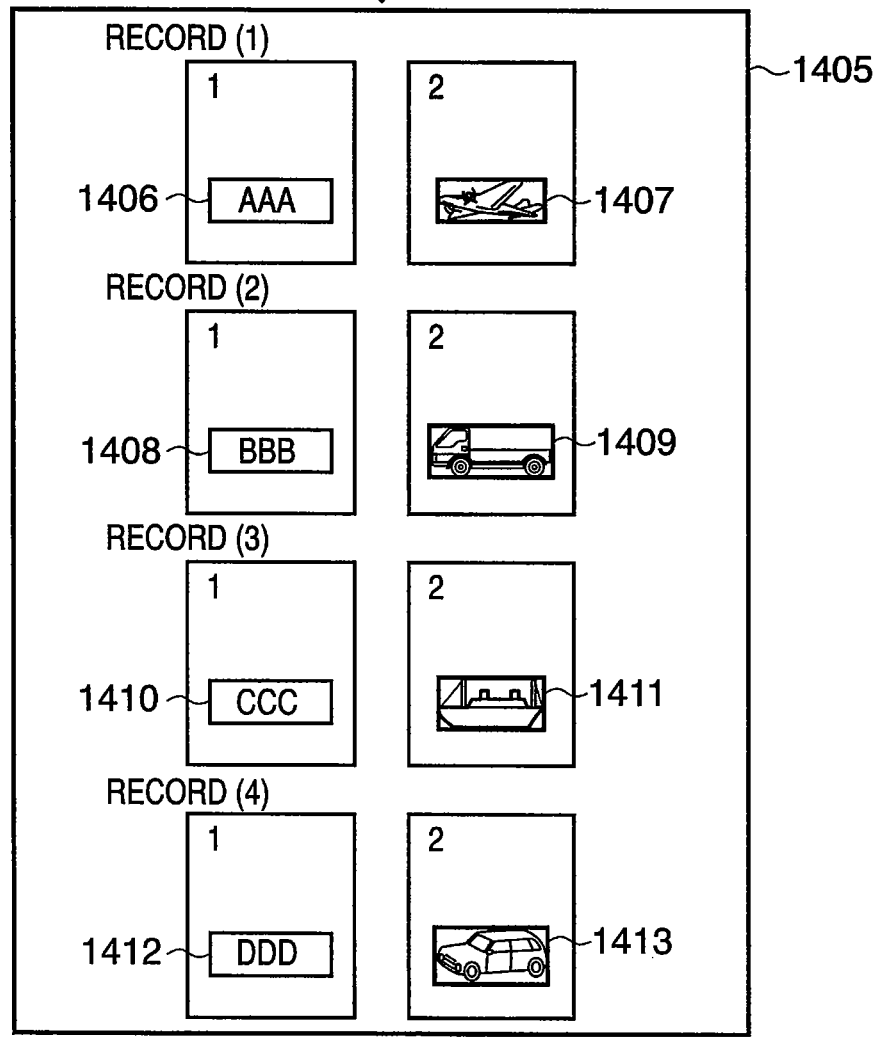

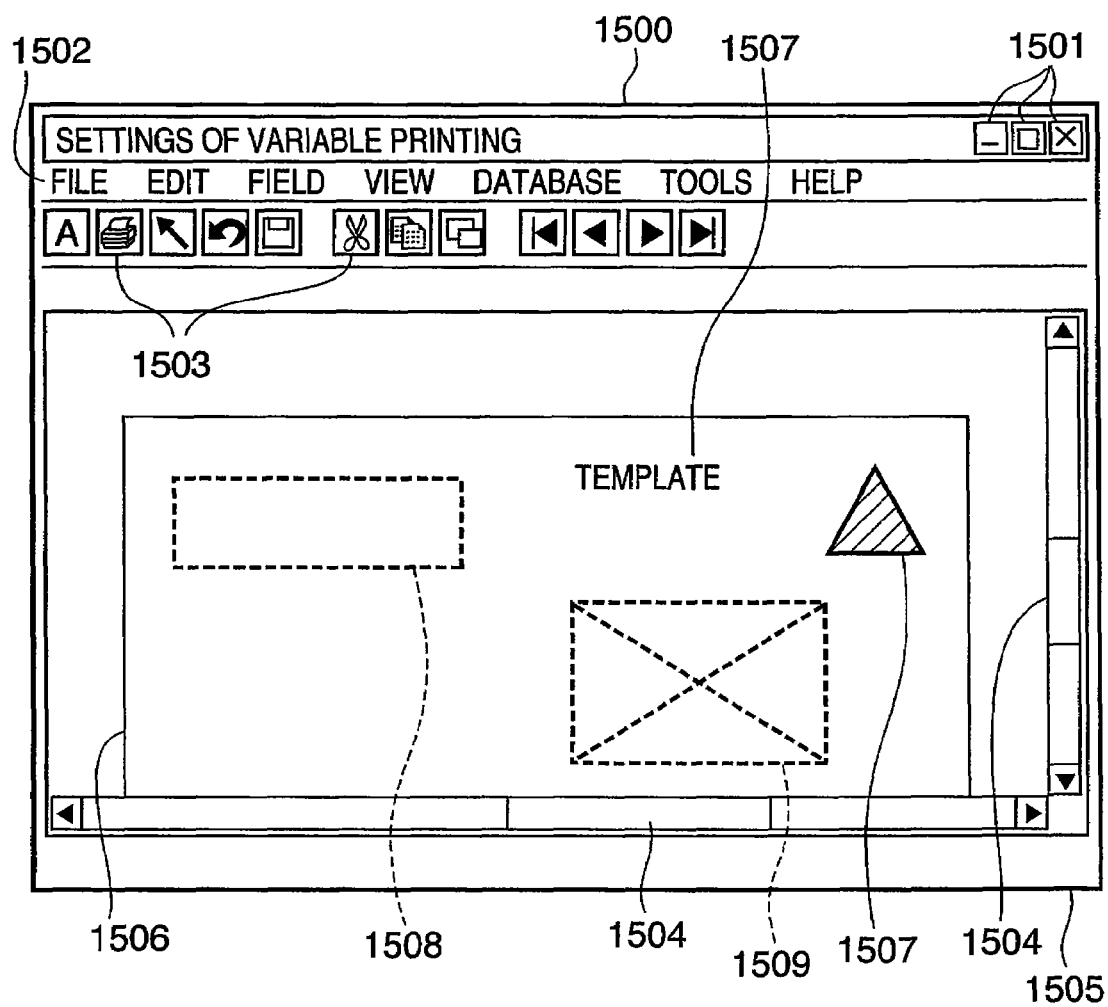
F I G. 15-1

F I G. 16-1
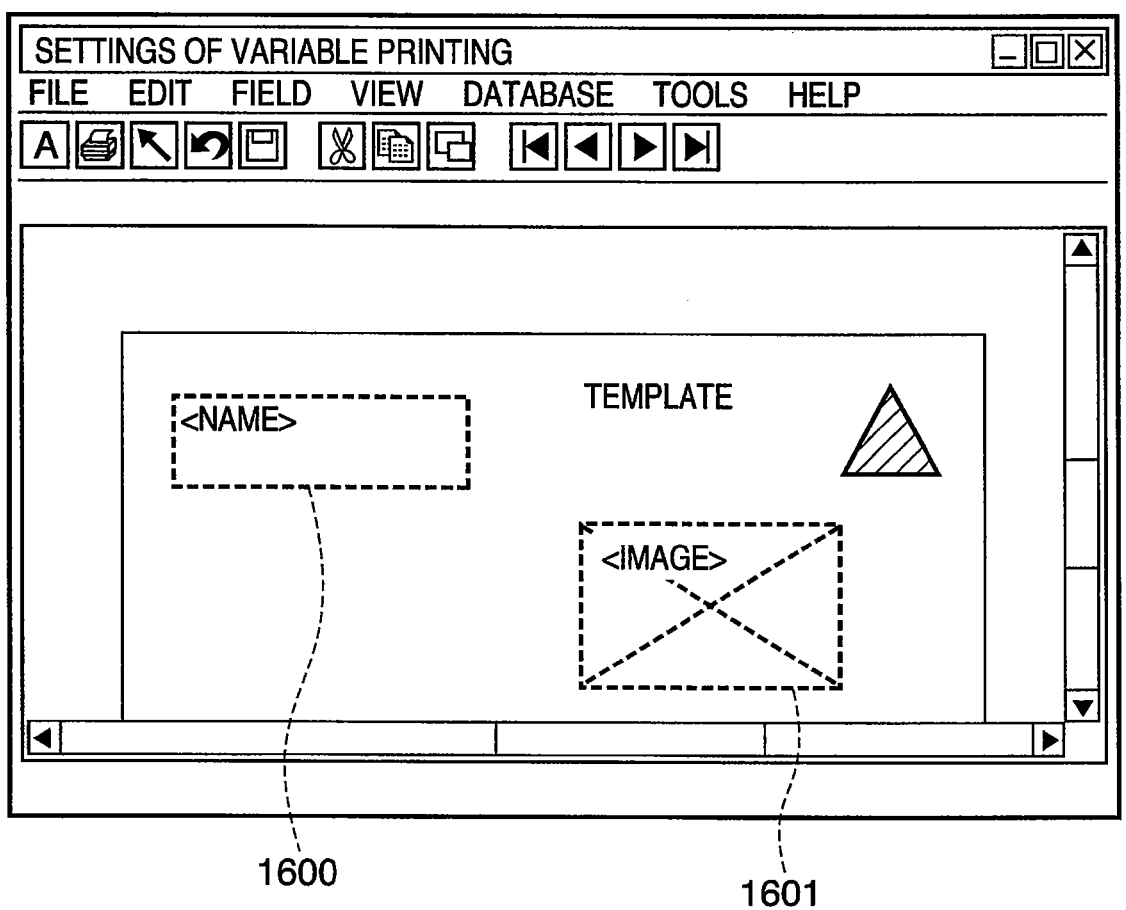

F I G. 17

VARIABLE FIELD
- FIELD ID
- COMMON FLAG
- COMMON ID
- VARIABLE DATA INFORMATION
- LAYOUT INFORMATION
- FONT INFORMATION (IMAGE INFORMATION)
- FRAME DECORATION INFORMATION

FIG. 19

COMMON ID INFORMATION
- COMMON ID
- COMMON FLAG
  - POSITION
  - SIZE
  - FONT
  - FRAME DECORATION
- COMMON VALUE
  - POSITION
  - SIZE
  - FONT
  - FRAME DECORATION

FIG. 20

| | | |
|---|---|---|
| 2001 | PROPERTIES OF COMMON VARIABLE FIELD | |
| 2001 — VARIABLE DATA : | <NAME> | |
| 2002 — FONT : | TYPE | MINCHO |
| | SIZE | 12 |
| 2003 — POSITION : | X | 50 mm |
| 2004 — ☑ SET LAYOUT POSITION BY POSITION RELATIVE TO DOCUMENT PAGE | | |
| 2005 — ☑ SYNCHRONIZE ALIGNMENT IN LINE WRITING DIRECTION [MIDDLE ALIGNMENT ▶] | | |
| | Y | 200 mm |
| ☑ SET LAYOUT POSITION BY POSITION RELATIVE TO DOCUMENT PAGE | | |
| ☑ SYNCHRONIZE ALIGNMENT IN CHARACTER WRITING DIRECTION [CENTER ALIGNMENT ▶] | | |
| 2006 — SIZE : | | 100 mm |
| | | 30 mm |

2007 — ☑ SHARE FONT
☑ SHARE POSITION
☑ SHARE SIZE

2008 — [ OK ]   2009 — [ CANCEL ]

F I G. 29
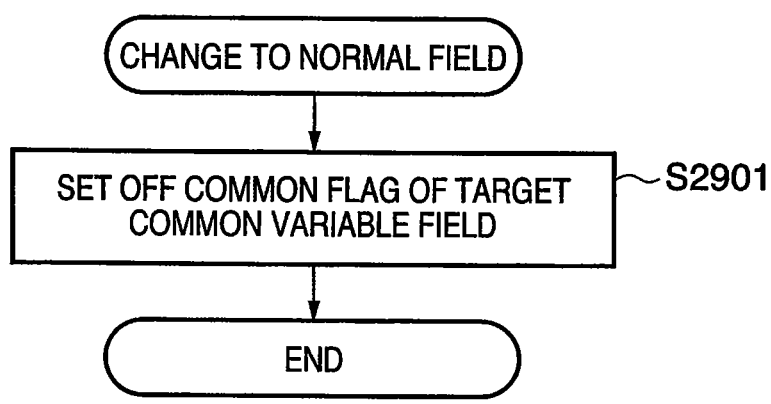

FIG. 36
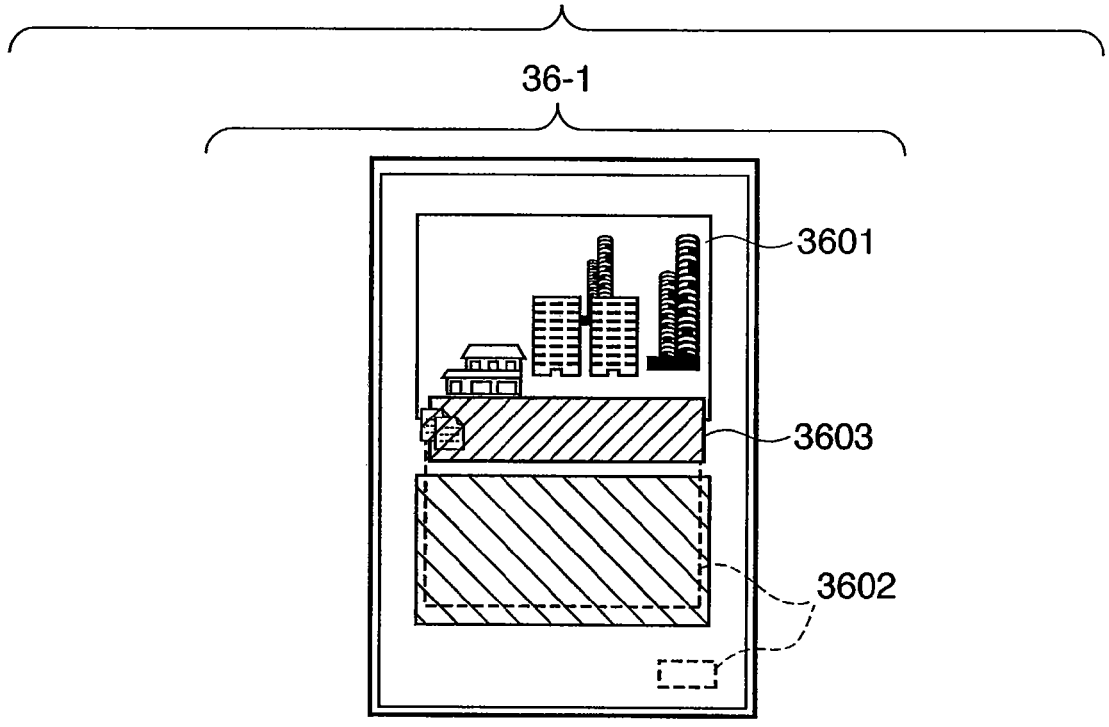
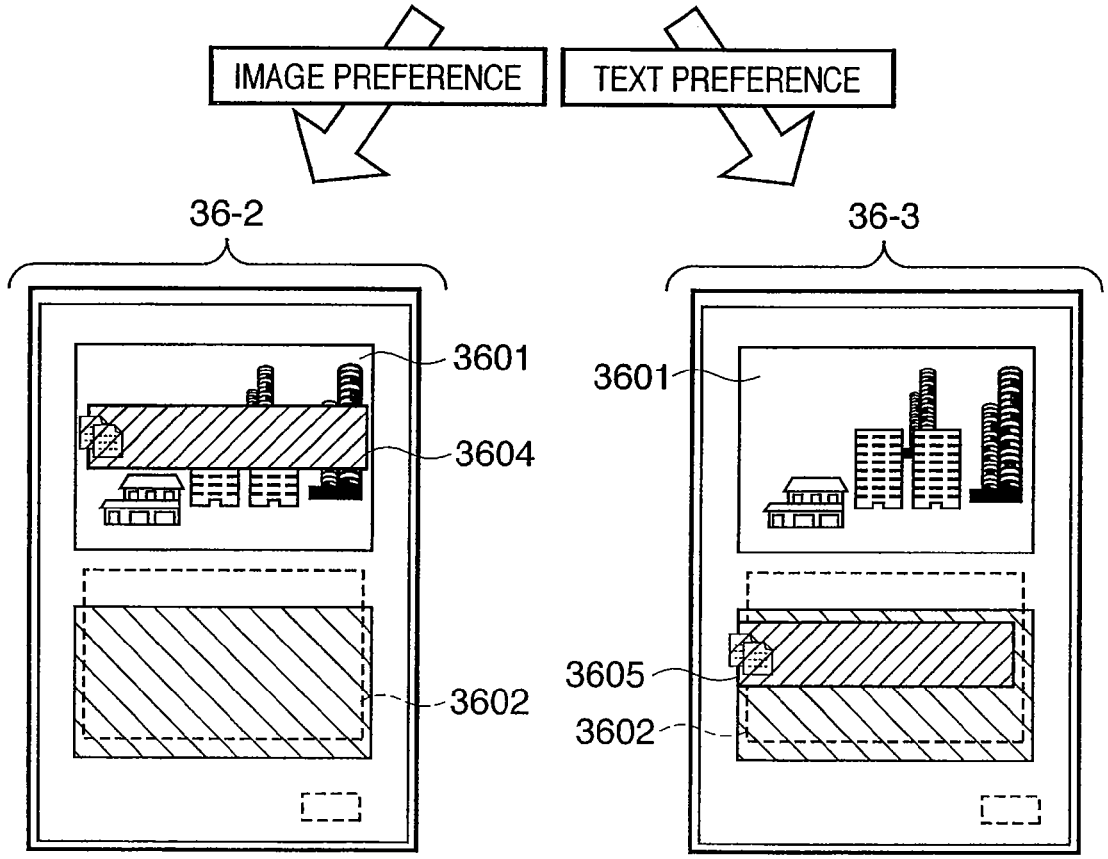

FIG. 37

3701 — MOVE COMMON VARIABLE FIELD TO OVERLAY IT ON IMAGE.
3702 — MOVE COMMON VARIABLE FIELD TO OVERLAY IT ON TEXT.
OVERLAY COMMON VARIABLE FIELD ON ALL IMAGES.
OVERLAY COMMON VARIABLE FIELD ON ALL TEXTS.

FIG. 39
39-1
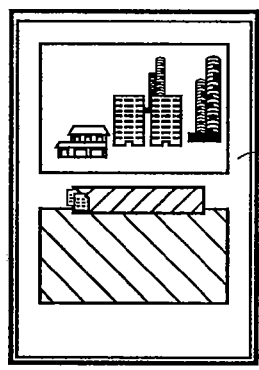 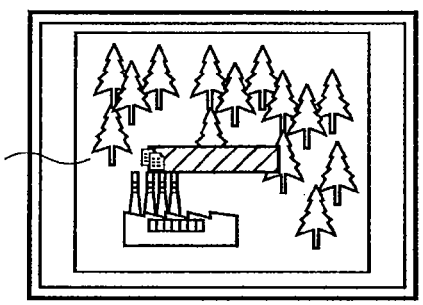
3901
⇩
39-2
3902
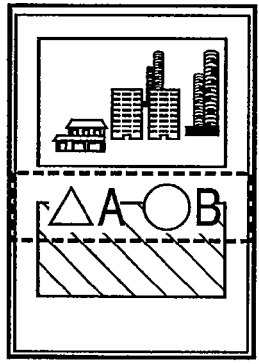 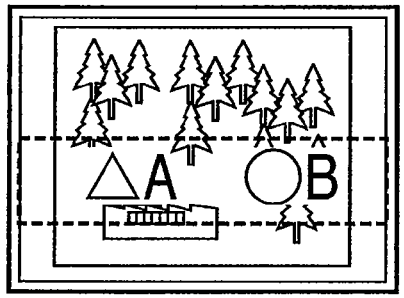
3903
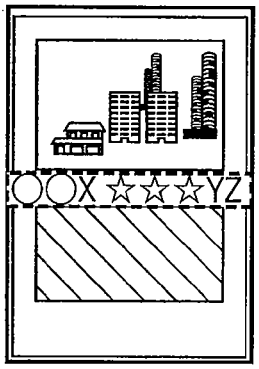 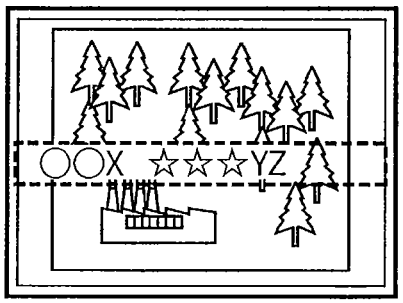

FIG. 41
1ST PAGE
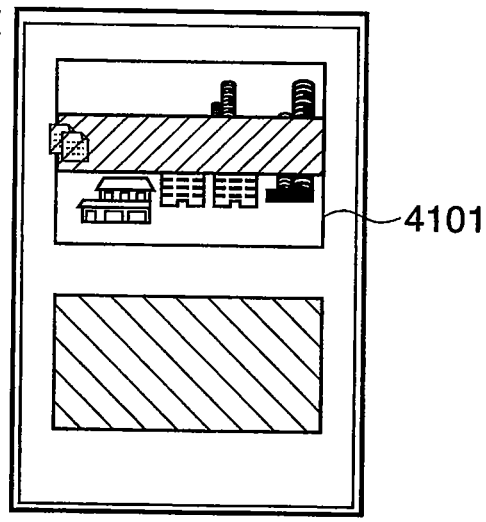
4101
2ND PAGE
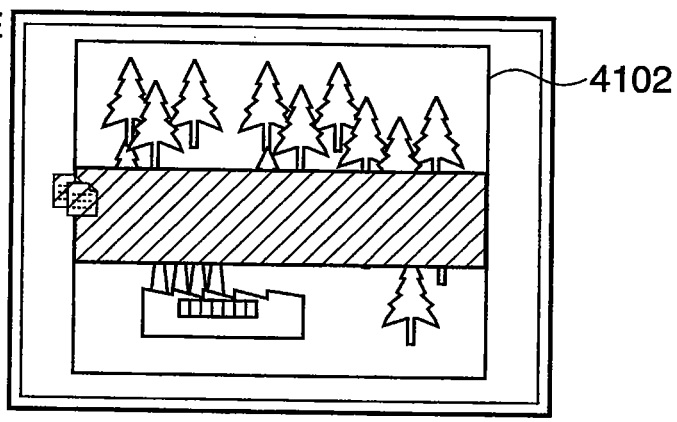
4102
3RD PAGE
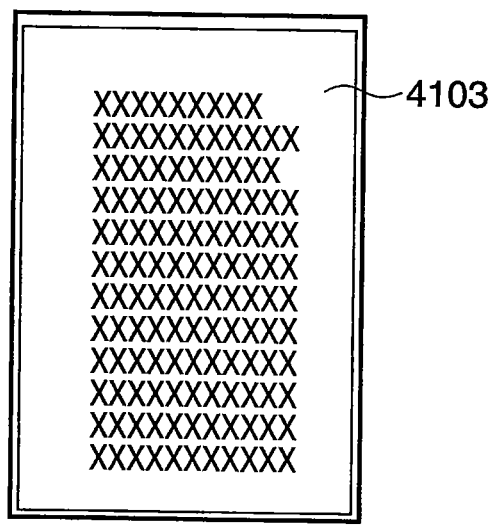
4103

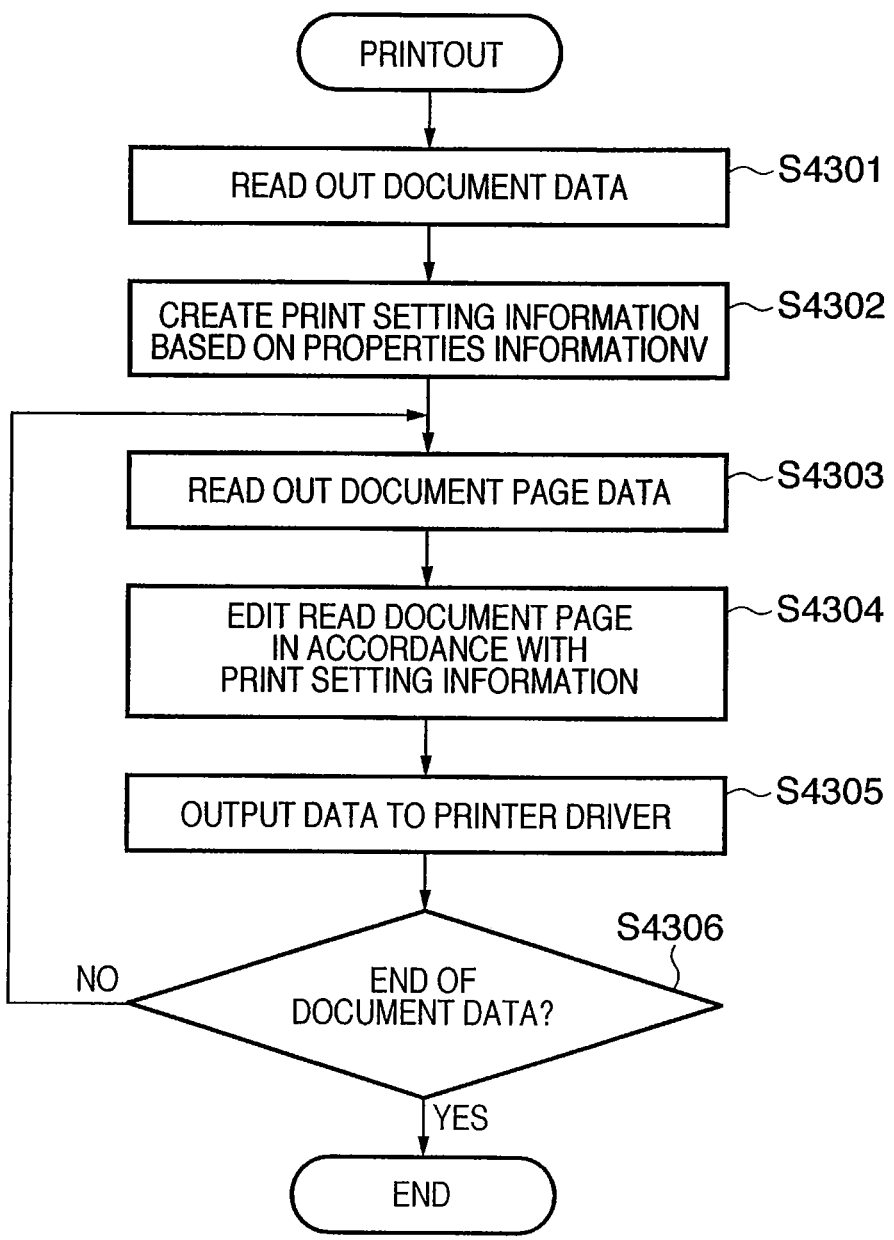

INFORMATION PROCESSING APPARATUS AND INFORMATION PROCESSING METHOD

BACKGROUND OF THE INVENTION

1. Field of the Invention

The present invention relates to an information processing apparatus, method and, more particularly, to an information processing apparatus such as a personal computer forming a system with a printer.

2. Description of the Related Art

Variable printing is common practice, which is to print by adding, to document data created by a PC or the like or image data scanned by a scanner, a variable field having data which changes for each print volume. Conventionally, when printing electronic data, a printer stamps a text such as "copy inhibit" on document data without impairing the visibility of the document. The stamp has an effect of suppressing copying of the document by adding data such as a text on document data.

The combination of the stamp and variable printing makes it possible to change data to be added by the stamp every print volume and print the data. When a printed document is copied, the source document can be specified from the contents of the stamp. For document data of a plurality of pages, the stamp is basically added to all the pages of the document data. When adding the same stamp to all pages, one basic variable field is set as a common field. By referring to the common field, data set in it can be added to all pages (see Japanese Patent Laid-Open No. 2001-175654).

Overlaying a stamp on document data impairs the visibility of document data. To prevent this, the user is prompted to designate the range where the stamp is added. Within this range, the stamp can be laid out not to overlap document as much as possible (see Japanese Patent Laid-Open No. 2000-209433).

The above-mentioned conventional techniques can add one stamp at the same position of each page when adding the stamp to all pages. However, these techniques cannot commonly use only some (e.g., the position and size of a field) of the properties of the variable field. For example, to modify the stamp data position or the like for only a specific page, the field where stamp data is defined must return from a common field to a variable field unique to each page. For this reason, some (e.g., the position and size of a field) of the properties of the field where the stamp is defined cannot be used commonly between all pages. For example, a document containing pages of different document sizes requires cumbersome work because the user must define the stamp using not a common field but a variable field of each page, and set the stamp position in accordance with each page size.

To obtain the copying suppression effect of the stamp, the stamp and document data must overlap each other. Especially when the user wants to protect specific data (image or the like), the stamp is laid out at the portion to be protected. For this purpose, the user must adjust stamp data positions or the like one by one, which is cumbersome work.

SUMMARY OF THE INVENTION

According to the first aspect of the present invention, there is provided an information processing apparatus which performs variable printing processing to print by inserting different contents data into a variable area of document data for each predetermined unit, comprising:

a setting unit configured to set variable area information for defining at least a position and size of a variable area laid out in document data; and a creation unit configured to create output data in which the variable area containing the contents data is laid out in each document page in accordance with the variable area information, wherein the setting unit sets the variable area as a variable area common to document pages of a document, and when variable area information of the common variable area changes, sets the changed variable area information for the common variable area laid out in each document page of the document.

According to the present invention, while some of the properties of a variable field are shared between all pages, the remaining properties can be set individually to increase the working efficiency.

Since the position of a variable field is automatically adjusted to overlay it on an image, text, or the like, the working efficiency of adding a stamp to only specific data increases.

Further features of the present invention will become apparent from the following description of exemplary embodiments (with reference to the attached drawings).

BRIEF DESCRIPTION OF THE DRAWINGS

FIGS. 3-1 and 3-2 are views showing an example of the structure of a book file;

FIGS. 4-1 and 4-2 are tables showing a list of book properties;

FIG. 5 is a table showing a list of chapter properties;

FIG. 6 is a table showing a list of page properties;

FIG. 7 is a flowchart showing an example of procedures to open a book file;

FIG. 14 is a view showing a printing example of variable printing;

FIGS. 15-1 and 15-2 are views of an example of the user interface of a variable printing editor and an example of the user interface of a dialog for setting a database, respectively;

FIGS. 16-1 and 16-2 are views showing setting examples of a variable field;

FIG. 17 is a view showing the data structure of the variable field;

FIG. 19 is a view showing the data structure of common ID information;

FIG. 20 is a view of an example of a user interface for setting each property value of a common variable field;

FIG. 29 is a flowchart showing processing to change a common variable field into a normal field;

FIGS. 35-1 and 35-2 are flowcharts showing processing to automatically lay out again a common variable field located outside a document page;

FIG. 36 is a view showing an operation to automatically lay out a common variable field in accordance with the contents of a document page;

FIG. 37 is a view showing a user interface to automatically lay out a common variable field in accordance with the contents of a document page;

FIGS. 38-1 and 38-2 are flowcharts of processing to move a common variable field so as to overlay it on an image;

FIG. 39 is a view showing a state in which a common variable field is laid out in accordance with the document page size;

FIG. 41 is a view showing a state in which a common variable field (text variable field) is overlaid on only specific document contents (image);

FIG. 43 is a flowchart showing the procedures of processing to output document data.

DESCRIPTION OF THE EMBODIMENTS

A preferred embodiment of the present invention will be described in detail below with reference to the accompanying drawings.

<Overview of System>

An overview of a document processing system according to the present invention will be described below with reference to FIGS. 1 to 12. The document processing system comprises an electronic document writer which converts a data file (e.g., document data, image data and/or diagram data) created by a general application into an electronic document file, and a bookbinding application which provides a function of editing the electronic document file. The bookbinding application can create and edit a combination of created data as a document, and can efficiently edit the document with high operability.

<System Configuration and Operation>

Figure 1:
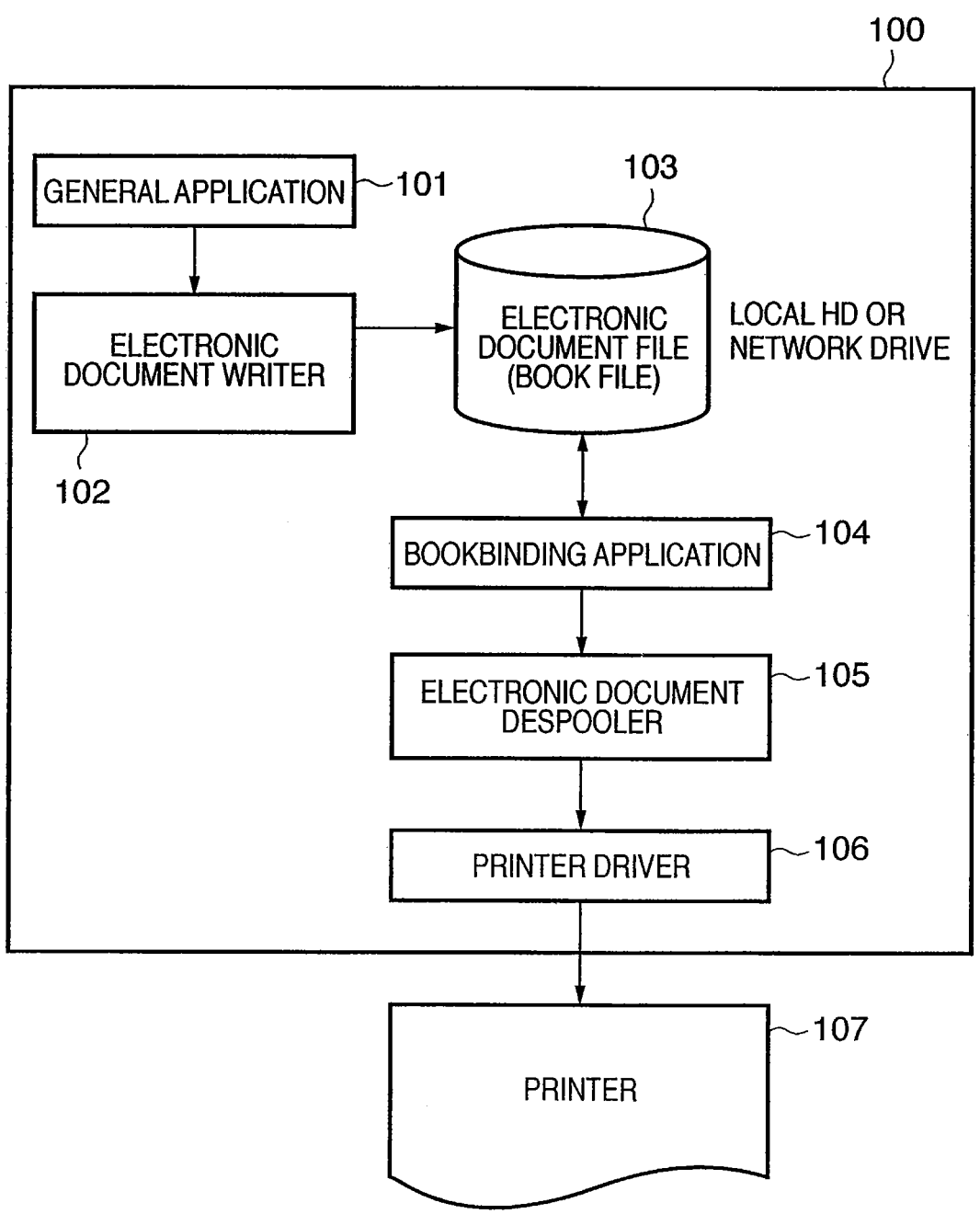
FIG. 1 is a block diagram showing an example of the software configuration of a standalone document processing system according to an embodiment.

FIG. 1 is a block diagram showing the software configuration of the document processing system according to the embodiment of the present invention. The document processing system is implemented by a digital computer 100 (to be also referred to as a host computer hereinafter) as a preferred embodiment of an information processing apparatus of the present invention. A general application 101 shown in FIG. 1 is an application program which provides functions such as wordprocessing, spreadsheet, photo retouch, draw or paint, presentation, text edit, and the like. The application uses a predetermined interface (generally called a GDI) provided by the OS (Operating System) when printing application data such as created document data, image data, and the like. That is, the application 101 sends output commands (called GDI functions) of a predetermined format depending on the OS to the output module of the OS that provides the above-mentioned interface so as to print created data. Upon receiving the output commands, the output module converts them into a format processible by an output device such as a printer, and outputs the converted commands (called DDI). Since the format processible by the output device changes depending on the types, vendors, models, and the like of devices, a device driver is provided for each device. The OS generates print data by converting the commands using the device driver, and bundles it with a JL (Job Language), thus generating a print job. When Microsoft Windows® is used as the OS, a module called GDI (Graphic Device Interface) corresponds to the aforementioned output module.

An electronic document writer 102 is a software module which is an improvement of the above-mentioned device driver, and is provided to implement the document processing system. However, the electronic document writer 102 does not intend any specific output device, and converts the output commands into a format processible by a bookbinding application 104 and printer driver 106, details of which will be described later. The format after conversion by the electronic document writer 102 (to be referred to as an electronic document format hereinafter) is not particularly limited as long as it can express a document for each page using a detailed form. Of practical standard formats, for example, a PDF format of Adobe Systems, an SVG format, and the like can be adopted as the electronic document format.

When the general application 101 uses the electronic document writer 102, it designates the electronic document writer 102 as a device driver used in output, and then causes it to print. However, an electronic document file itself generated by the electronic document writer 102 does not have a perfect format as an electronic document file. For this reason, the bookbinding application 104 designates the electronic document writer 102 as a device driver, and application data is converted into an electronic document file under the control of the bookbinding application 104. The bookbinding application 104 completes a new, imperfect electronic document file generated by the electronic document writer 102 as an electronic document file having a format to be described later. In the following description, when this difference must be clearly identified, a file created by the electronic document writer 102 will be referred to as an "electronic document file", and an electronic document file to which a structure is given by the bookbinding application 104 will be referred to as a "book file". Also, when these files need not be especially distinguished from each other, all of a document file, electronic document file, and book file generated by the application will be referred to as a document file (or document data).

In this way, the general application 101 prints its data by designating the electronic document writer 102 as a device driver. As a result, the application data is converted into an electronic document format which includes pages (to be referred to as logical pages or document pages hereinafter) defined by the application 101 as a unit. The application data in this electronic document format is stored as an electronic document file 103 in a storage medium such as a hard disk. The hard disk may be a local drive of a computer which implements the document processing system of the embodiment, or may be a drive provided on a network when the system is connected to the network.

The bookbinding application 104 provides the user with functions of loading the electronic document file (or book file) 103, and editing the loaded file. The bookbinding application 104 provides not a function of editing the contents of each page, but a function of editing the structure of a chapter and book formed from pages as minimum units (to be described later).

When printing the book file 103 edited by the bookbinding application 104, the bookbinding application 104 launches an electronic document despooler 105. The electronic document despooler 105 is a program module installed in the computer together with the bookbinding application. The electronic document despooler 105 is a module used to output rendering data to the printer driver when printing a document (book file) used by the bookbinding application. The electronic document despooler 105 reads out a designated book file from the hard disk, generates output commands suited to the output module of the OS so as to print respective pages in a format described in the book file, and outputs the generated commands to the output module (not shown). In this case, the electronic document despooler 105 designates, as a device driver, the printer driver 106 of a printer 107 used as the output device. The output module converts the received output commands into device commands, and outputs the converted commands to the printer driver 106 of the designated printer 107. The printer driver 106 converts the received commands into commands in a page description language or the like interpretable by the printer 107. The printer driver 106 transmits the converted commands to the printer 107 via a system spooler (not shown), and the printer 107 prints images according to the commands. The despooler 105 is a means for executing a step of generating data (output data) input to the printer driver 106.

Figure 2:
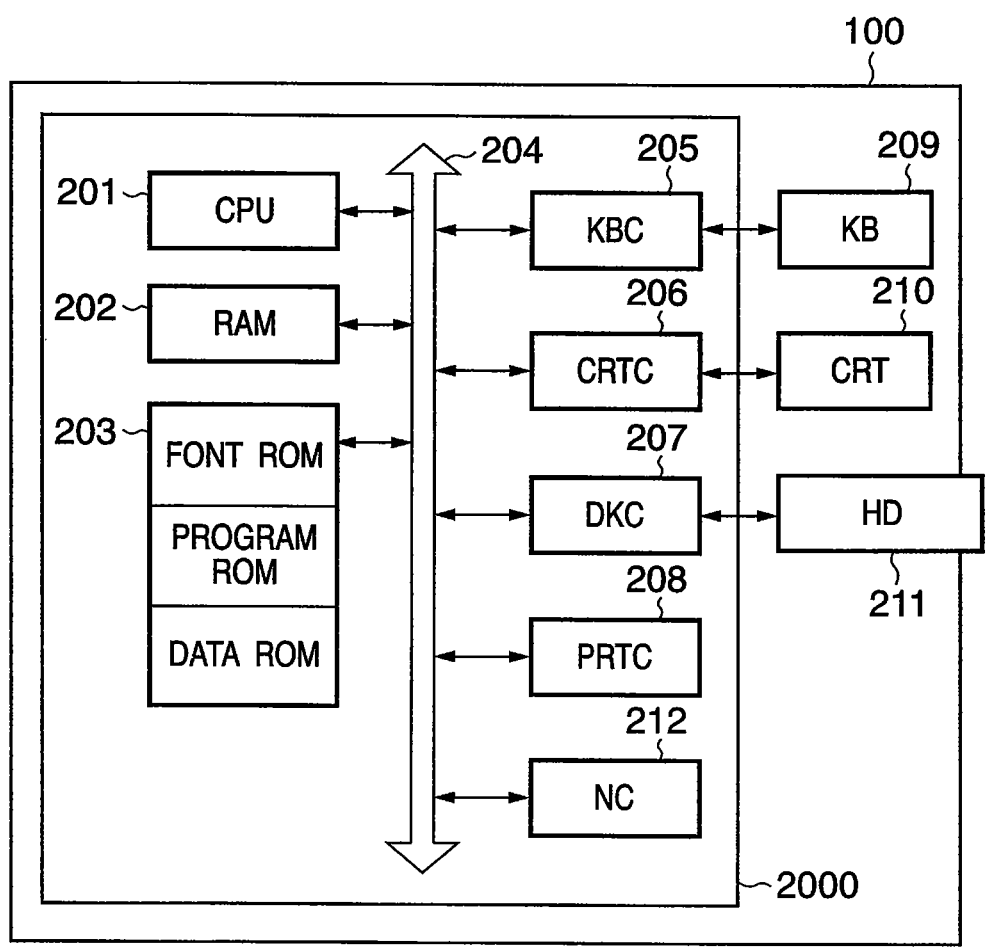
FIG. 2 is a block diagram showing an example of a hardware configuration which implements the document processing system according to the embodiment.

FIG. 2 is a block diagram showing the hardware of the computer 100. In FIG. 2, a CPU 201 implements the software configuration in FIG. 1 or the sequences of flowcharts (to be described later) by executing programs such as an OS, general application, and bookbinding application stored in the program ROM of a ROM 203 or loaded from a hard disk 211 to a RAM 202. The RAM 202 functions as a main memory, work area, and the like for the CPU 201. A keyboard controller (KBC) 205 controls key inputs from a keyboard 209 and a pointing device (not shown). A CRT controller (CRTC) 206 controls display on a CRT display 210. A disk controller (DKC) 207 controls access to the hard disk (HD) 211, a flexible disk (FD), and the like. The hard disk 211 stores a boot program, various applications, font data, user files, edit files (to be described later), and the like. A PRTC 208 controls exchange of signals with the connected printer 107. An NC 21 connects to a network and executes communication control processing with another device connected to the network.

Flowcharts described in the embodiment are implemented by executing programs describing the sequences of the flowcharts by the CPU 201.

<Format of Electronic Document Data>

Prior to a detailed description of the bookbinding application 104, the data format of a book file will be described. The book file has a three-layered structure which simulates a book of paper media. An upper layer is called "book", simulates one book, and defines properties associated with the whole document. An intermediate layer below the upper layer corresponds to a chapter in a book, and is also called "chapter". As for each chapter, properties for the chapter can be defined. A lower layer is "page", and corresponds to each page defined by the application program. For each page, properties for the page can be defined. One book can include a plurality of chapters, each of which can include a plurality of pages.

Figures 1, 3:
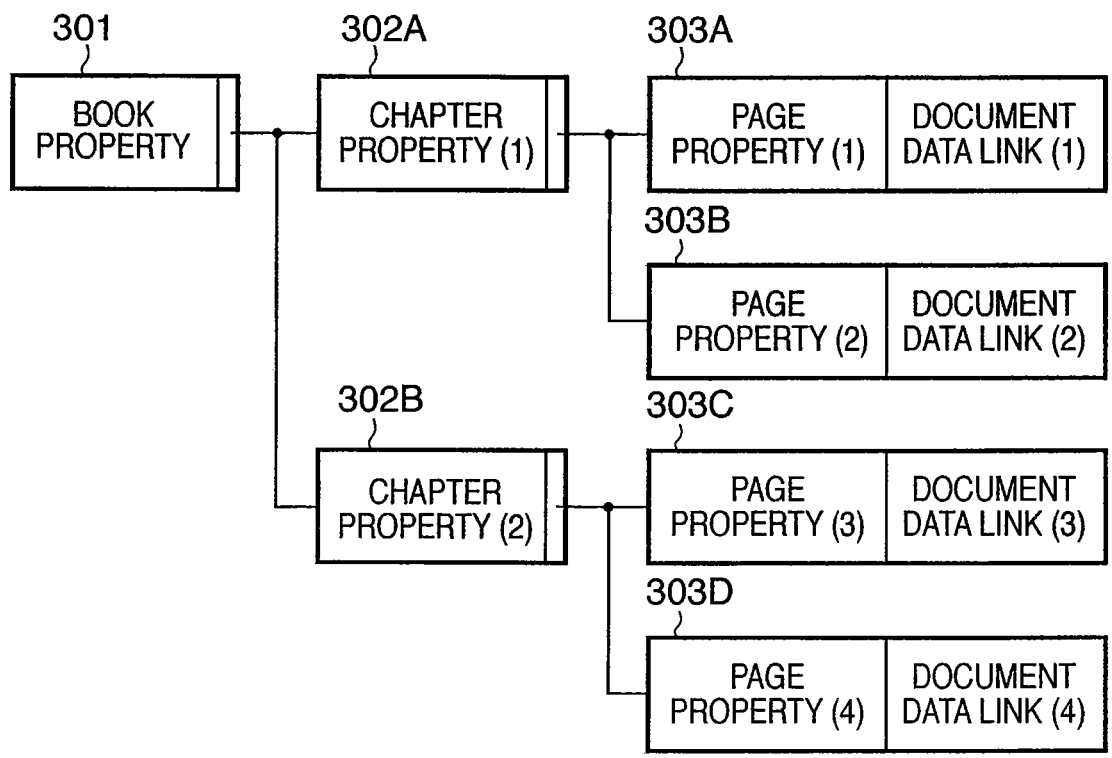

FIG. 3-1 is a view schematically showing an example of the format of the book file. As shown in FIG. 3-1, a book, chapters, and pages in the book file of this example are respectively indicated by corresponding nodes. One book file includes one book. The book and chapters include defined property values and links to lower layers as their entities because they are concepts for defining the structure as a book. Pages have, as entities, data for respective pages, which are output by the application program. For this purpose, respective pages include entities of document pages (document page data) and links to respective document page data, in addition to the property values of the pages.

Note that a print page to be output onto a paper medium or the like sometimes includes a plurality of document pages. This structure is not indicated by links but is indicated by properties in the book, chapter, and page layers.

In FIG. 3-1, a book 301 defines a book property, and is linked to two chapters 302A and 302B. These links exhibit that the book 301 contains the chapters 302A and 302B. The chapter 302A is linked to pages 303A and 303B, which represents that the chapter 302A contains these pages. The pages 303A and 303B define property values, and contain links to document page data (1) and (2) serving as entities. These links indicate data (1) and (2) of document page data 304 as shown in FIG. 3-2, and exhibit that the entities of the pages 303A and 303B are document page data (1) and (2).

FIGS. 4-1 and 4-2 show lists of book properties. As for an item which can be defined repetitively on upper and lower layers, the property value of the lower layer is preferentially adopted. As for an item contained in only book properties, a value defined by a book property is effective throughout the book. As for an item which overlaps that on the lower layer, the property value means a value specified when the lower layer does not define the value. Note that each item shown in FIGS. 4-1 and 4-2 does not correspond to one concrete item, but may include a plurality of relevant items.

FIG. 5 shows a list of chapter properties, and FIG. 6 shows a list of page properties. The relationship between chapter properties and page properties is the same as that between book properties and properties of lower layers. As is apparent from FIGS. 4-1 to 6, items unique to the book properties are six items: print method, details of bookbinding, front cover/back cover, index sheet, interleaf, and chapter division. These items are defined throughout the book. As the print method property, three values, i.e., single-sided printing, double-sided printing, and booklet printing can be designated. Booklet printing is to print in a style capable of bundling a separately designated number of sheets, folding the bundle in half, and binding the bundle. As the detailed booklet property, the opening direction and the number of sheets to be bundled can be designated when booklet printing is designated.

The front cover/back cover property includes designation of addition of sheets used as a front cover and back cover, and designation of print contents on the added sheets when printing an electronic document file bound as a book. The index sheet property includes designation of insertion of tabbed index sheets prepared separately in a printing device as divisions of chapters, and designation of print contents on the index (tab) parts. This property becomes valid when the printing device comprises an inserter having an insert function of inserting sheets prepared independently of print sheets to desired positions, or when a plurality of paper cassettes are available. The same applies to an interleaf property.

The interleaf property includes designation of insertion of sheets to be supplied from an inserter or paper cassette as divisions of chapters, and designation of a paper source when inserting interleaves.

The chapter division property includes designation of use of a new sheet, use of a new print page, do-nothing, or the like at the divisions of chapters. In single-sided printing, use of a new sheet and that of a new print page have the same meaning. In double-sided printing, if "use of new sheet" is designated, successive chapters are never printed on one sheet. However, if "use of new print page" is designated, successive chapters may be printed on the obverse and reverse sides of one sheet.

As for chapter properties, there are no items unique to chapters, and all items overlap those of the book properties. Therefore, if definitions in the chapter properties are different from those in the book properties, values defined in the chapter properties are used preferentially. Items common to only the book properties and chapter properties are five items: a sheet size, sheet orientation, N-up print designation, enlargement/reduction, and discharge method. Of these items, the N-up print designation property is an item used to designate the number of document pages included per print page. As layouts that can be designated, 1×1, 1×2, 2×2, 3×3, 4×4,, and the like are available. The discharge method property is an item used to designate whether or not to apply stapling processing to discharged sheets. The validity of this property depends on whether or not a printing device used has a stapling function.

Items unique to the page properties include the page rotation property, zoom, layout position, annotation, page division, and the like. The page rotation property is an item used to designate a rotation angle upon laying out document pages on a print page. The zoom property is an item used to designate a scale of document pages. The scale is designated to have the size of a virtual logical page region as 100%. The virtual logical page region is a region occupied by one document page when document pages are laid out in accordance with N-up designation and the like. For example, in the case of 1×1,, the virtual logical page region corresponds to one print page. Also, in the case of 1×2,, the virtual logical page region corresponds to a region obtained by reducing each side of one print page to about 70%.

As properties common to the book, chapter, and page, a watermark property and header/footer property are available. A watermark is information of an image, character string, or the like, which is designated independently and is printed to be superposed on data created by the application. A header and footer are information printed on a top margin and bottom margin of each page. Note that as the header and footer, items which are information of page numbers, dates and times, and the like, and can be designated as variables are prepared. Note that the contents which can be designated in the watermark property and header/footer property are common in the chapter and page properties but are different in the book properties from those in the chapter and page properties. The book properties can designate the contents of a watermark and header/footer. Also, how to print a watermark and header/footer throughout the book can be designated. On the other hand, the chapter and page properties can designate whether or not to print the watermark and header/footer designated in the book properties in a chapter and page of interest.

<Generation Sequence of Book File>

The book file has the aforementioned structure and contents. The sequence to create a book file by the bookbinding application 104 and electronic document writer 102 will be described below. The book file creation sequence is implemented as part of a book file edit operation by the bookbinding application 104.

Figure 11:
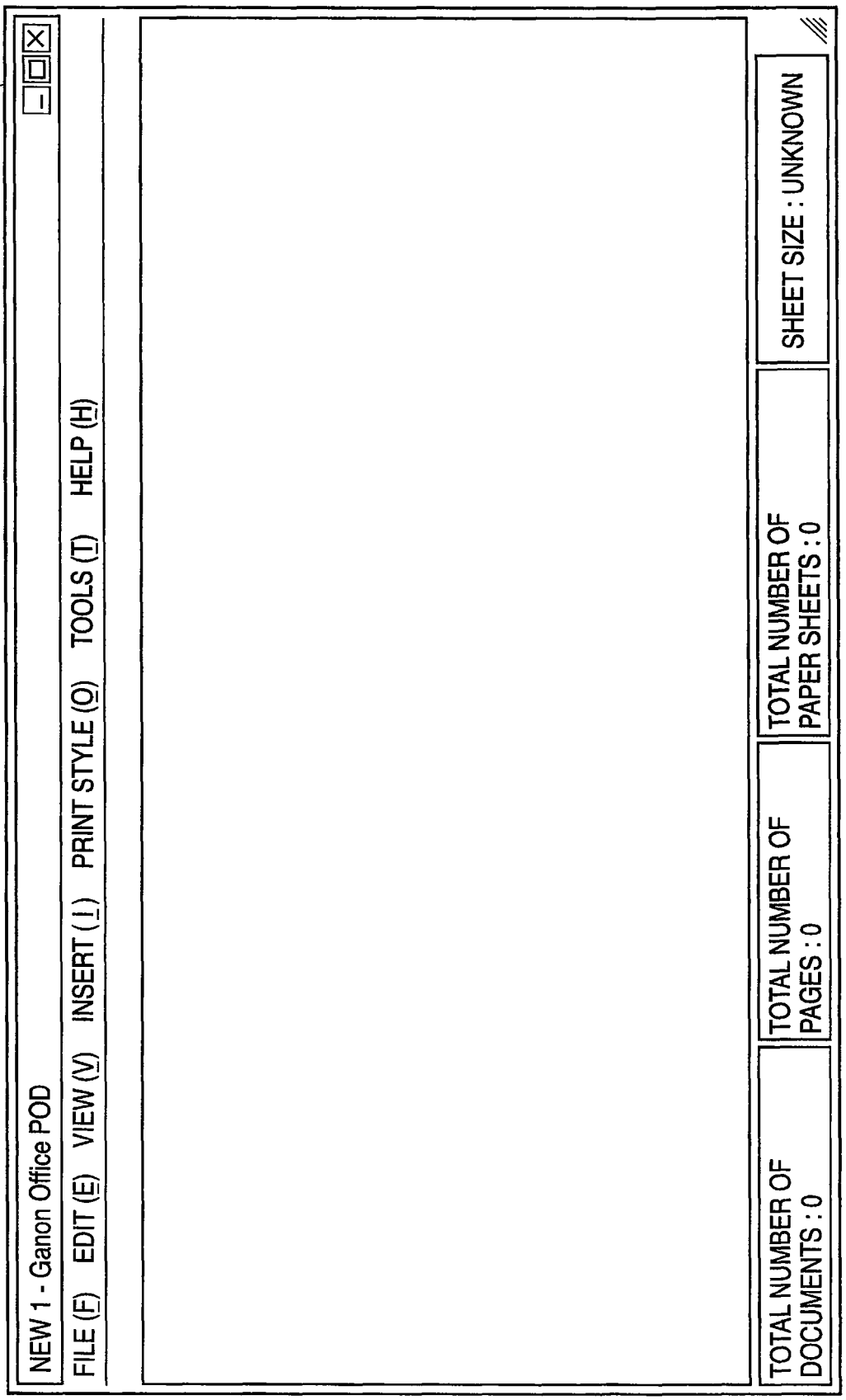
FIG. 11 is a view of a UI window upon newly creating a book file.

FIG. 7 shows a sequence when the bookbinding application 104 opens a book file. The bookbinding application 104 checks whether a book file to be opened is a new file to be created or an existing file (step S701). If the book file to be opened is a new book file to be created, the bookbinding application 104 crates a new book file including no chapter (step S702). In the example of FIGS. 3-1 and 3-2, the new book file to be created has only the book node 301, and is a node of a book which has no links to nodes of chapters. As book properties, a set of properties prepared in advance for a new file to be created are applied. Then, the bookbinding application 104 displays a user interface (UI) window used to edit the new book file (step S704). FIG. 11 shows an example of a UI window used upon creating a new book file. In this case, since the book file does not have any practical contents, nothing is displayed on a UI window 1100.

Figure 10:
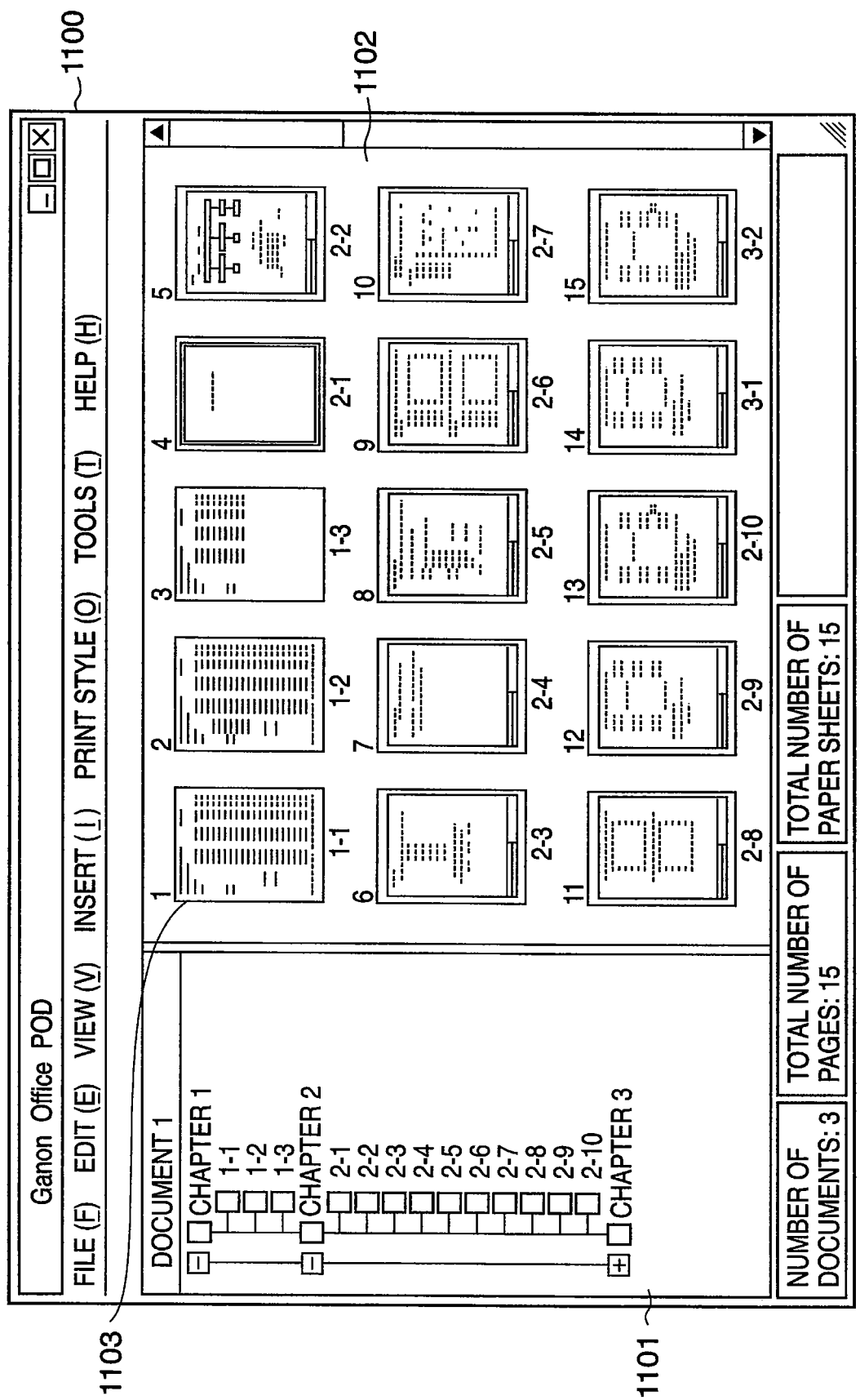
FIG. 10 is a view of the UI window of a bookbinding application.

If the book file to be opened is an existing book file, the bookbinding application 104 opens the designated book file (step S703). The bookbinding application 104 displays a user interface (UI) window according to the structure, properties, and contents of the book file. FIG. 10 shows an example of a UI window which displays a book file designated from an existing book file. The UI window 1100 comprises a tree area 1101 which indicates the structure of the book, and a preview area 1102 which displays a printed state. The tree area 1101 displays chapters included in the book, and pages included in the chapters with tree structure (A) shown in FIG. 3-1. Pages displayed on the tree area 1101 are document pages. The preview area 1102 displays the contents of print pages in a reduced scale. The display order reflects the structure of the book.

To the opened book file, application data which is converted into an electronic document file by the electronic document writer 102 can be added as a new chapter. This function will be referred to as an electronic document import function hereinafter. By importing an electronic document to a new book file created in the sequence shown in FIG. 7, an entity can be given to the book file. This function is launched by dragging and dropping application data on the window shown in FIG. 10.

Figure 8:
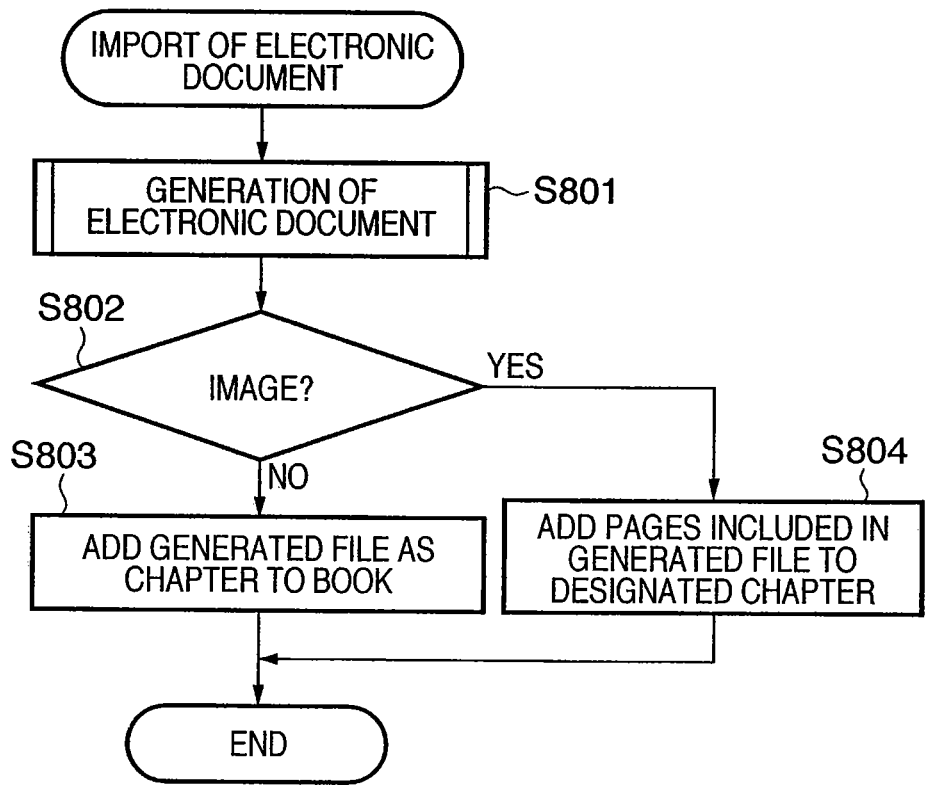
FIG. 8 is a flowchart showing an example of procedures to import an electronic document file into a book file.

FIG. 8 shows an electronic document import sequence. The bookbinding application 104 launches an application program which generated the designated application data. The bookbinding application 104 designates the electronic document writer 102 as a device driver, and causes it to print out the application data, thus converting the application data into electronic document data (step S801). Upon completion of conversion, the bookbinding application 104 determines whether the converted data is image data (step S802). This determination is based on the file extension of the application data if it is done under the Windows® OS. For example, if the extension is "bmp", the application data is determined as Windows® bitmap data; if the extension is "jpg", it is determined as jpeg-compressed image data; or if the extension is "tiff", it is determined as tiff image data. In the case of such image data, since an electronic document file can be directly generated from the image data without launching the application, unlike S801, the process in step S801 can also be skipped.

If the converted data is not image data, the bookbinding application 104 adds the electronic document file generated in step S801 to the book of the currently opened book file as a new chapter (step S803). As the chapter properties, those common to the book properties are set by copying the values of the book properties, and the remaining properties are set as specified values prepared in advance.

If the converted data is image data in step S802, the bookbinding application 104 adds not a new chapter, but respective document pages included in the electronic document file generated in step S801 to the designated chapter as a general rule (step S804). If the book file is a newly created file, the bookbinding application 104 creates a new chapter, and adds respective pages of the electronic document file as pages belonging to the new chapter. As the page properties common to those of the upper layers, these property values are given, and as properties of the electronic document file which are inherited from those defined in the application data, these values are given. For example, when the application data designates N-up, the property value is inherited. In this manner, a new book file is created, or a new chapter is added.

Figure 9:
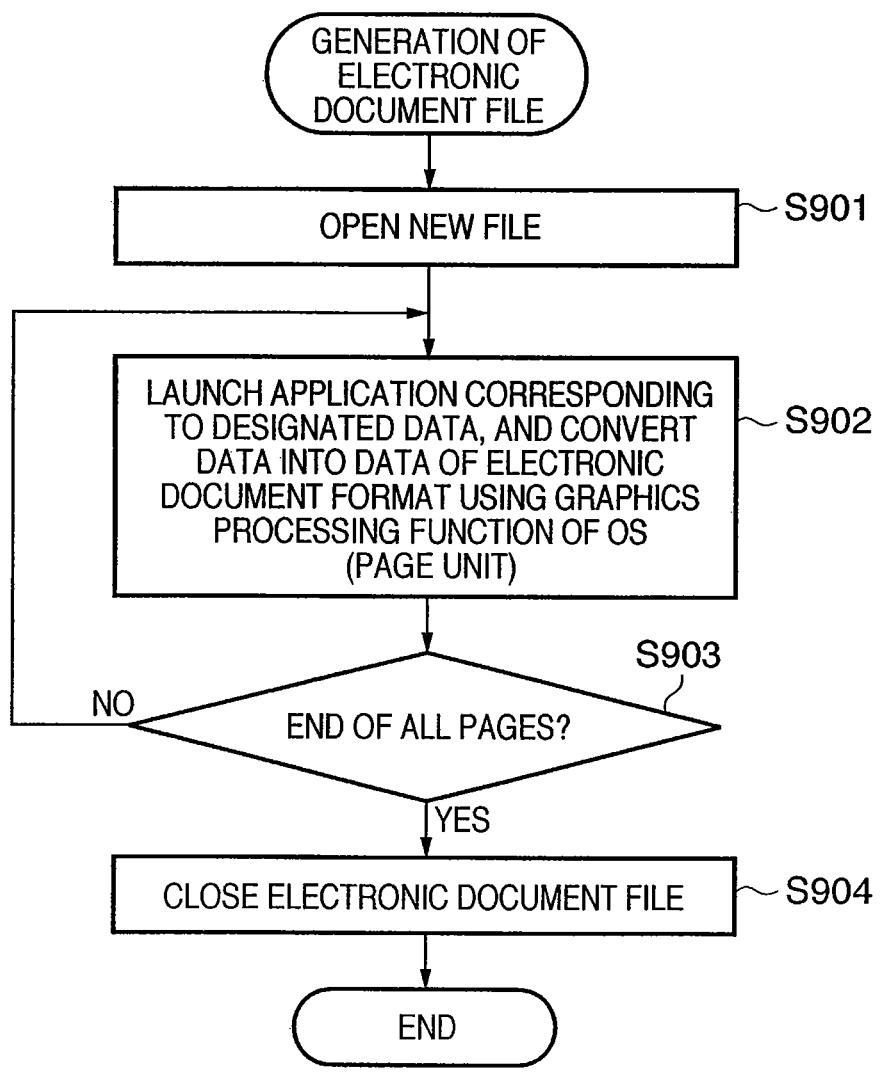
FIG. 9 is a flowchart showing an example of procedures to convert application data into an electronic document file in step S801 of FIG. 8.

FIG. 9 is a flowchart of a sequence to generate an electronic document file by the electronic document writer 102 in step S801 shown in FIG. 8. The electronic document writer 102 creates and opens a new electronic document file (step S901). The bookbinding application 104 launches an application corresponding to the designated application data. The bookbinding application 104 designates the electronic document writer as a device driver, and causes it to send output commands to the output module of the OS. The output module converts the received output commands into data in the electronic document format by the electronic document writer 102, and outputs the converted data (step S902). The output destination is the electronic document file opened in step S901. The bookbinding application 104 determines whether all the designated data have been converted (step S903). If all the designated data have been converted, the bookbinding application 104 closes the electronic document file (step S904). The electronic document file generated by the electronic document writer 102 is a file which includes the entities of the document page data shown in FIG. 3-2.

<Editing of Book File>

In this way, the book file can be created from the application data. As for the generated book file, the following edit operations are possible for chapters and pages.

(1) New addition
(2) Delete
(3) Copy
(4) Cut
(5) Paste
(6) Move
(7) Change chapter name
(8) Re-assign page number name
(9) Insert cover
(10) Insert Interleaf
(11) Insert index sheet
(12) Page layout for each document page In addition, an operation to cancel the edit operation that was made once, and an operation to redo the canceled operation are possible. These edit functions allow edit operations such as integration of a plurality of book files, relocation of chapters and pages in a book file, deletion of chapters and pages in a book file, change of layouts of document pages, insertion of interleaves and index sheets, and so forth. Upon making these edit operations, the operation results are reflected in the properties shown in FIGS. 4-1, 4-2, and 5, or in the structure of the book file. For example, if a new addition operation of a blank page is made, a blank page is inserted at a designated position. This blank page is handled as a document page. If the layouts of document pages are changed, the change contents are reflected in the properties of the print method, N-up print, front cover/back cover, index sheet, interleaf, chapter division, and the like.

<Output of Book File>

The end goal of the book file which is created and edited as described above is to be printed out. When the user selects a file menu from the UI window 1100 of the bookbinding application shown in FIG. 10 and selects "print" from the menu, the designated output device prints out the book file. In this case, the bookbinding application 104 creates a job ticket from the currently opened book file, and passes it to the electronic document despooler 105. The electronic document despooler 105 converts the job ticket into output commands of the OS (e.g., Windows® GDI functions), and sends the converted commands to the output module (e.g., GDI). The output module generates commands suited to a device using the designated printer driver 106, and sends the commands to the device.

The job ticket is data which has a structure including a document page as a minimum unit. The structure in the job ticket defines the layout of document pages on each sheet. One job ticket is issued per job. For this purpose, the structure includes an uppermost node named "document", which defines properties of the whole document (e.g., double-sided printing/single-sided printing). To the document node, paper nodes belong, and include properties such as identifiers of paper sheets to be used, and designation of a paper feed port in the printer. To each paper node, a node of a sheet to be printed using the paper sheet belongs. One sheet corresponds to one paper sheet. To each sheet, a print page (physical page) belongs. In the case of single-sided printing, one physical page belongs to one sheet. In the case of double-sided printing, two physical pages belong to one sheet. To each physical page, document pages to be laid out on the physical page belong. As properties of physical pages, the layout of document pages is included.

The electronic document despooler 105 converts the above-mentioned job ticket into output commands addressed to the output module.

<Another System Configuration>

The document processing system according to the embodiment has generally been described. The document processing system is a standalone system. Also, a server-client system which expands this system can create and edit a book file by nearly the same configuration and sequence. In this case, a server manages book files and print processing.

Figure 12:
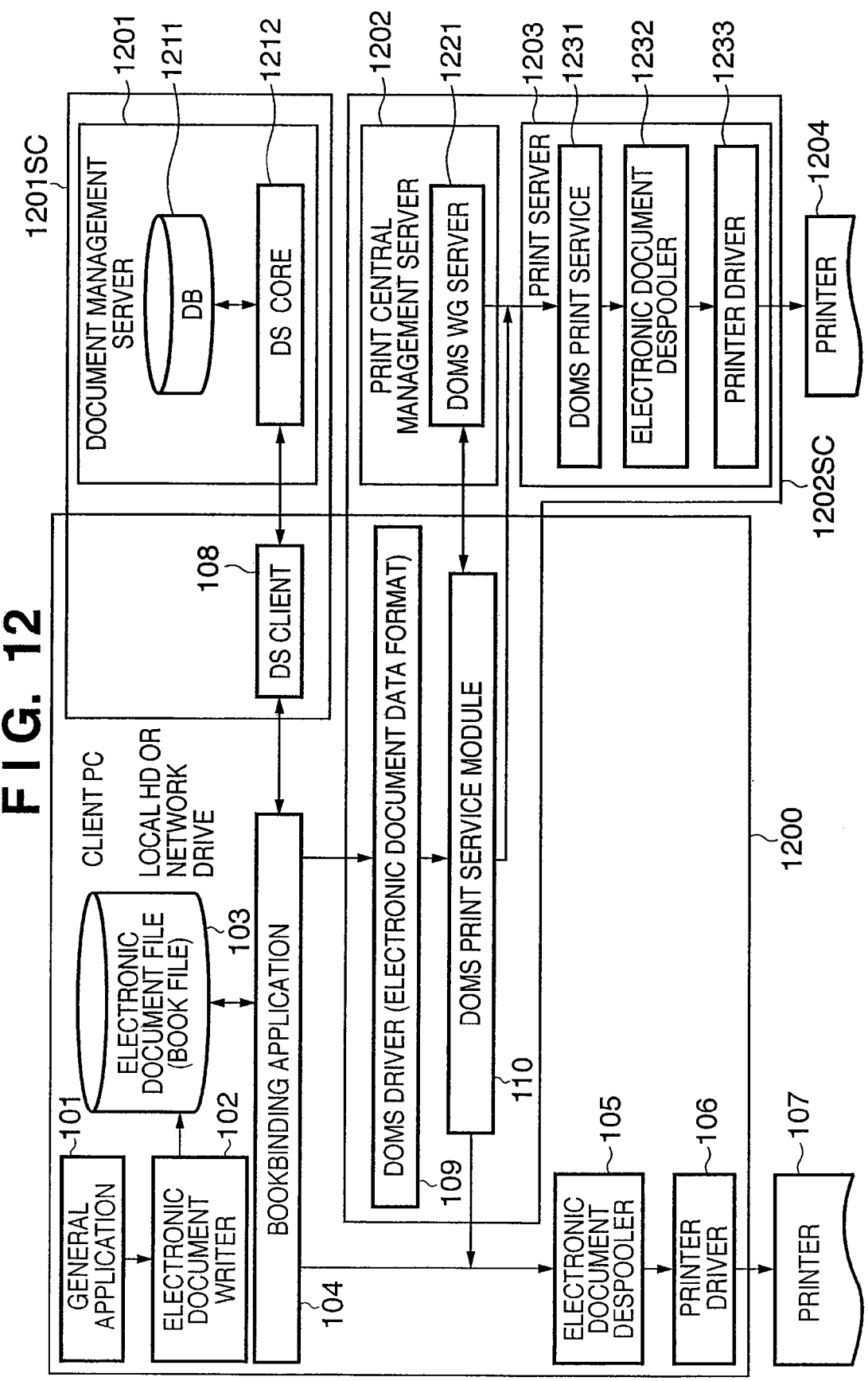
FIG. 12 is a block diagram showing an example of the software configuration of a client-server document processing system.

FIG. 12 is a block diagram showing the configuration of a server-client document processing system. The client document processing system has a configuration in which a DOMS (Document Output Management Service) driver 109 serving as a client module, a DOMS print service module 110, and a DS (Document Service) client module 108 are added to a standalone system. A document management server 1201, print central management server 1202, and print server 1203 connect to a client document processing system 1200. These servers normally connect to the client document processing system via a network. When these servers also serve as clients, they are connected via inter-process communications that simulate communications between networks.

In the example shown in FIG. 12, the two servers, i.e., the document management server 1201 and print central management server 102 connect to the client. Alternatively, one of these servers may be present on the network. For example, when the server connected is the document management server, a document management server-client system 1201SC including the client module 108 is added to the standalone document management system. When the server connected is the print central management server 1202, a print management server-client system 1202SC including its client module is added to the standalone document management system.

The document management server 1201 stores book files created and edited by the bookbinding application 104. When the document management server 1201 manages book files, the book files are stored in a database 1211 of the document management server 1201 in place of or in addition to the local HD of the client PC. Storage and read between the bookbinding application 104 and the document management server 1201 are done via the DS client 108 and a DS core 1212.

The print central management server 1202 manages printing of book files stored in the client document management system 1200 or document management server 1201. A print request at a client is sent to a DOMS WG server module 1221 of the print central management server 1202 via the DOMS driver 109 and DOMS print service module 110. When printing by the printer of the client, the print central management server 1202 passes electronic document data to the electronic document despooler 105 via the DOMS print service module 110 of the client. When printing by the print server 1203, the print central management server 1202 sends electronic document data to a DOMS print service module 1231 of the print server 1203. The print central management server performs security check about the authority of a user who issued a print request to the stored book file, and saves logs of print processing. In this way, the document processing system can be implemented as the standalone system and as the server-client system.

<Contents of Preview Display>

As has already been described above, when the bookbinding application opens the book file, the user interface window 1100 shown in FIG. 10 appears. The tree area 1101 displays a tree indicating the structure of the opened book (to be referred to as "book of interest" hereinafter). The preview area provides three display methods according to user's designations. The first display method is a document view mode in which document pages are directly displayed. In the document view mode, the preview area 1102 displays, in a reduced scale, the contents of document pages which belong to the book of interest. The display in the preview area 1102 does not reflect the layouts. The second display method is a print view mode. In the print view mode, the preview area 1102 displays document pages while reflecting their layouts. The third display method is a simple print view mode. In the simple print view mode, the display on the preview area does not reflect the contents of document pages, and but reflects only their layouts.

<Stapling Control>

Stapling control will be explained which is executed by the bookbinding application 104 of the computer 100 connected to a printer having the stapling function.

Figure 13:
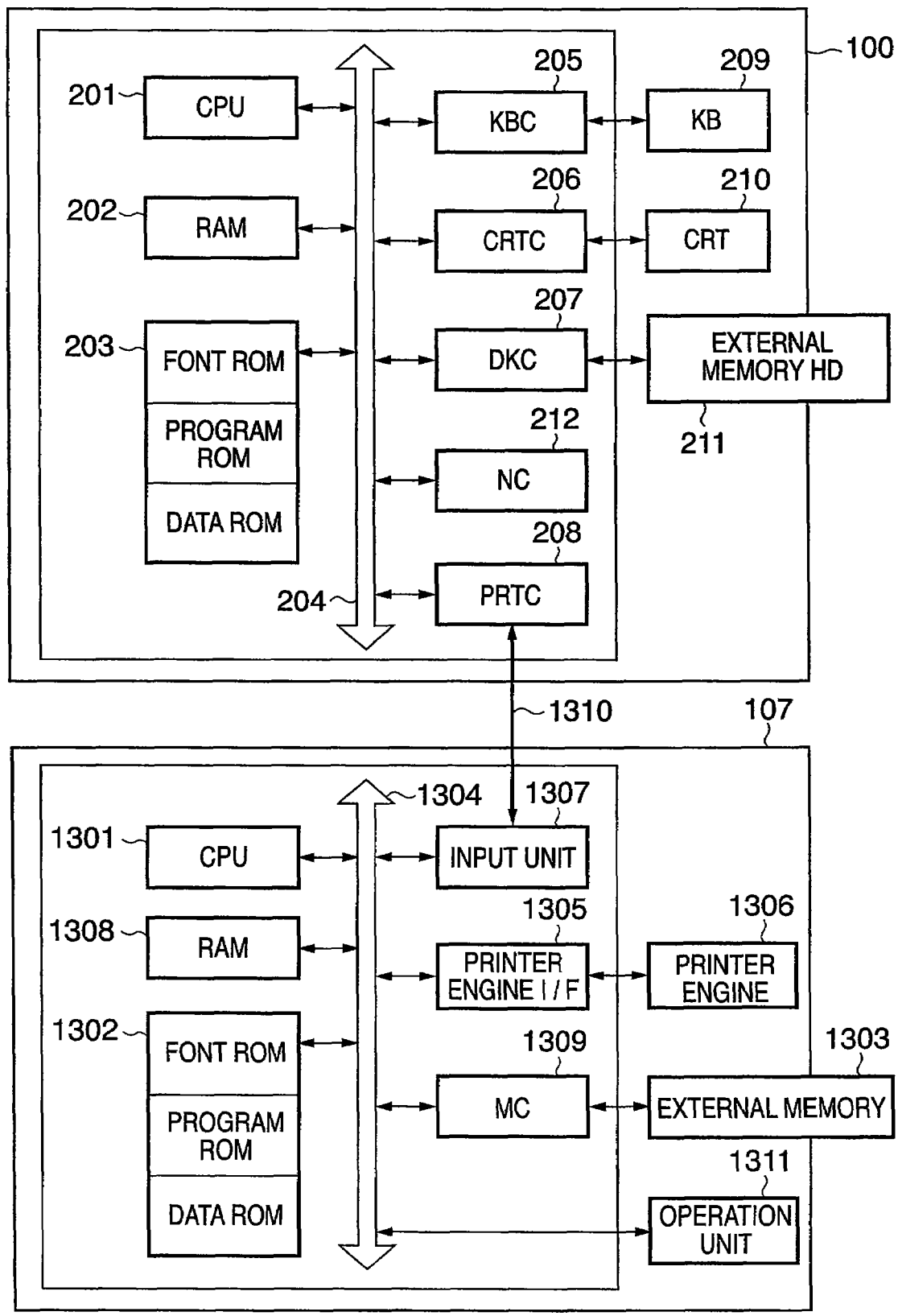
FIG. 13 is a block diagram showing the configuration of a stapling control system.

FIG. 13 is a block diagram showing the configuration of a stapling control system. As shown in FIG. 13, the stapling control system is formed from the computer 100 shown in FIG. 2 and the printer 107 having the stapling function.

The arrangement of the printer 107 will be explained. The present invention is applicable to even a system formed from a single device or a plurality of devices, or a system which is connected via a network such as a LAN or WAN and performs processing.

As shown in FIG. 13, a printer CPU 1301 in the printer 107 executes control programs and the like stored in the program ROM of a ROM 1302 to output an image signal as output information to a printer engine 1306 via a printer engine I/F 1305 connected to a system bus 1304. The program ROM of the ROM 1302 stores the control program of the printer CPU 1301 and the like. The font ROM of the ROM 1302 stores font data used to generate the output information, and the like. In the case of a printer having no external memory 1303 such as a hard disk, the data ROM of the ROM 1302 stores information and the like used on the host computer 100.

The CPU 1301 can communicate with the host computer 100 via an input unit 1307, and can notify the host computer 100 of information and the like in the printer 107. A RAM 1308 serves as a main memory, work area, and the like for the printer CPU 1301. The RAM 1308 can expand its memory capacity by an optional RAM connected to an expansion port (not shown).

The RAM 1308 is also used as an output information rasterization area, environmental data storage area, NVRAM, or the like. A memory controller (MC) 1309 controls access to the external memory 1303 such as an IC card. The external memory 1303 is connected as an option, and stores font data, emulation programs, form data, and the like. An operation panel 1311 comprises switches, LED indicators, and the like necessary for operations.

The number of external memories 1303 is not limited to one. A plurality of external memories including an optional card in addition to built-in font data, and an external memory which stores a program to interpret a printer control language of a different language system may be connected. Furthermore, the printer may comprise an NVRAM (not shown), and may store printer mode setting information from the operation panel 1311.

<Variable Printing>

The bookbinding application can set a variable field to execute variable printing, as a page property of a generated book file. Information on the variable field is set and saved in variable item 7 in FIG. 6. The variable field is overlaid in a document in the embodiment, but may be inserted in a document.

FIG. 14 is a view showing examples of the page layout for variable printing. In FIG. 14, a frame 1400 represents a document page, and a frame 1401 represents a variable field to execute variable printing. It is possible to lay out a plurality of variable fields on a document page or not to lay out even one variable field. Data read out from a database connected to the host computer 100 is inserted into the variable field, customized, and printed. A database 1402 is an example of the database connected to the host computer 100. The database is formed from records, and each record is associated with a document page. In this example, the database 1402 holds four records (1) to (4). A text field containing text data 1403, and an image field containing image data 1404 are set in each record of the database 1402. In this example, it is set to insert the text data 1403 into a variable field in the first document page and the image data 1404 in a variable field in the second document page. Setting of the variable field and setting of the association with database data will be described later. Data inserted into a variable field is sometimes called contents data.

A frame 1405 in FIG. 14 represents an example of a document page on which data from the database is actually overlaid. When record (1) is selected as variable data, text data "AAA" 1406 of record (1) is overlaid on the first document page, and image data (airplane image 1407) is overlaid on the second document page. When record (2) is selected as variable data, text data "BBB" 1408 of record (2) is overlaid on the first document page, and image data (truck image 1409) is overlaid on the second document page. When record (3) is selected as variable data, text data "CCC" 1410 of record (3) is overlaid on the first document page, and image data (ship image 1411) is overlaid on the second document page. When record (4) is selected as variable data, text data "DDD" 1412 of record (4) is overlaid on the first document page, and image data (car image 1413) is overlaid on the second document page. Since no variable field is set in the third document page, no data is overlaid. However, the third document page is printed for all records even if no data is overlaid. In this manner, variable printing repeats printing by the number of document pages x the number of records. This record insertion processing is done in step S4304 of FIG. 43.

Figures 2, 15:
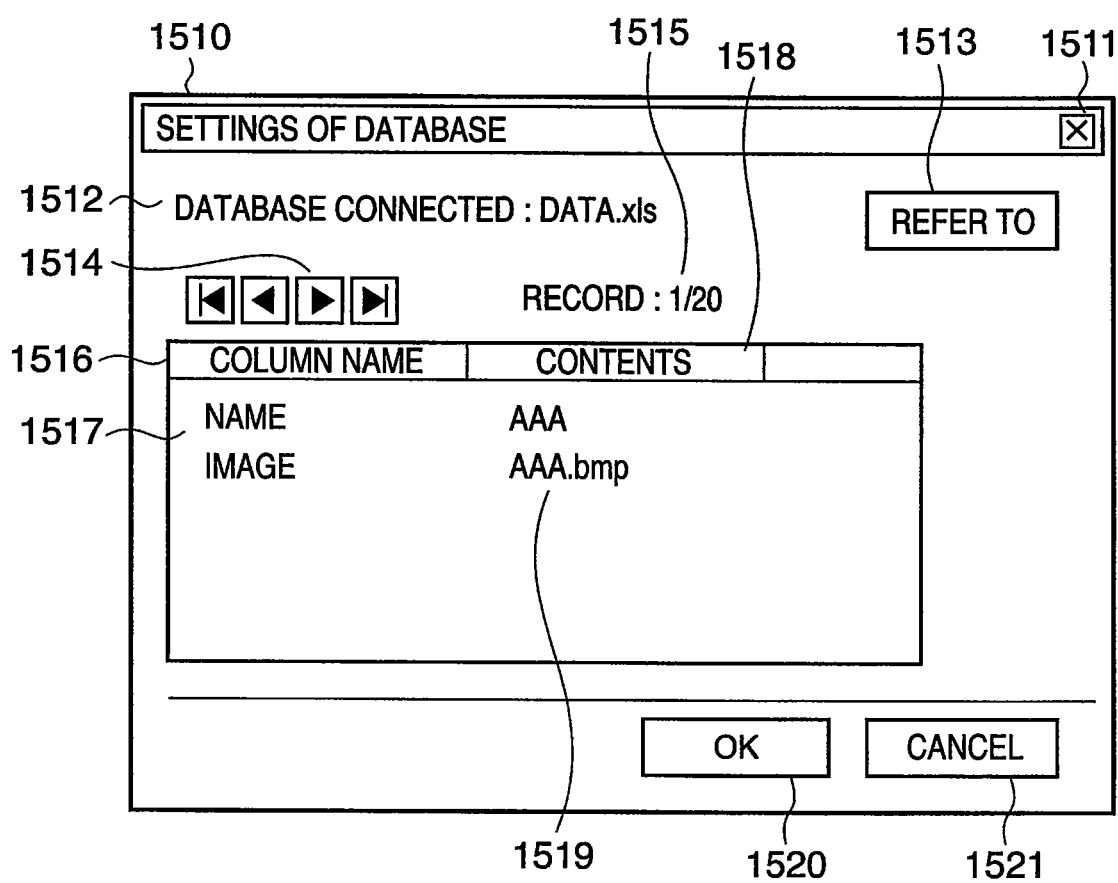

A window 1500 in FIG. 15-1 represents an example of the UI of a variable printing editor which sets the above-mentioned variable printing. The variable printing editor launches from the bookbinding application, and can set variable printing for each logical page of a book file. To launch the variable printing editor from the bookbinding application, the user selects a single logical page from the preview window of the bookbinding application, selects a tool menu from the UI window of the bookbinding application, and selects "variable printing editor". Alternatively, the user may select a single logical page from the preview window of the bookbinding application and select "variable printing editor" from a menu activated by clicking the right mouse button. The variable printing editor may be launched by still another method (e.g., using a tool button). The variable printing editor may be provided as part of the bookbinding application.

The window 1500 represents the entire UI of the variable printing editor. When the variable printing editor starts, the entire UI 1500 appears. A button 1501 is used to minimize, maximize, and close the window of the variable printing editor. A menu bar 1502 is used to make various edit operations of the variable printing editor. Buttons 1503 are tool buttons of the variable printing editor. The buttons 1503 are prepared so that the user can easily select operations provided by the menu. A scroll bar 1504 is displayed when the variable printing editor cannot display an entire document page, and allows the user to edit an entire document page by scrolling the entire window. A control 1505 is the grab control of the variable printing editor, and allows the user to arbitrarily change the window size with the mouse pointer. A frame 1506 represents a document page to be edited by the variable printing editor. The variable printing editor may prepare a page move function for document pages, and enable move of a page without returning to the bookbinding application. An object 1507 is rendered on a document page. The variable printing editor has a function of setting only a variable field, and cannot edit another object on the document page. A frame 1508 represents a text variable field for inserting text data. A frame 1509 represents an image variable field for inserting image data. The embodiment uses the term "variable field" when text and image variable fields need not be distinguished from each other. These fields can be created by selecting a variable field creation function with the menu bar 1502 or tool buttons 1503, and rendering rectangles with the mouse cursor. The variable printing editor calculates or sets, and saves the position and size of a variable field, i.e., variable area, the type of object to be inserted, and the like as information (properties information: to be described later with reference to FIGS. 17, 19, and the like) in accordance with an instruction from the user via the GUI. The variable printing editor operates according to instructions from the user, and also changes and saves the position and size of the variable area and the like under predetermined conditions designated by properties information. This processing will also be described with reference to FIGS. 35-1 and 35-2 and the like.

A window 1510 in FIG. 15-2 represents an example of the connection dialog (UI) of a database used to set data to be inserted into the variable field. The window 1510 shows an outline of the connection dialog, and a button 1511 is used to close the connection dialog. The connection dialog can be selected and displayed with the menu bar 1502 or tool buttons 1503. An area 1512 is used to connect to a database. If the database has already been connected, the area 1512 displays the name of the connected database. If no database is connected, the area 1512 is blank. To connect a database, the user clicks a reference button 1513 to display a database file reference dialog or the like, and designates a database file. If the user selects another database file with the reference button during connection to the database, connection switches to the selected database. The bookbinding application can connect to only one database, and cannot connect to a plurality of databases. Controls 1514 to 1519 become valid during connection to the database, and represent the contents of the connected database. The button group 1514 is a record move button group to move a record in the connected database. The field 1515 represents the total number of records in the connected database, and the number of a record whose contents are displayed currently. The field 1516 represents a column name set in the connected database. The column name 1517 represents the properties of each record data in the database. In the example of FIG. 15-2, the database has properties "name" and "image". The field 1518 represents a value (data) corresponding to the column name of each record in the connected database. In FIG. 15-2, data of the first record has a value "AAA" for the property "name", and a value "XXXX-.bmp" for the property "image". As the record moves with the record move button group 1514, the contents of the data 1519 also change in accordance with the moved record number. A button 1520 is an OK button to finalize contents set in the connection dialog 1510. A button 1521 is a cancel button to end without reflecting set contents.

Figures 2, 16:
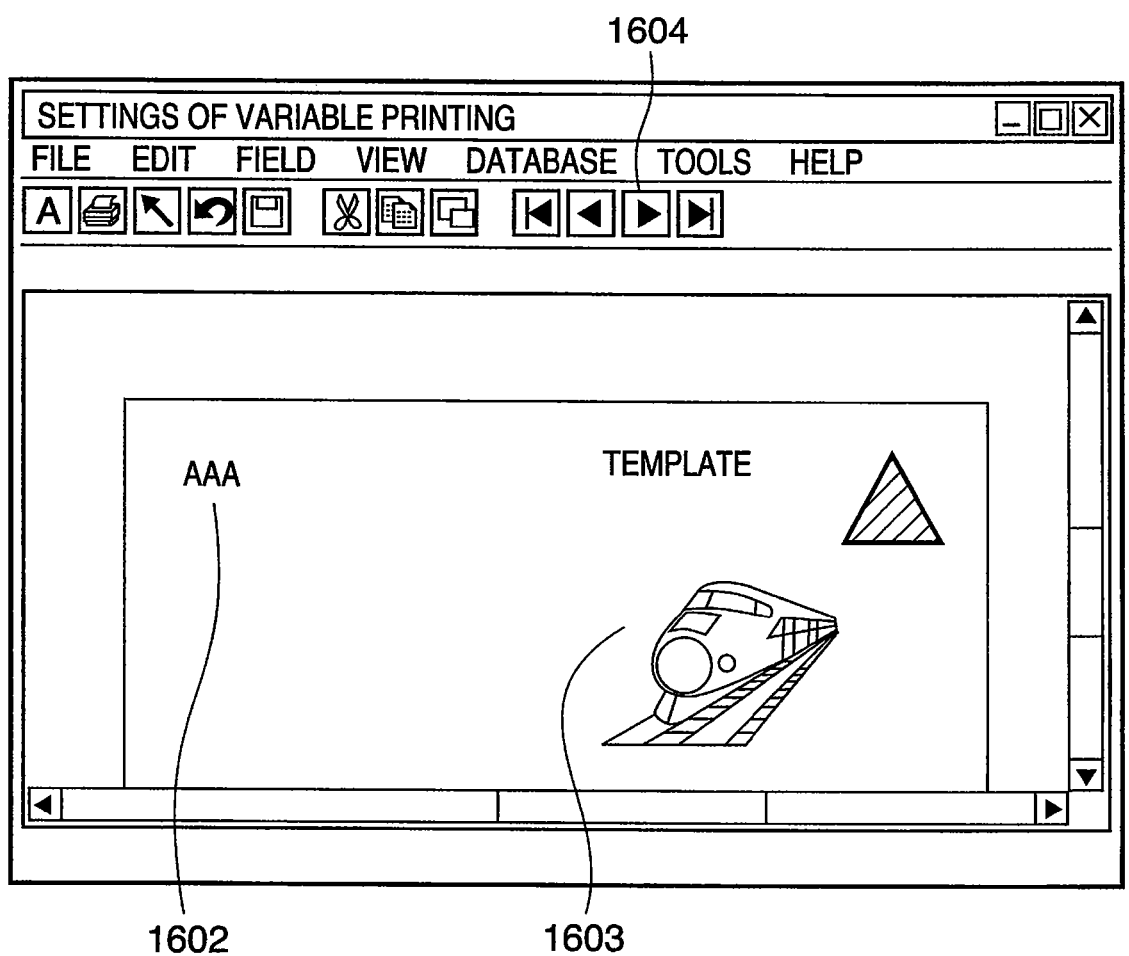

A window in FIG. 16-1 is an example of a UI in which association with the database is set in the variable field. The above-described column "name" is set in a text variable field 1600. As the setting method, it suffices to set the column of a connected database by the property of the text variable field or the like. A plurality of database columns may be set in the text variable field. The above-described column "image" is set in an image variable field 1601. As the setting method, it suffices to set the column of a connected database by the property of the image variable field. The number of database columns settable in the image variable field is one.

A window in FIG. 16-2 is an example of a UI when previewing set contents. From the preview, the user can confirm a state in which database data set in the variable field is inserted. An area 1602 represents a state in which the value "AAA" of the column "name" is inserted in the text variable field 1600 shown in FIG. 16-1. An image 1603 represents a state in which the value "train image" of the column "image" is inserted in the image variable field 1601 in the window of FIG. 16-1. At this time, no preview can be displayed when an error occurs in a data format to a set column or data is omitted. A button group 1604 is a record move button group to move a record in the database. The user can move a record with the button group and confirm the preview of each record. In printing, the user can designate ON/OFF of variable printing from the print dialog of the bookbinding application. If the user designates not to execute variable printing in the print dialog, he can print without reflecting contents set with the variable printing editor.

<Common Variable Field>

The bookbinding application according to the embodiment can perform variable printing processing to insert and print data assigned to the variable area of document data every printing.

The user selects an arbitrary variable field, designates sharing of the variable field, and can set a variable field having field properties (variable data information, field position, size, font information, and the like) common to all pages. The variable field defined to have common field properties is called a common variable field. The common variable field has information that this variable field is common. The common variable field is common to all pages. Thus, when a property of the common variable field set in an arbitrary page changes, the changed property is reflected in the common variable field and as a result, reflected in the common variable fields of all pages. The common variable field is also called a common variable area. Since field properties are common, this field is also called a common variable field or common variable area.

[Data Structure of Variable Field]

FIG. 17 shows a data structure 1700 of the variable field. The field ID is an identifier assigned as a unique value to all variable fields in order to identify each variable field. The common flag represents whether the variable field is shared. The common flag of a common variable field is set ON, and whereas that of an unshared normal variable field is set OFF. The common ID is a value for identifying a variable field bound (associated) by sharing. When the property value of an arbitrary variable field changes, the property value of a variable field having the same common ID as that of the changed variable field changes in synchronism with the changed variable field.

Figure 18:
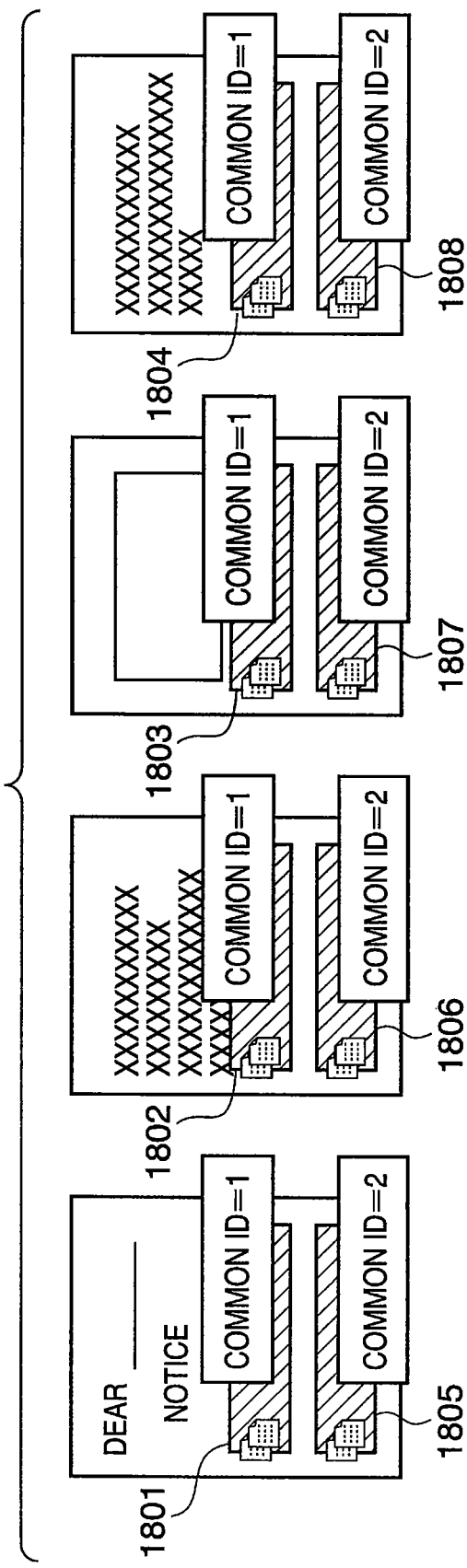
FIG. 18 is a view showing the state of the common ID when there are a plurality of common variable fields.

FIG. 18 shows an example of the common ID when there are a plurality of common variable fields. Variable fields 1801, 1802, 1803, and 1804 having the common ID=1, share properties. Similarly, variable fields 1805, 1806, 1807, and 1808 having the common ID=2, share properties. A group of variable fields having the same common ID will be called a common properties group. For example, when the position (i.e., layout information) of the variable field 1801 changes, those of the variable fields 1802, 1803, and 1804 change to the same position as that of the variable field 1801, i.e., the positions of these fields move. Even if the position of the variable field 1801 changes, those of the variable fields 1805, 1806, 1807, and 1808 having a different common ID do not change.

Variable data information represents which of records in the database is inserted into the variable field. Layout information is about the position of a variable field. The layout information contains variable field size information, and coordinate information representing a position where the common variable field is laid out on the document page. The position where the variable field is laid out can also be designated by a relative position (right alignment, center alignment, left alignment, top alignment, middle alignment, or bottom alignment) depending on the size of the document page. For this purpose, the layout information also contains information representing how to designate the position. Font information is about the font used to display and print an inserted record. The font information contains the font type, font size, character decoration, position alignment, and the like. Frame decoration information is about the frame line color, thickness, paint color, the transmittance of the variable field, and the like.

[Data Structure of Common ID Information]

FIG. 19 shows the data structure of common ID information. One common ID information is defined for one common ID. The common ID information contains information for canceling sharing of some field properties of the common variable field. Processing to cancel sharing of some field properties will be described later.

Common flags are prepared for respective field properties "position", "size", "font", and "frame decoration", and hold ON or OFF values. A field property whose common flag is ON for a given common ID is shared in a common properties group having this common ID, and a field property whose common flag is OFF is not shared. The four flag items are exemplified, but the items are not limited to them. The common flag of another item may be added, or an item may be subdivided to set common flags. The common ID information has variable field information which defines at least the position and size of a variable field overlaid or inserted in document data. The bookbinding application 104 performs edit processing including addition, change, or deletion of common ID information in accordance with an edit instruction from the user. Also, the bookbinding application 104 creates output data in which the variable area is overlaid or inserted in each document page in accordance with variable area information (also called variable field information). The variable area information contains common properties information that the variable field is set commonly to document pages of a document. When the variable field is set as a common field, for example, common ID information having a properly assigned initial value as a common ID is created.

The common value field of each field property in common ID information holds a value when the common field is set ON to share the variable field. Even when the common field in the common ID information changes from ON to OFF, the common value field of each field property holds a value upon sharing. This setting can restore a field property value upon sharing when a variable field, sharing of which was canceled once, is shared again. FIG. 20 shows a user interface for setting each property value of the common variable field.

A designation field 2001 is a user interface to designate which of column data in the database is inserted into the variable field. For example, when the database defines a record having a plurality of fields, a field ID to be inserted into the variable field, or the like is designated. Information designated in the designation field 2001 is set as variable data information of the variable field.

A designation field 2002 is a user interface to designate font information. Information such as the font type and font size designated in the designation field 2002 is set in font information of the variable field. Although not shown, a user interface to designate settings such as character decoration and text position alignment can also be added.

A designation field 2003 is a user interface to designate the position of a variable field on the document page by the coordinates of the upper left corner of the variable field. The coordinates start from the reference coordinates (0,0) of the upper left corner of the document page, and can be designated in millimeters. The coordinate reference may not be the upper left corner of the document page, and the unit of designation may be inches instead of millimeters. Position information designated in the designation field 2003 is set in coordinate information contained in variable field layout information.

Figure 21:
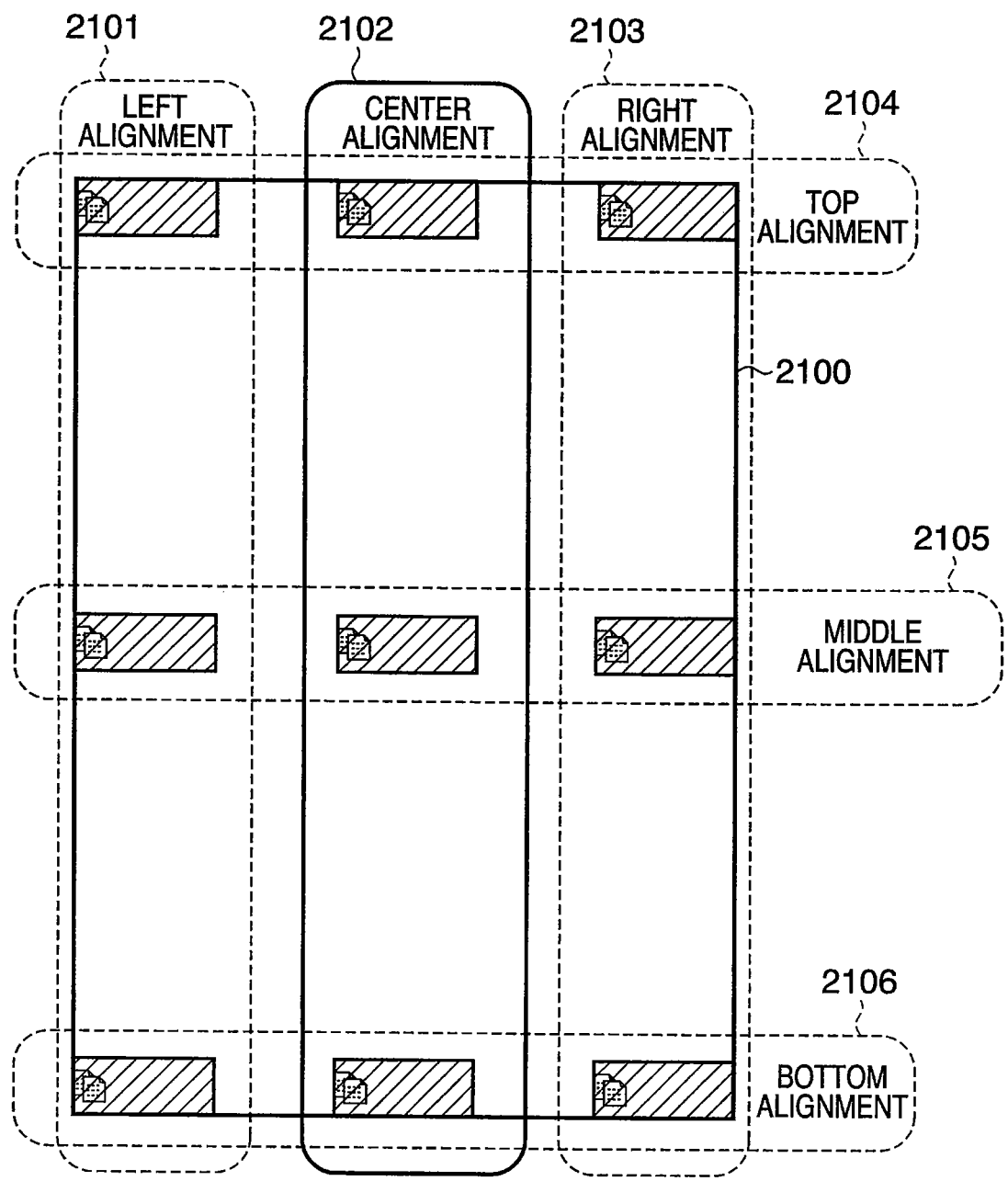
FIG. 21 is a view showing the position of a variable field when the layout of the variable field is designated by a relative position.

A designation field 2004 is a user interface to designate whether to designate the layout position of the variable field by a position relative to the document page. The relative position can be designated by right alignment, center alignment, or left alignment in the X direction, or top alignment, middle alignment, or bottom alignment in the Y direction. FIG. 21 shows the layout position of a variable field when designated by a relative position.

In FIG. 21, a frame 2100 represents a document page. In the case of left alignment 2101, the left side of the variable field is laid out on the left side (X-coordinate=0) of the document page. In the case of center alignment 2102, the center ({the coordinates of the left side of the variable field+those of the right side of the variable field}/2) of the variable field is laid out at the center (document page width/2) of the document page in the X direction. In the case of right alignment 2103, the right side of the variable field is laid out on the right side (corresponding to the document page width) of the document page.

In the case of top alignment 2104, the top of the variable field is laid out at the top (Y-coordinate=0) of the document page. In the case of middle alignment 2105, the center ({the coordinates of the top of the variable field+those of the bottom of the variable field}/2) of the variable field is laid out at the center (document page height/2) of the document page in the Y direction. In the case of bottom alignment 2106, the bottom of the variable field is laid out at the bottom (corresponding to the document page height) of the variable field.

When the position of the variable field is designated by a relative position, position alignment of the text changes in synchronism with the layout designated by the relative position by designating synchronization of contents in a designation field 2005. For example, when synchronization is designated in the designation field 2005, text alignment changes to left alignment upon designating left alignment as the position of the variable field, and middle alignment upon designating middle alignment.

A designation field 2006 is a user interface to designate the width and height of the variable field. Information designated in the designation field 2006 is set in size information contained in variable field layout information.

A check box 2007 is a user interface to designate whether to share each setting, which can be designated via the user interface in FIG. 20, between common variable fields having the same common ID. The common flag of common ID information corresponding to a checked item is set ON.

By clicking an OK button 2008, a designated set value is applied to corresponding information and saved. By clicking a cancel button 2009, designated information is discarded without applying it.

[Sharing of Variable Field]

Figure 22:
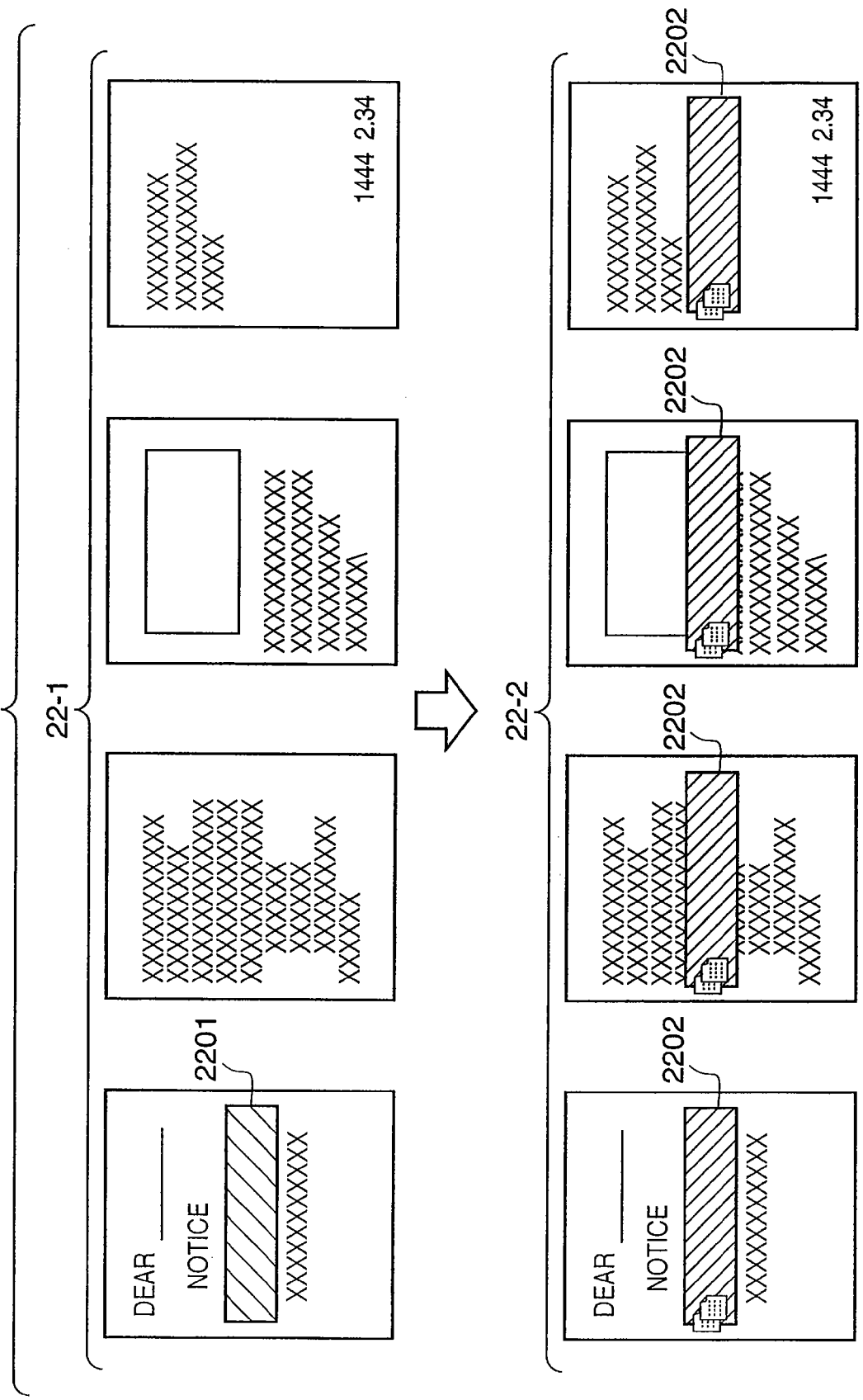
FIG. 22 is a view showing an operation when sharing a variable field.

FIG. 22 is a view showing an operation when setting a variable field as a common variable field. Variable field sharing processing is done when the user selects a variable field to be shared and designates sharing of it. Sharing is designated by, for example, selecting "share" from a menu item wile selecting a variable field, or by pressing a key to designate sharing from the keyboard. Assume that the user selects a variable field 2201 and designates sharing in the state of a document 22-1. Then, sharing processing is performed to paste common variable fields having the same field property value to all pages, resulting in a document 22-2. That is, variable fields 2202 identical to the variable field 2201 are laid out in all pages. Upon receiving an edit instruction to set a variable (field) area as a common area, the bookbinding application 104 reflects variable area information to be edited as variable area information of each document page of a document. Further, the bookbinding application 104 sets common properties information for variable area information of each page, and associates them with each other.

Figure 23:
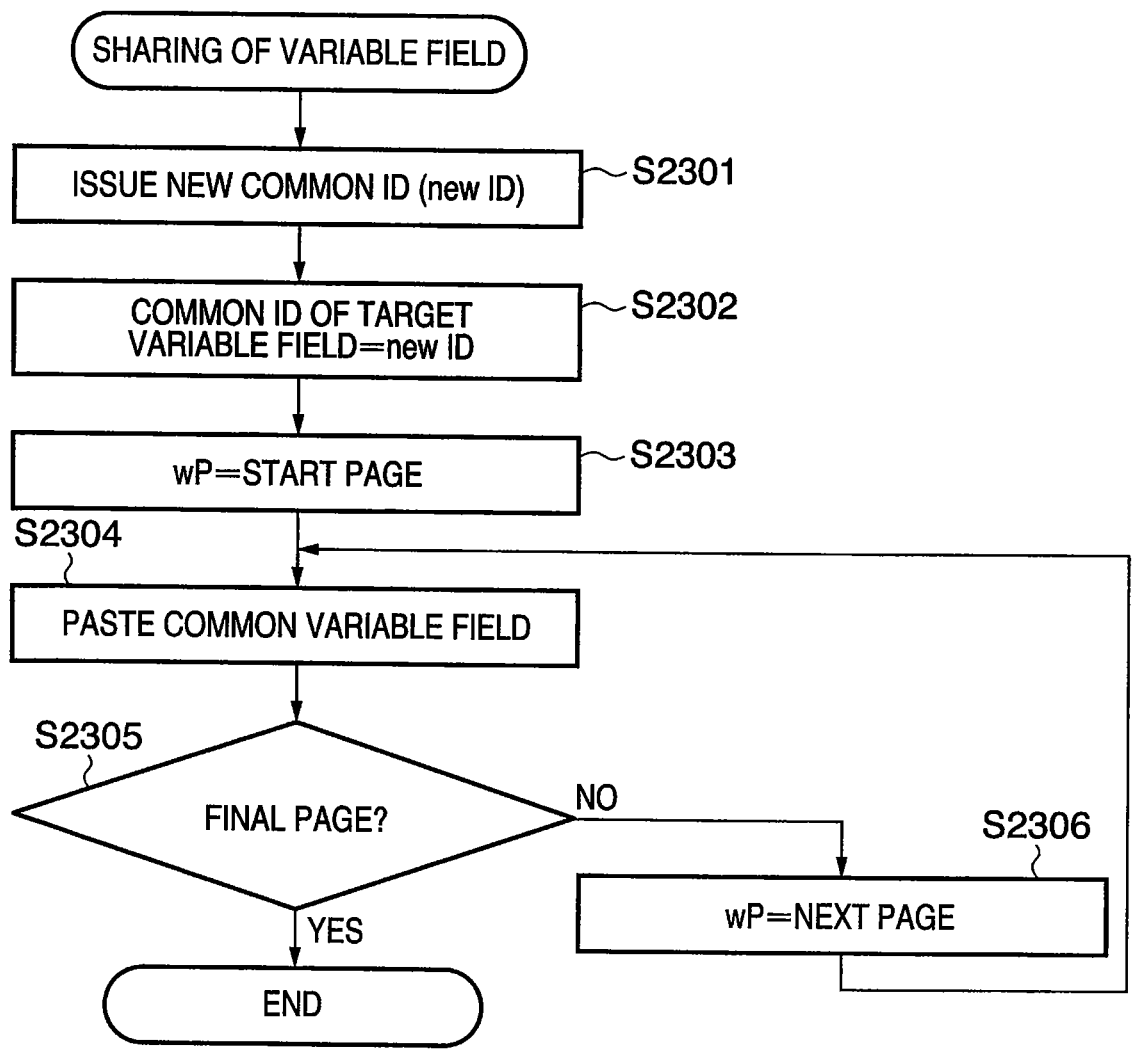
FIG. 23 is a flowchart showing processing to share a variable field.

FIG. 23 is a flowchart of processing to share a variable field. When the variable field of a given page is set as a common variable field by the processing in FIG. 23, common edit processing applies to all the pages of a document file having the common variable field. This processing is one by a variable field editor and is executed by the CPU 201. In the embodiment, the variable field editor is part of the bookbinding application 104, SO the processing in FIG. 23 will be explained as one by the bookbinding application 104. Flowcharts to be described in the embodiment represent processes by the variable field editor similarly to FIG. 23, except for FIG. 43, and are executed by the CPU 201. The flowcharts will be described as if the bookbinding application 104 were a main processor, but when the program executes procedures, the CPU is a main processor.

When the user designates sharing of a selected variable field, the bookbinding application 104 newly issues a common ID (S2301). The common ID is assigned with an unused figure by referring to common IDs contained in existing common ID information. The common ID may not be a figure as long as it can be uniquely identified. After deciding a common ID to be added newly, the bookbinding application 104 creates common ID information having the common ID. At this time, the bookbinding application 104 sets ON all common flags associated with field properties, and stores the property values of the selected common variable field in the common value columns of field properties contained in the common ID information.

After issuing the common ID, the bookbinding application 104 stores it as the common ID of the selected variable field (S2302).

The bookbinding application 104 stores, in the variable wP, the page number of the start page of the document file containing the sharing-designated variable field (S2303), and adds the common variable field to the start page (S2304). That is, the variable wP holds the page number of the page of interest. The property values of the added common variable field are the common values of field properties acquired from the common ID information. When the page of interest contains the selected variable field, this page is skipped to perform common variable field addition processing (S2304) from the next page.

After adding the common variable field, the bookbinding application 104 stores the next page number in the variable wP to change the page of interest to the next page (S2305), and pastes the common variable field to the page of interest.

The bookbinding application 104 repeats the addition processing up to the final page (S2306). Consequently, the common variable fields are added to all pages.

By executing the processing in FIG. 23, the bookbinding application 104 can set common variable fields to all the pages of a document file containing a page for which sharing of a variable field is designated.

[Change of Property Value of Variable Field]

Figure 24:
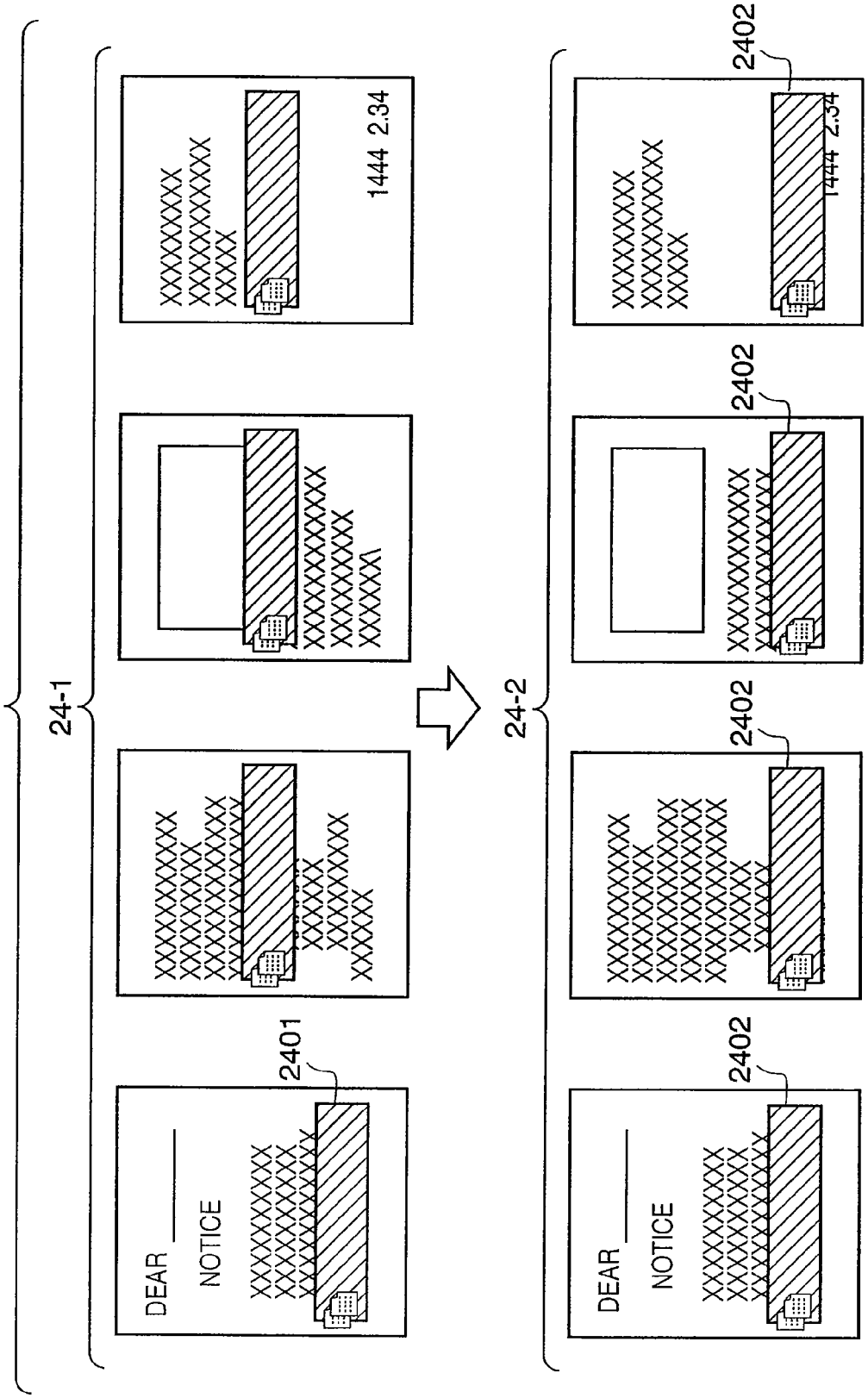
FIG. 24 is a view showing an operation when changing the property value of a common variable field.

FIG. 24 is a view showing an operation when changing the property value of a common variable field. Common variable fields have the same property values throughout all pages. Thus, when the property value of a common variable field 2401 on an arbitrary page of a document 24-1 changes, common variable fields 2402 of all pages change similarly. In FIG. 24, the position of the common variable field 2401 is modified out of common variable fields set in all pages. In synchronism with the move of the variable field 2401, the common variable fields 2402 of the remaining pages also move to the same position as that of the variable field 2401. The bookbinding application 104 changes position information representing the position of a variable area on a document page in accordance with a position change instruction from the user.

Figure 25:
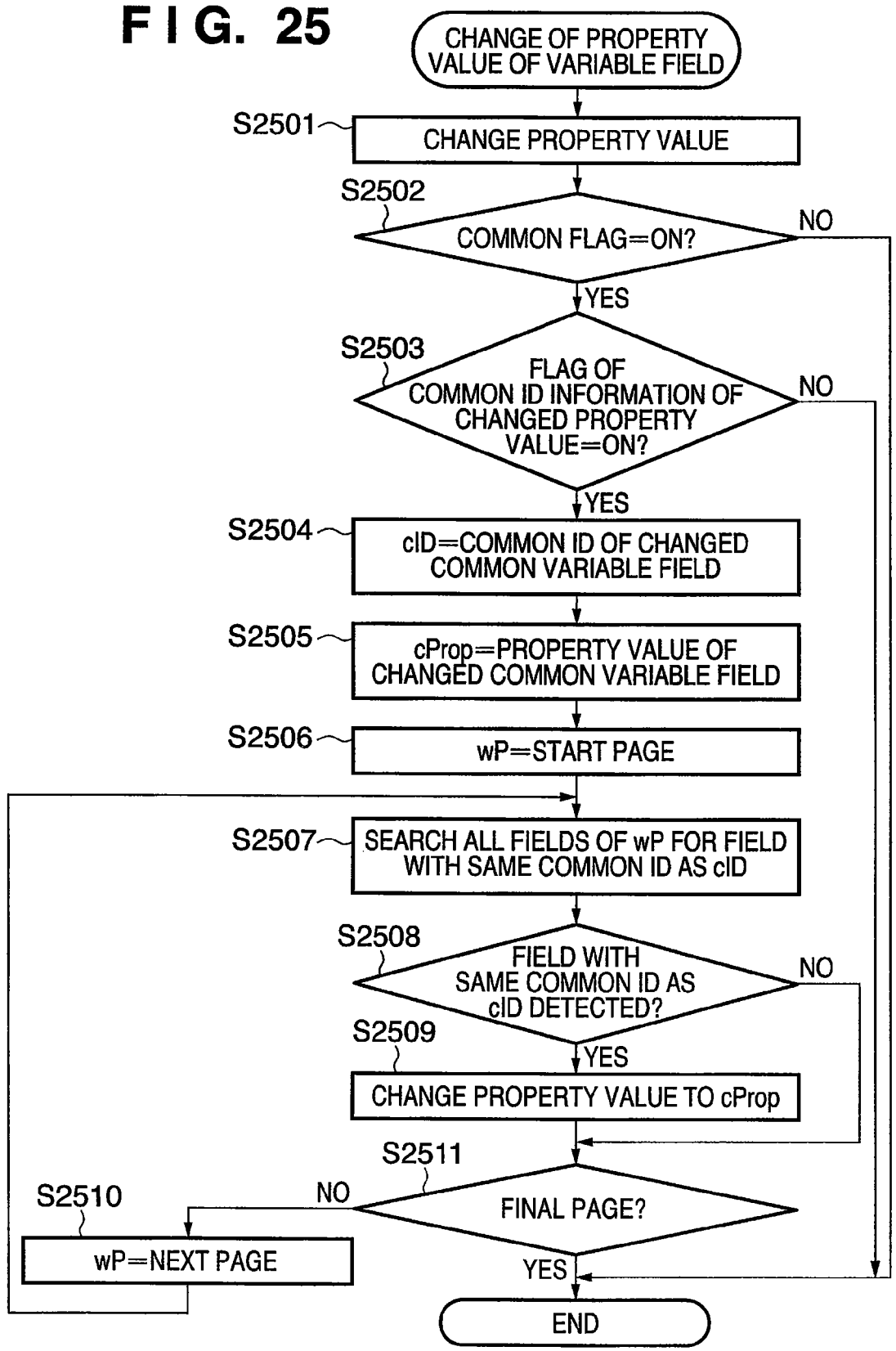
FIG. 25 is a flowchart showing processing when changing the property value of a variable field.

FIG. 25 is a flowchart showing processing when changing the property value of a variable field. When a common variable field defined for a given page is edited by the processing in FIG. 25, common edit processing applies to all pages having identical common variable fields.

When receiving a property value change instruction from the user, the bookbinding application 104 changes the property value of a target variable field to a designated value (S2501).

The bookbinding application 104 refers to the common flag of the variable field whose property value has changed (S2502). If the common flag is OFF, the variable field is not shared, and the change processing ends. If the common flag is ON, the bookbinding application 104 refers to the common flag of each field property in common ID information associated with the common ID of the variable field (S2503). If the common flag of the changed field property is OFF, the bookbinding application 104 ends the change processing. If the common flag is ON, the bookbinding application 104 stores, in the variable cID, the common ID of the variable field whose property value has changed, and also stores the changed property value (S2504 and S2505). The property value includes various field property values which define the variable field, as shown in FIGS. 17 and 19. The RAM 202 or the like holds the changed property value.

To reflect the change of the property value in the common variable fields of all pages, the bookbinding application 104 refers to variable fields from the start page (S2506). The bookbinding application 104 refers to variable fields in a page in search of a common variable field having an ON common flag and the same common ID as that of the common variable field whose property value has changed (S2507). If the bookbinding application 104 detects common variable fields having the same common ID (S2508), it changes the property value of the common variable fields to that of the common variable field stored in step S2505 (S2509). That is, the bookbinding application 104 sets the property value changed by the process in step S2501 for the property of the common variable field detected by the process in step S2507. As for the position, when the variable field is designated by a relative position, the position changes to one calculated from the width and height of each document page and those of the variable field. The bookbinding application 104 changes the page of interest to the next page (S2510), searches for a common variable field having the same common ID as that of the changed variable field, and changes the property value of the detected common variable field. If the page of interest does not contain common variable fields having the same common ID, the bookbinding application 104 does not change the property value of the variable fields of the page of interest, and changes the page of interest to the next page. In other words, the bookbinding application 104 can designate the position of the variable area by a position relative to the document page, and changes the position of the variable area in accordance with a position change instruction from the user.

The bookbinding application 104 executes the processes in steps S2507 to S2510 up to the final page (S2511), and changes the property values of all common variable fields having the same common ID as that of the common variable field whose property value has changed.

When the property value of a selected variable field changes, the bookbinding application 104 can change those of variable fields having the same common ID by the processing in FIG. 25. For example, change of the property value of one variable field having a common ID similarly applies to other common variable fields having the same common ID. When the user changes the size of an arbitrary common variable field, the bookbinding application 104 changes size information of variable fields having the same common ID.

[Cancellation of Sharing]

Figure 26:
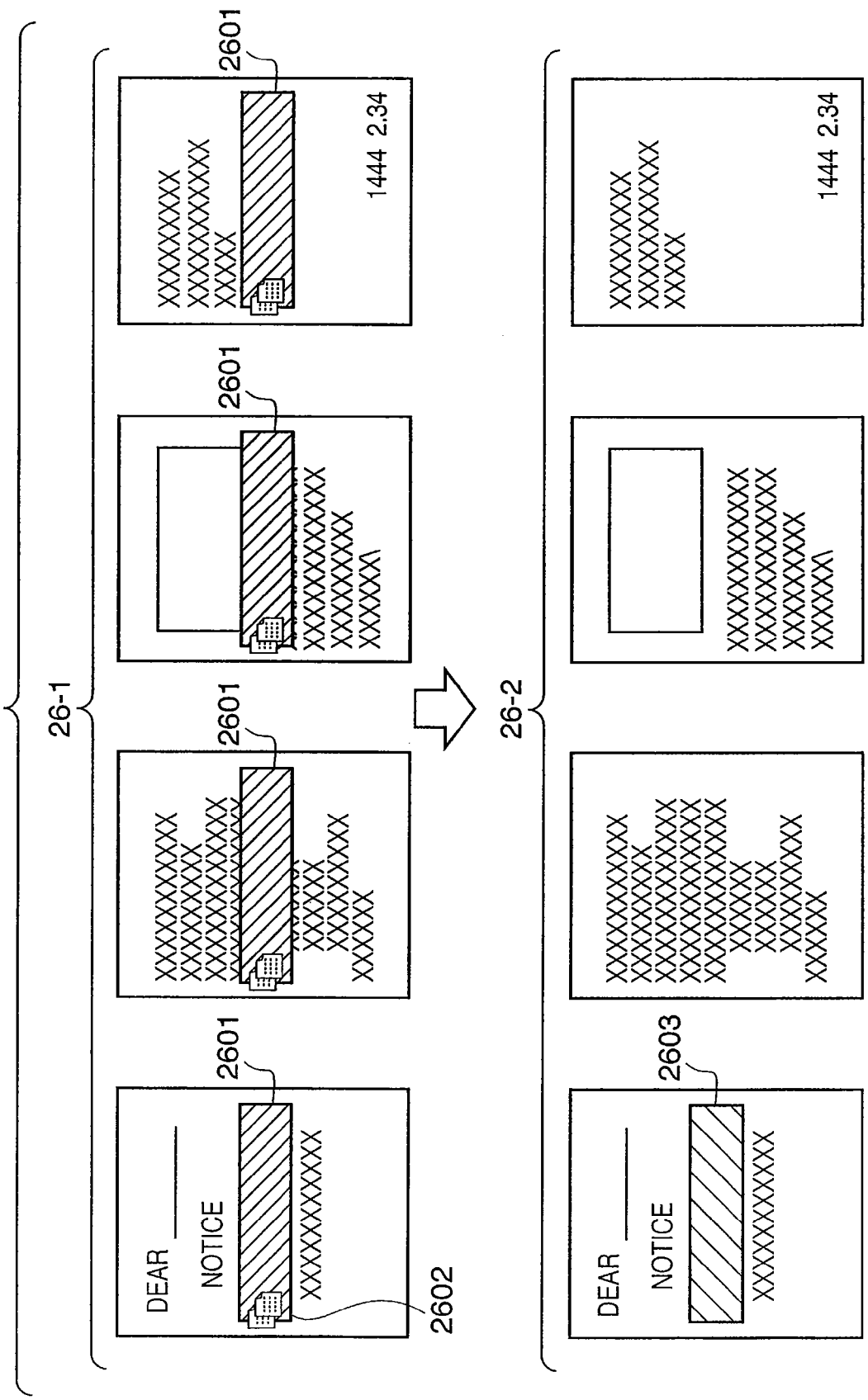
FIG. 26 is a view showing the operation of processing to cancel sharing of a common variable field.

FIG. 26 is a view showing the operation of processing to cancel sharing of a common variable field. A document 26-1 is a document whose variable field is shared. A common ID is assigned to a common variable field 2601. A document 26-2 represents a state after canceling sharing of a selected common variable field 2602. Only a variable field for which cancellation of sharing is designated remains as a normal variable field 2603, and common variable fields in the remaining pages are deleted. More specifically, upon receiving an edit instruction not to set a variable area as a common area, the bookbinding application 104 leaves the variable area in a document page to be edited, and deletes variable areas associated with the variable area from the remaining document pages.

Figure 27:
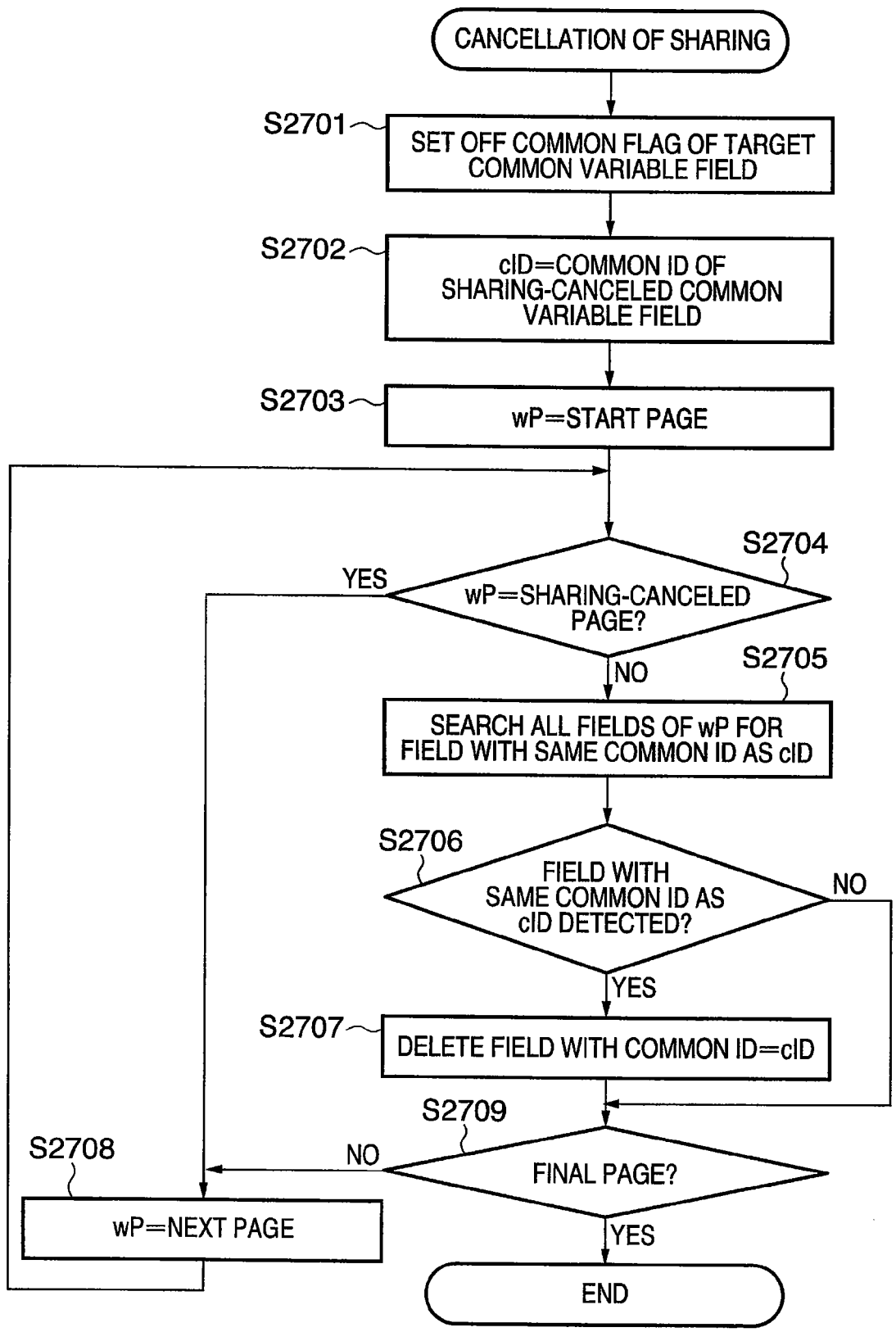
FIG. 27 is a flowchart showing processing to cancel sharing of a common variable field.

FIG. 27 is a flowchart showing processing to cancel sharing of a common variable field. When the bookbinding application 104 is instructed to cancel sharing, it sets OFF the common flag of a cancellation-designated common variable field, and stores page information (information to specify a page: e.g., page number) containing the common variable field to be operated (S2701). The bookbinding application 104 stores, in the variable cID, the common ID of the sharing-canceled common variable field (S2702). The bookbinding application 104 stores the page number of the start page in the variable wP (S2703). The bookbinding application 104 determines whether the page (page wP) represented by the variable wP is a page having the cancellation-designated variable field (S2704). If the page wP is the sharing-canceled page, the bookbinding application 104 changes the variable wP to the next page (S2708). The determination in step S2704 can be executed by comparing the target page wP with the page information stored in S2701. If the page wP is not the sharing-canceled page, the bookbinding application 104 searches for a variable field having the common ID "cID" from variable fields in the page wP (S2705). If the bookbinding application 104 detects a variable field having the common ID "cID", it deletes the variable field (S2706 and S2707). The bookbinding application 104 performs the processes in steps S2704 to S2708 page by page from the start page, and ends the processing at the end of processing up to the final page (S2709).

The processing in FIG. 27 can leave a common variable field for which cancellation of sharing is designated. For example, when there are many pages having variable fields with the same common ID, this processing can delete at once fields for which no cancellation of sharing is designated.

[Change to Normal Variable Field]

Figure 28:
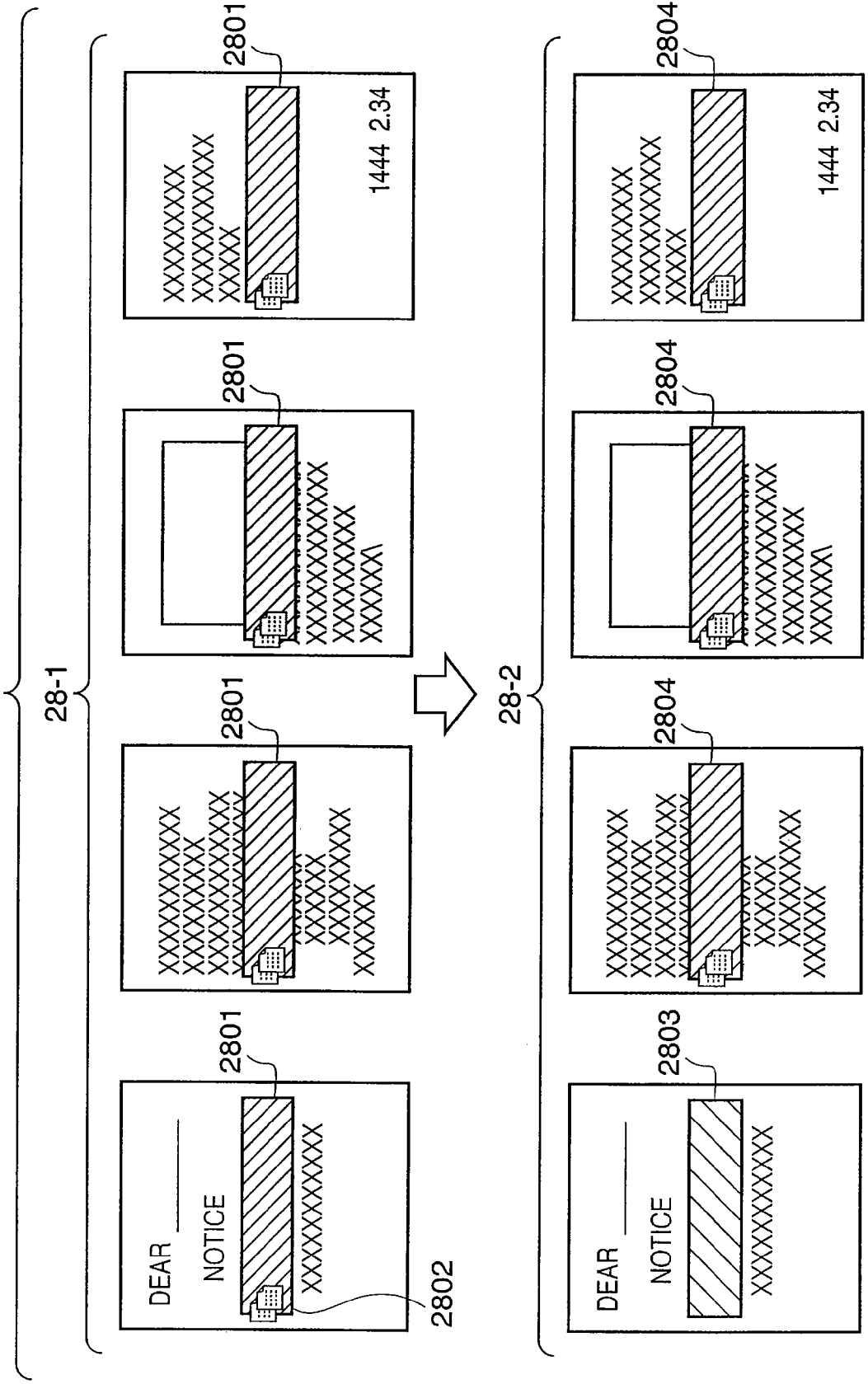
FIG. 28 is a view showing the operation of processing to change a common variable field into a normal variable field.

FIG. 28 is a view showing processing to change a common variable field into an unshared variable field (called a normal variable field). A document 28-1 represents a shared state by sharing a variable field. Common variable fields 2801 have the same common ID. A document 28-2 represents a state after changing a common variable field 2802 to a normal variable field. Only a common variable field designated to change to a normal variable field changes to a normal variable field 2803, and other common variable fields 2804 remain unchanged. Thereafter, processing (e.g., change of a property value) on the normal variable field 2803 is reflected in only the variable field 2803. An operation on an arbitrary one of the common variable fields 2804 applies to all the common variable fields 2804. More specifically, upon receiving an edit instruction not to set a variable area as a common area, the bookbinding application 104 changes variable area information of a document page to be edited, so as to set the variable area of this page as an independent variable area not associated with the remaining variable areas.

FIG. 29 is a flowchart showing processing to change a common variable field into a normal variable field. The bookbinding application 104 sets OFF the common flag of a common variable field to be changed into a normal field (S2901). Then, sharing is canceled to change the common variable field into a normal variable field. By this processing, the bookbinding application 104 can independently change the property values of some common variable fields. The processing in FIG. 27 and that in FIG. 29 are executed in accordance with a user's operation to designate each of them.

[Copy & Paste of Common Variable Field]

Figure 30:
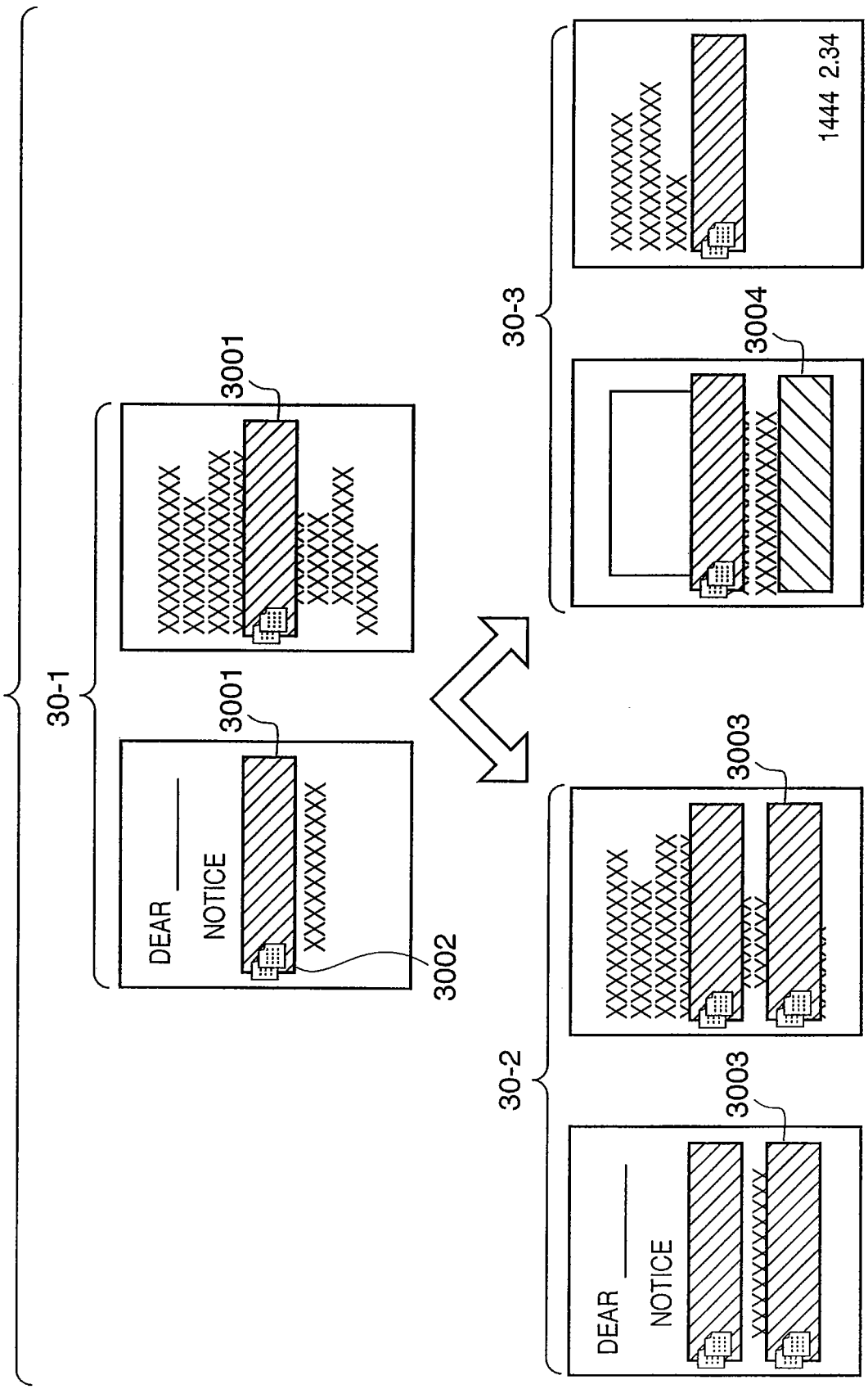
FIG. 30 is a view showing a state in which a common variable field is copied (document 30-1) and pasted (documents 30-2 and 30-3)

FIG. 30 is a view showing a state in which a common variable field 3001 of a document 30-1 is copied and pasted. The paste mode includes a mode (represented by a document 30-2) in which a common variable field is pasted as a common variable field to all pages, and a mode (represented by a document 30-3) in which a common variable field is pasted as a normal variable field to a designated page. A variable field 3003 is pasted as a common variable field. A variable field 3004 is pasted as a normal variable field. The user can select either mode. The bookbinding application copies common variable field information in accordance with a user instruction. As the copy method, common variable field information is copied as common variable field information to all pages, or as unshared variable field information to a designated page.

Figure 31:
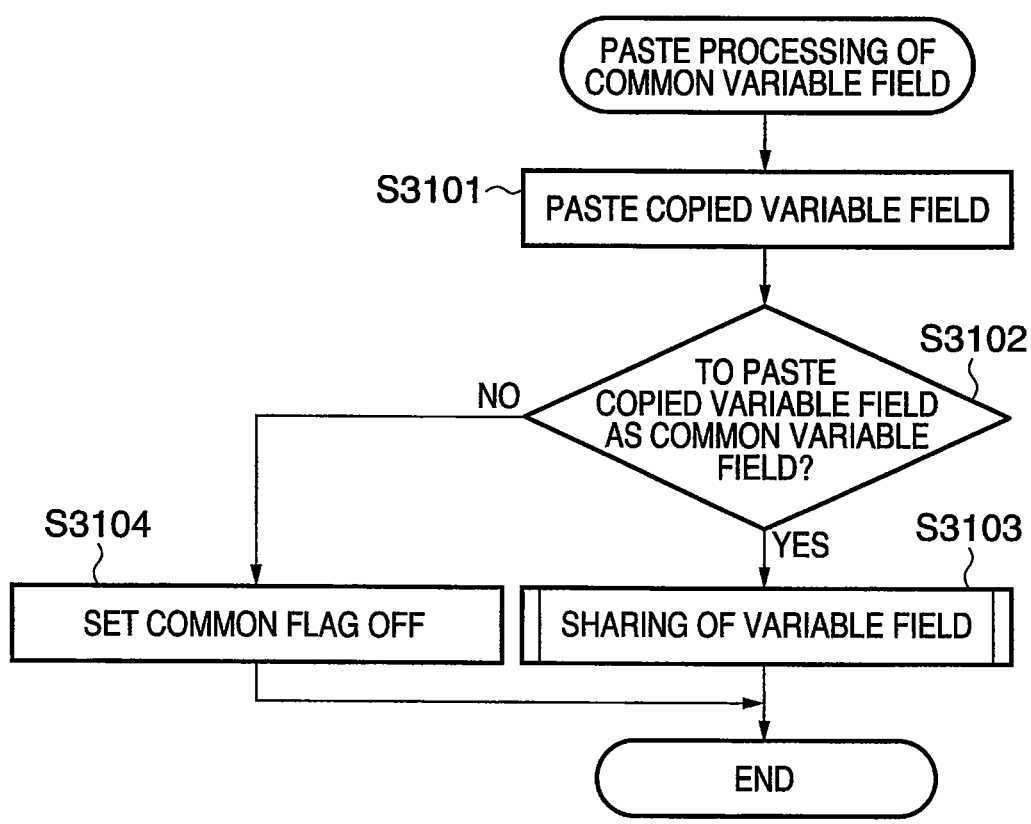
FIG. 31 is a flowchart showing paste processing when copying and pasting a common variable field.

FIG. 31 is a flowchart showing paste processing when copying and pasting a common variable field. In FIG. 31, it is premised that a copied common variable field has already been stored in a temporary storage area.

The bookbinding application 104 pastes the copied variable field to a page designated similarly to normal paste processing (S3101). The bookbinding application 104 performs a paste operation in accordance with the contents of paste processing selected by the user. If the user selects the mode in which the variable field is pasted as a common variable field, the bookbinding application 104 executes variable field sharing processing (see FIG. 23), and executes paste processing to a selected page (S3103). If the user selects the mode in which the variable field is pasted as a normal variable field, the bookbinding application 104 sets OFF the common flag of the pasted variable field, and executes paste processing to a selected page (S3104).

The paste operation may be set when the user copies, or selected by inquiring the paste operation of the user in paste.

[Addition of Common Variable Field by Adding Document Page]

Figure 32:
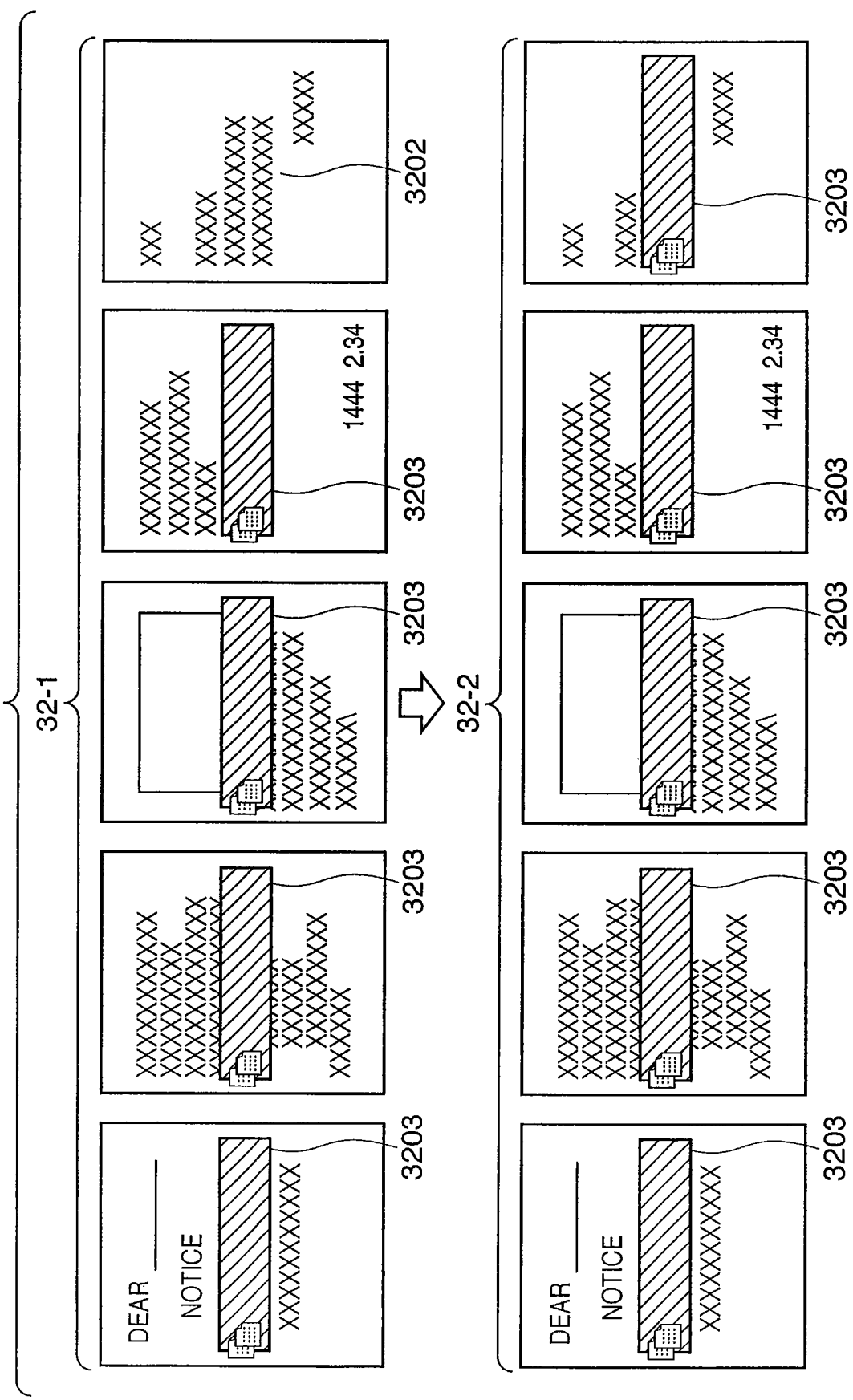
FIG. 32 is a view showing an operation to add a common variable field to an added document page upon adding the document page.

FIG. 32 is a view showing an operation to add a common variable field to an added document page upon adding the document page. A document 32-1 in FIG. 32 represents a state in which a new page 3202 is added while a common variable field 3201 is added. When the new page 3202 is added, the bookbinding application 104 also sets the same variable field as the common variable field 3201 in the page 3202. As a result, common variable fields 3203 are laid out in all pages, as represented by a document 32-2. The user may select not to add the common variable field 3203.

Addition of a common variable field when adding a document page may be set by the user before adding a document page, or selected by inquiring the setting of the user when adding a document page. In this way, a new document page is added and inserted into document data. When the document data before addition contains common variable area information upon newly adding the document page, the bookbinding application 104 adds a common variable field to the added document page.

Figure 33:
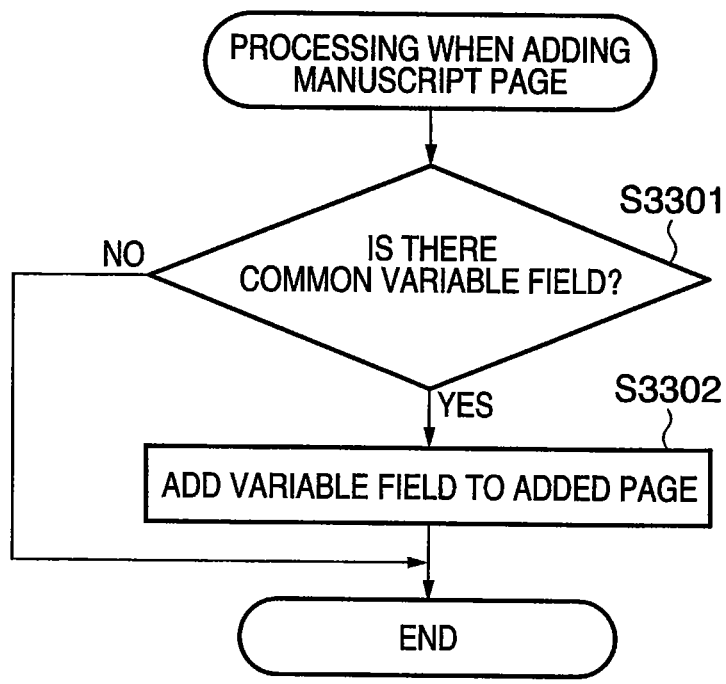
FIG. 33 is a flowchart of processing to add a common variable field to an added document page upon adding the document page.

FIG. 33 is a flowchart of processing to add a common variable field to an added document page upon adding the document page.

When a document page is added, the bookbinding application 104 determines whether any document page of the destination document file contains a common variable field (S3301). This determination is achieved by checking the common flag of a variable field in each page. If the bookbinding application 104 determines that a common variable field exists, it acquires the common value of a property from common ID information of the common variable field. Then, the bookbinding application 104 adds a variable field having the property value to the added document page (S3302).

The processing in FIG. 33 lays out the same common variable field as the existing one even upon newly adding a document page. This eliminates troublesome work to layout a variable field every time a new document page is added, improving user friendliness.

[Automatic Relayout of Common Variable Field Located Outside Page]

Figure 34:
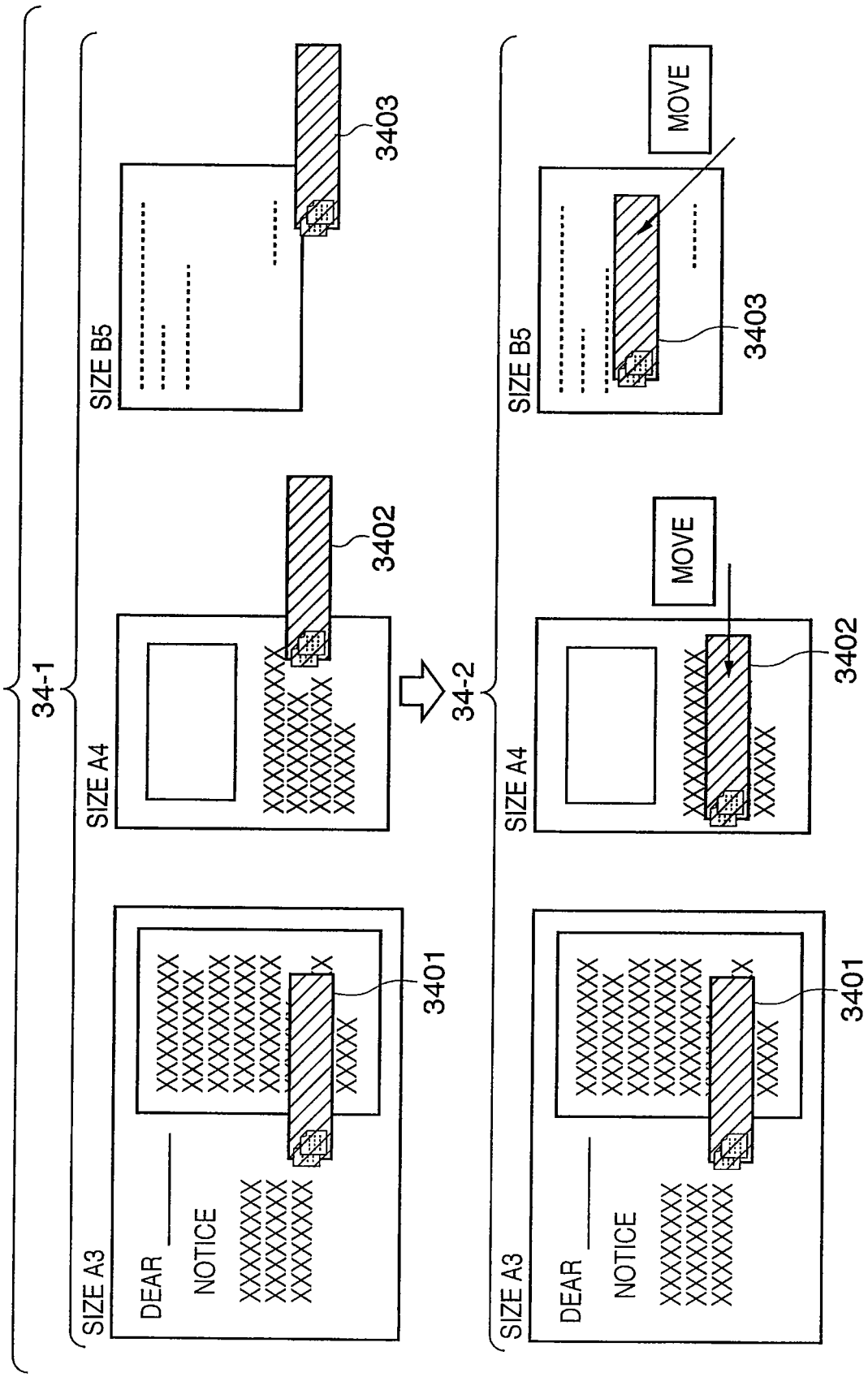
FIG. 34 is a view showing an operation to lay out again, within a document page, a common variable field located outside the document page.

A common variable field may be located outside a document page immediately after sharing a variable field and changing its property value. At this time, the common variable field outside the document page is laid out again within the document page. FIG. 34 shows an example of this processing. The size of a document page is saved in an electronic document file and can be obtained by referring to the electronic document file.

When a normal variable field 3401 is shared, common variable fields 3402 and 3403 having common properties are created in all pages, generating a document 34-1 in FIG. 34. In the case of using the upper left corner of a document page as the reference of the variable field position, part or all of the variable field may protrude from the document page if the variable field is located at the same position as that of the normal variable field 3401 on a document page of a different size (variable fields 3402 and 3403). When the bookbinding application 104 determines that the common variable field protrudes from the document page, it moves the common variable field to make the entire variable field fall within the document page (this results in a document 34-2). A variable field protruding in the X (lateral) direction is moved in only the X direction. A variable field protruding in the Y (longitudinal) direction is moved in only the Y direction. For example, since the variable field 3402 protrudes in only the X direction, it is moved in only the X direction. Since the variable field 3403 protrudes in the X and Y directions, it is moved in the X and Y directions. When a variable field has a size which causes protrusion even upon movement (when a field with a width or height larger than that of a document page is laid out), the bookbinding application 104 reduces the field size to fit the variable field in the document page. The bookbinding application 104 moves the variable field to locate its center at the center of the document page. However, the variable field may be moved to the end of the document page or an arbitrary position.

That is, when pieces of variable area information associated with each other contain variable area information which defines a variable area located outside the document page, the bookbinding application 104 changes position information of the variable area to a position where the variable area falls within the document page. If the variable field does not fall within the document page even upon change of the variable area position information, the bookbinding application 104 changes size information representing the width and height of the variable area to a size which makes the variable area fall within the document page.

Since the position of the moved common variable field changes, layout information as one of field properties cannot be shared. Thus, a common variable field whose property has changed undergoes one of an operation to change the common variable field to a normal variable field, an operation to cancel sharing of the changed property (e.g., position information), and an operation to move only the position without canceling sharing. The user can select one of these operations to be executed.

Figures 1, 35:
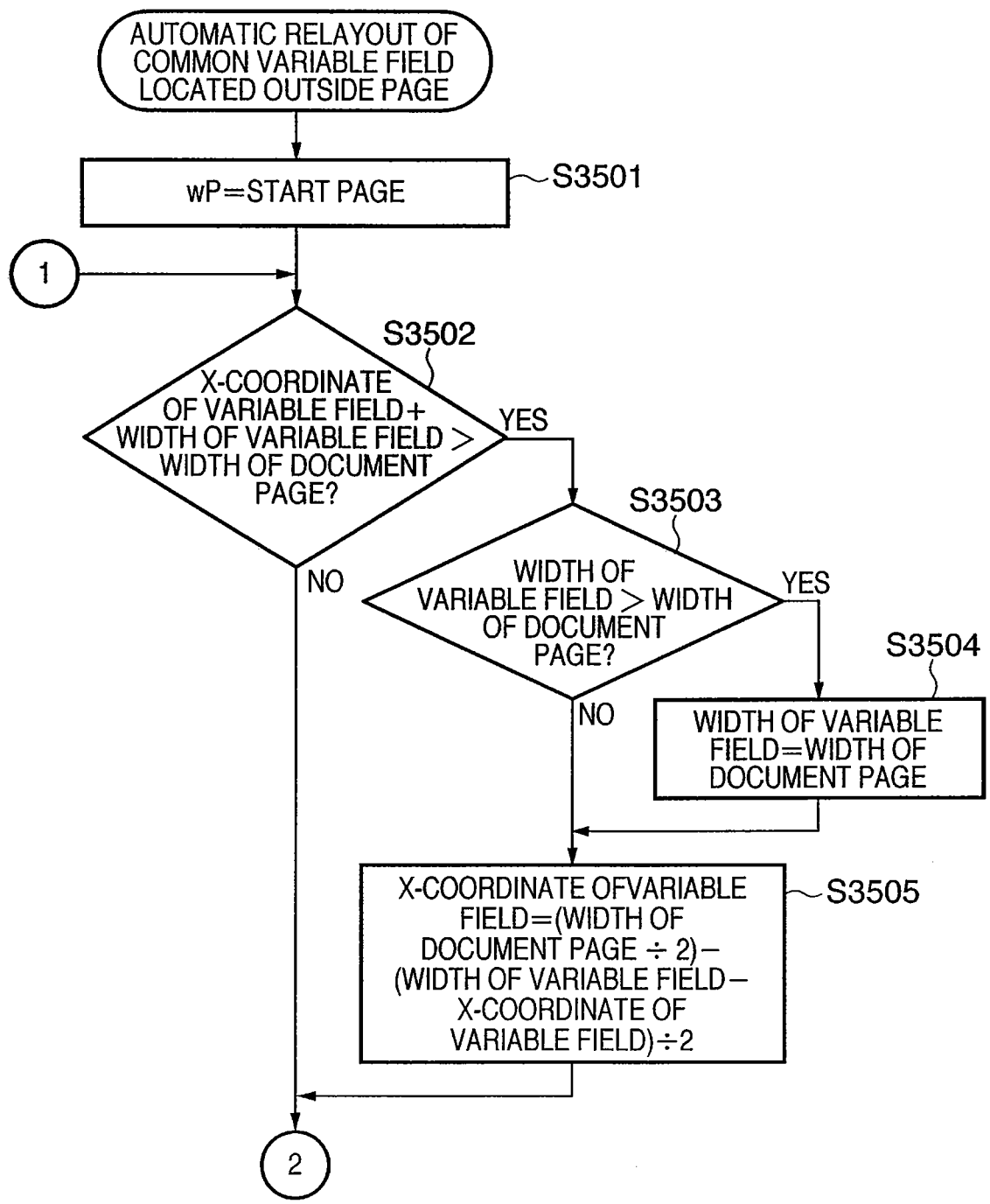
Figures 2, 35:
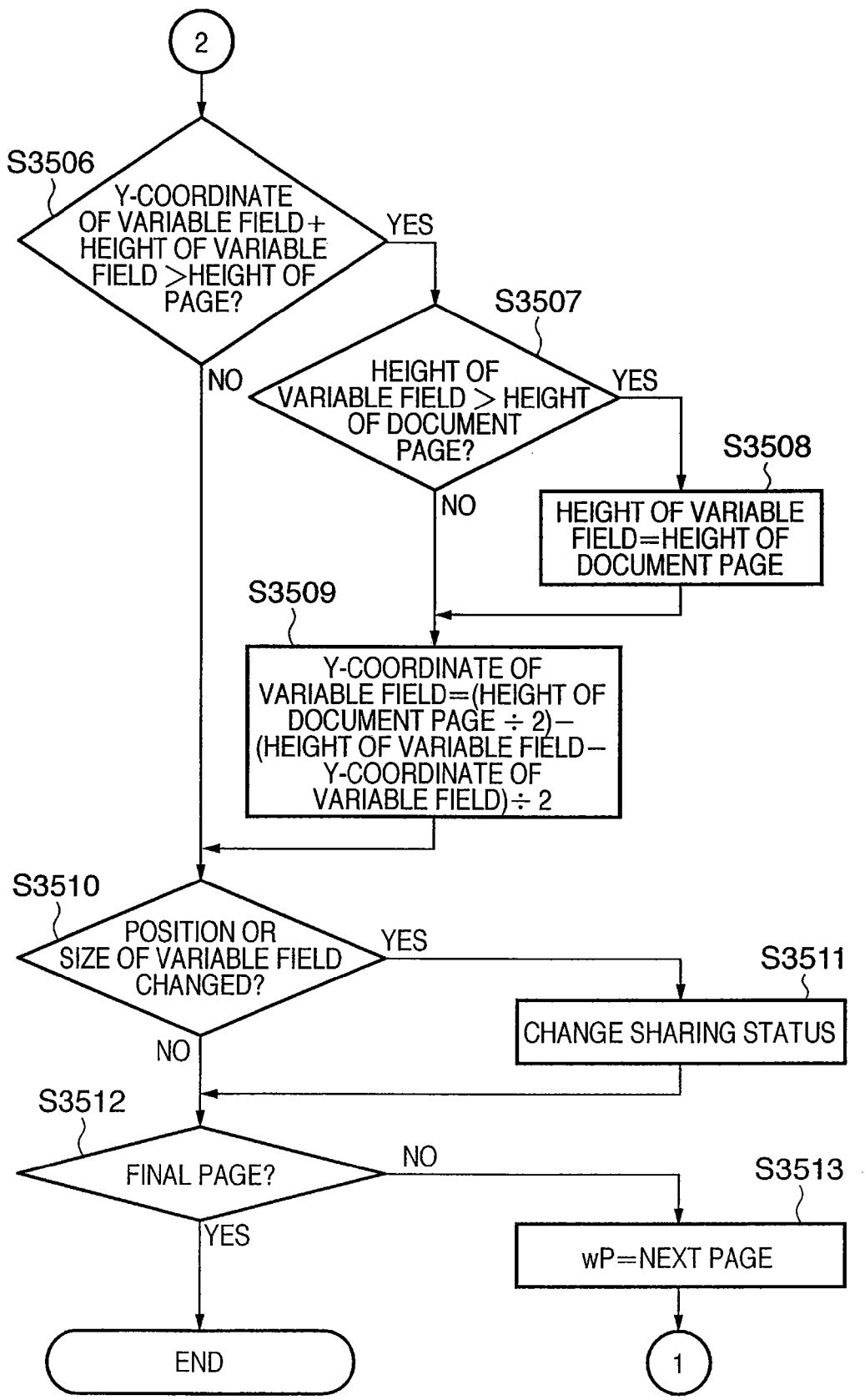

FIGS. 35-1 and 35-2 are flowcharts showing processing to automatically lay out again a common variable field located outside a document page.

The bookbinding application 104 stores the page number of the start page in the variable wP in order to check variable fields from the start page (S3501). The bookbinding application 104 determines whether the variable field protrudes from the document page (S3502). The determination in S3502 is achieved by checking whether the sum of the X-coordinate and width of the variable field is larger than the width (coordinate value of the right end) of the document page in the case of using the left end as the reference of the X-axis. For example, when the horizontal position of the variable field is managed using the left end of the variable field as a reference, the position of the right end of the variable field can be specified by adding the width value of the variable field to the coordinate value of the variable field. If the specified position exceeds the right end of the document page, the bookbinding application 104 determines YES in S3502. If the bookbinding application 104 determines that the variable field protrudes from the document page in the horizontal direction (YES in S3502), it determines whether the width of the variable field is larger than that of the document page (S3503). By the determination in S3503, the bookbinding application 104 can determine whether the variable field fits in the width of the document page. If the width of the variable field is larger (YES in S3503), the bookbinding application 104 changes the width of the variable field to that of the document page (S3504). That is, the bookbinding application 104 changes the width value, which is one property value of the target variable field, to the width value of the document page. Then, the bookbinding application 104 decides the X-coordinate of the variable field so as to locate the center of the variable field at the center of the document page (S3505).

The processes in steps S3506 to S3509 are identical to those in steps S3502 to S3505 except that they target the Y direction, and a description thereof will be omitted.

If the position or size of a variable field has changed (S3510), the bookbinding application 104 changes common ID information of the variable field (S3511). In this case, one of the operation to change the variable field to a normal variable field, the operation to cancel sharing of position information, and the operation to move only the position without canceling sharing is performed in accordance with user designation. If the variable field is to change to a normal variable field, the bookbinding application 104 executes the processing in FIG. 29. If sharing of position information is to be canceled, the bookbinding application 104 sets OFF the position flag of common ID information of the variable field (if the size has changed, also sets the size flag OFF). If sharing is not canceled, the bookbinding application 104 does not do anything. The bookbinding application 104 repeats the above-described processing until it determines that the current page is the final one (S3512 and S3513). In this specification, the X-coordinate is a coordinate in the horizontal direction, and the X direction indicates the horizontal direction. In contrast, the Y-coordinate is a coordinate in the vertical direction, and the Y direction indicates the vertical direction.

[Automatic Layout of Variable Field in Accordance with Contents of Document Page]

FIG. 36 is a view showing an operation to automatically lay out a common variable field in accordance with the contents of a document page. The contents of a document page are analyzed to identify an area where an image is laid out in the document page and an area where a text is laid out. To identify areas, text objects are grouped by a predetermined rule on the basis of the internal data structure of the document page. The group is recognized as one area, and the range of the area is saved. Images are similarly grouped by a predetermined rule, and the range of their area is saved. The predetermined rule is, e.g., texts having the same X-coordinate, or texts laid out at predetermined intervals. As another method, the contents of a document page may be converted into one image to identify text and image areas by OCR. However, any method is applicable as long as it can identify text and image areas.

A page 36-1 represents the state of a document page having an image area 3601, text area 3602, and common variable field 3603 in the document page. A page 36-2 results from selecting the common variable field 3603 from the state of the page 36-1 and moving the common variable field so as to overlay it on the image. This state represents the result of laying out the center of the common variable field at the center of an image area capable of overlaying the common variable field among all image areas in the document page. In this state, the variable field moves to a position 3604.

A page 36-3 results from moving the common variable field so as to overlay it on the text. The page 36-3 represents a state in which the variable field moves to a position 3605 as a result of laying out the center of the common variable field at the center of a text area capable of overlaying the common variable field among all text areas in the document page. That is, the bookbinding application 104 analyzes data of a document page, and classifies areas by object types. The bookbinding application 104 sets variable area position information so as to lay out a common variable area in the entire document page or an area of a designated object type. The object types include a text and image.

FIG. 37 is a view showing a user interface to automatically lay out a common variable field in accordance with the contents of a document page. When the user selects "move common variable field to overlay it on image" 3701 after selecting a common variable field, the bookbinding application 104 moves the common variable field so as to overlay it on an image. Also, when the user selects "move common variable field to overlay it on text" 3702, the bookbinding application 104 moves the common variable field so as to overlay it on a text.

Figures 1, 38:
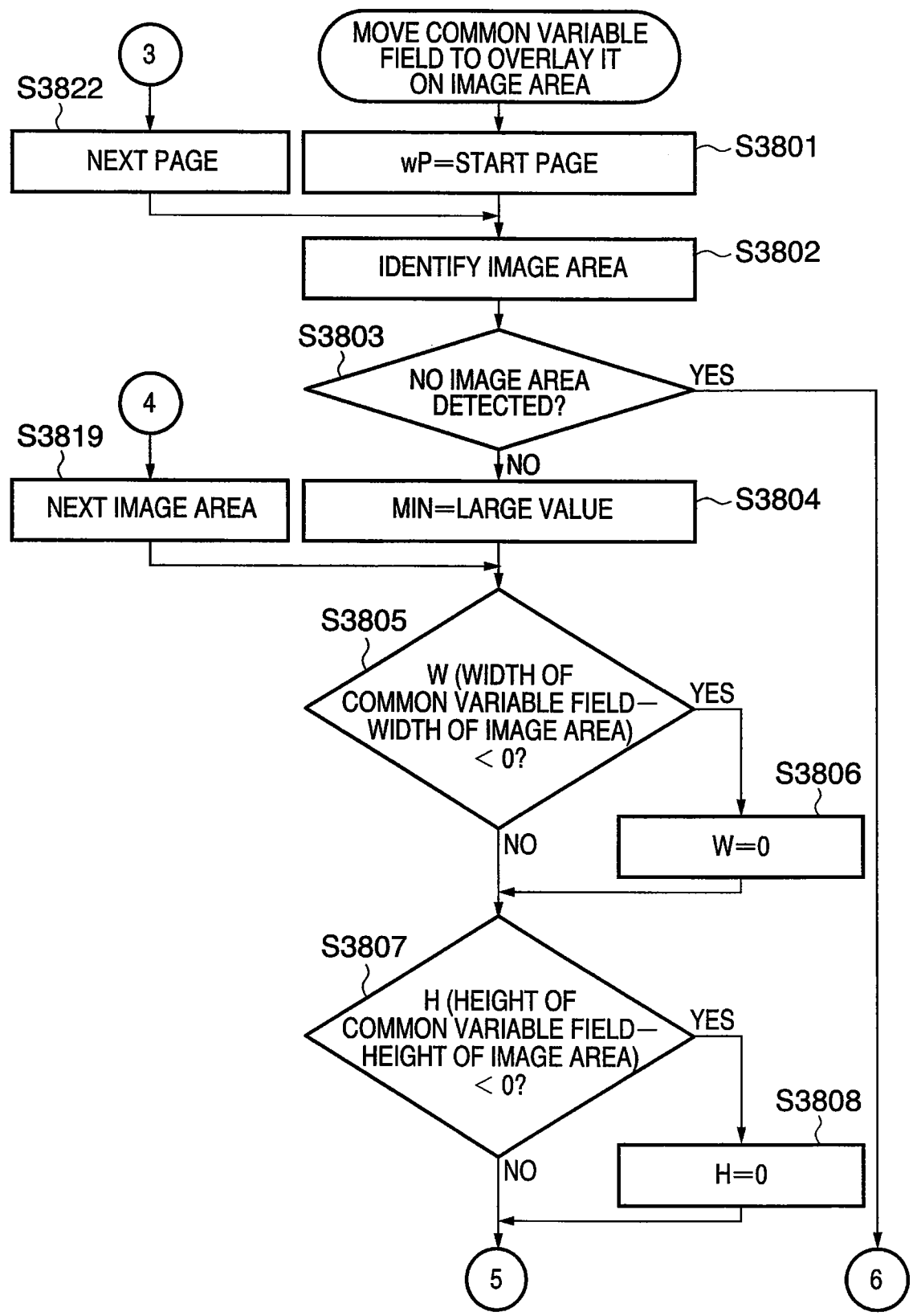
Figures 2, 38:
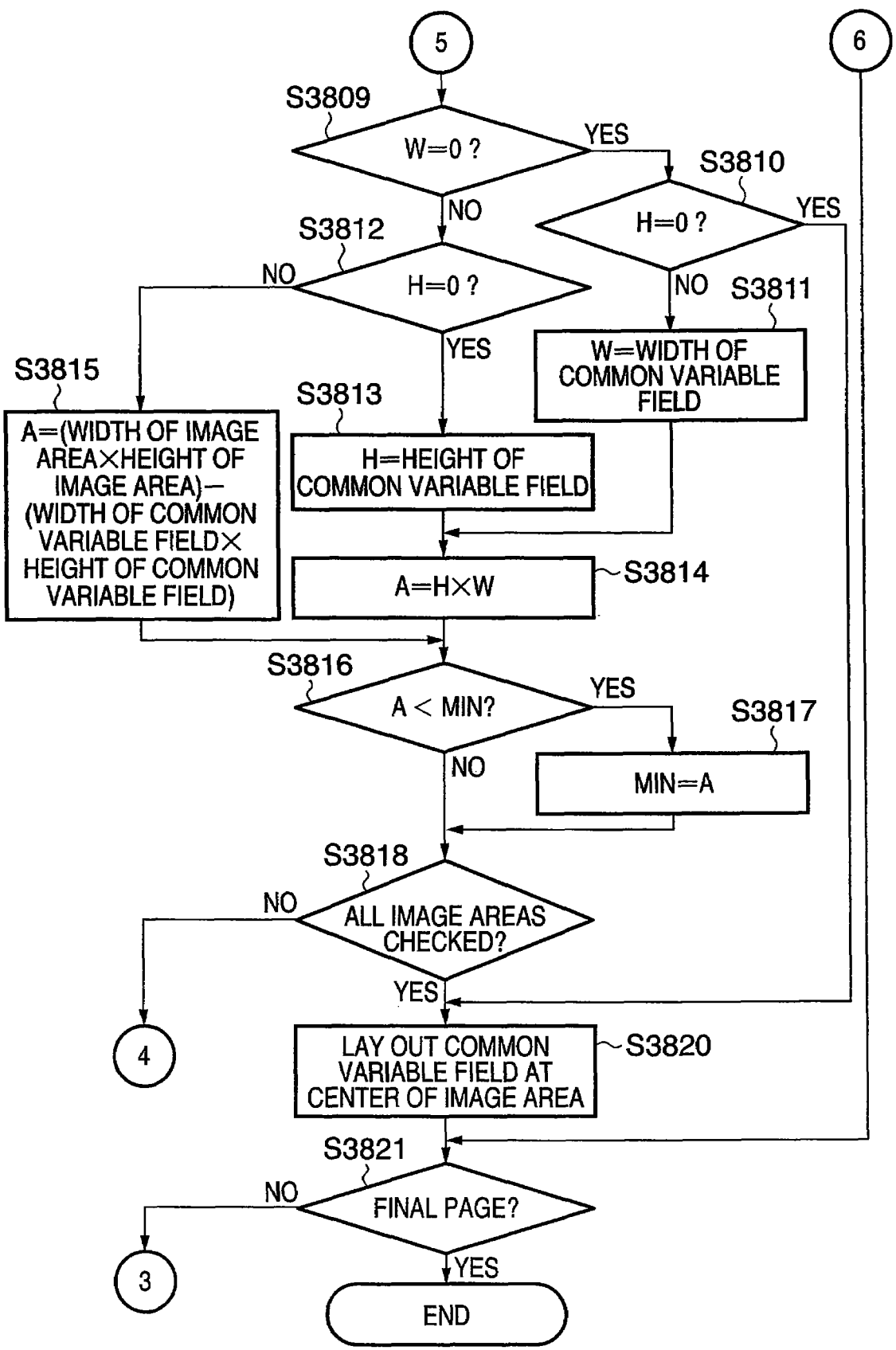

FIGS. 38-1 and 38-2 are flowcharts of processing to move a common variable field so as to overlay it on an image. First, the bookbinding application 104 stores the start page in the variable wP, and checks objects of the start page (S3801). Then, the bookbinding application 104 analyzes the document page wP to identify an image area (S3802). If the document page wP does not contain any image area, the bookbinding application 104 determines whether the document page wP is the final page (S3821). If the document page wP is not the final page, the bookbinding application 104 stores the next page in wP (S3822). If the document page wP contains an image area, the bookbinding application 104 performs subsequent processing for one target image area. The bookbinding application 104 substitutes a predetermined value as an initial value for MIN (S3804). The predetermined value is a figure which does not take a minimum value in subsequent processing. MIN holds the area of the common variable field by which the selected common variable field protrudes from the image area upon overlaying. Hence, the predetermined value does not take a minimum value when the area of the target document page size is set as the initial value.

The bookbinding application 104 calculates the difference value (to be referred to as W hereinafter) of the width of the target image area from the width of the common variable field. If W becomes equal to or smaller than 0,, W holds 0, (S3806). Similarly, the bookbinding application 104 calculates the difference value (to be referred to as H hereinafter) of the height of the target image area from the height of the common variable field. If H becomes equal to or smaller than 0,, H holds 0, (S3808).

If W=0, and H=0, (YES in S3809 and YES in S3810), the bookbinding application 104 can lay out the common variable field within the target image area. Thus, the bookbinding application 104 changes the position of the common variable field so as to lay out its center at the center of the target image area (S3820). If the document page wP is not the final page, the bookbinding application 104 processes the next page (S3822). More specifically, the bookbinding application 104 calculates the center of the target image area using the coordinates and size of the target image area. The bookbinding application decides the position of the common variable field so that the calculated center point coincides with the center point of the common variable field.

If W=0, and H≠0, (YES in S3809 and NO in S3810), the bookbinding application 104 stores the width of the common variable field in the variable W (S3811). If W≠0, and H=0, (NO in S3809 and YES in S3810), the bookbinding application 104 stores the height of the common variable field in the variable H (S3813). The bookbinding application 104 calculates an area by which the common variable field protrudes from the target image area (S3814). More specifically, the bookbinding application 104 stores H×W as the protrusion area in the variable A. If neither W nor H is 0, (NO in S3809 and NO in S3810), the bookbinding application 104 stores, in the variable A, the difference value of the area (width×height) of the common variable field from the area (width×height) of the target image area.

The bookbinding application 104 compares the variable A with MIN, and if A is smaller, substitutes the value A for MIN (S3817). At this time, the bookbinding application 104 also saves identification information of the image area of interest. The bookbinding application 104 performs the processes in steps S3805 to S3817 for all image areas, and changes the position so as to lay out the center of the common variable field at the center of the largest image area among areas capable of overlaying the common variable field (S3820). In other words, the bookbinding application 104 lays out the common variable field at the center of an image area capable of overlaying the common variable field so as to minimize the protrusion amount of the common variable field. The largest image area among areas capable of overlaying the common variable field can be specified by the identification information saved in S3817. The bookbinding application 104 repeats this processing for all pages.

Processing to move a common variable field so as to overlay it on a text is also the same as the above one, and a description thereof will be omitted.

[Layout of Common Variable Field in Conformity with Document Page]

FIG. 39 is a view showing a state in which a common variable field is laid out in accordance with the document page size.

The field size changes depending on variable data of a common variable field 3901. The common variable field 3901 is laid out by increasing the field size until variable data reaches the width or height of a document page (the font size is increased for a text, and the image size is increased for an image). A document 39-2 is obtained by laying out a common variable field in conformity with the document page. A document 3902 is created by overlying variable data of the first record, and a document 3903 is created by overlaying variable data of the second record. The maximum font size at which the common variable field fits in the width or height of the document page is selected and displayed for each record. The image is similarly enlarged to the maximum size at which the common variable field fits in the width or height of the document page.

Figure 40:
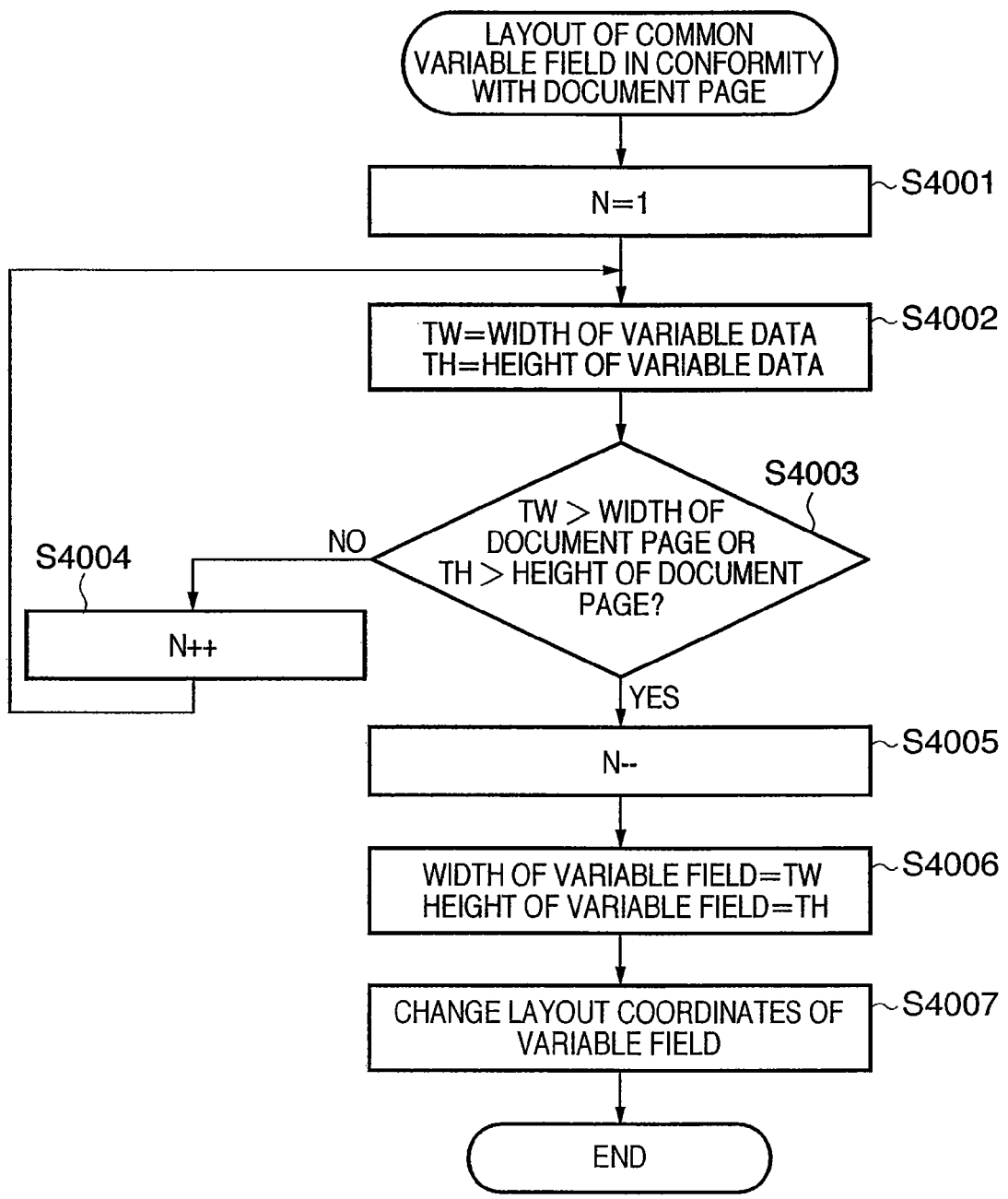
FIG. 40 is a flowchart showing processing to lay out a common variable field (text variable field) in accordance with the document page size.

FIG. 40 is a flowchart showing processing to lay out a common variable field (text variable field) in accordance with the document page size.

The bookbinding application 104 stores 1, in the font size value N (S4001). The bookbinding application 104 stores, in the variable TW, a width obtained when variable data of the currently displayed record has the font size N, and stores, in the variable TH, a height (S4002). If TW or TH does not reach the width or height of the document page, the bookbinding application 104 increments the font size by one (S4004). If TW or TH becomes larger than the width or height of the document page, the bookbinding application 104 decrements the font size by one (S4005), and sets TW or TH at that time as the width or height of the common variable field (S4006). The bookbinding application 104 resets the X-coordinate value to 0, when the common variable field is adjusted to the width of the document page, and the Y-coordinate value to 0, when it is adjusted to the height (S4007). When the common variable field is an image variable field, the bookbinding application 104 adjusts the image to the document page by enlarging or reducing the image to the document page size.

This processing is executed when the user designates processing "lay out common variable field in conformity with the document page".

[Overlaying of Common Variable Field on Only Specific Document Contents]

FIG. 41 is a view showing a state in which a common variable field (text variable field) is overlaid on only specific document contents (image).

Common variable fields are laid out in the image areas of all pages at a size which makes each common variable field fall within a corresponding area. Hence, no common variable field is laid out in a document page 4103 having no image area.

Figure 42:
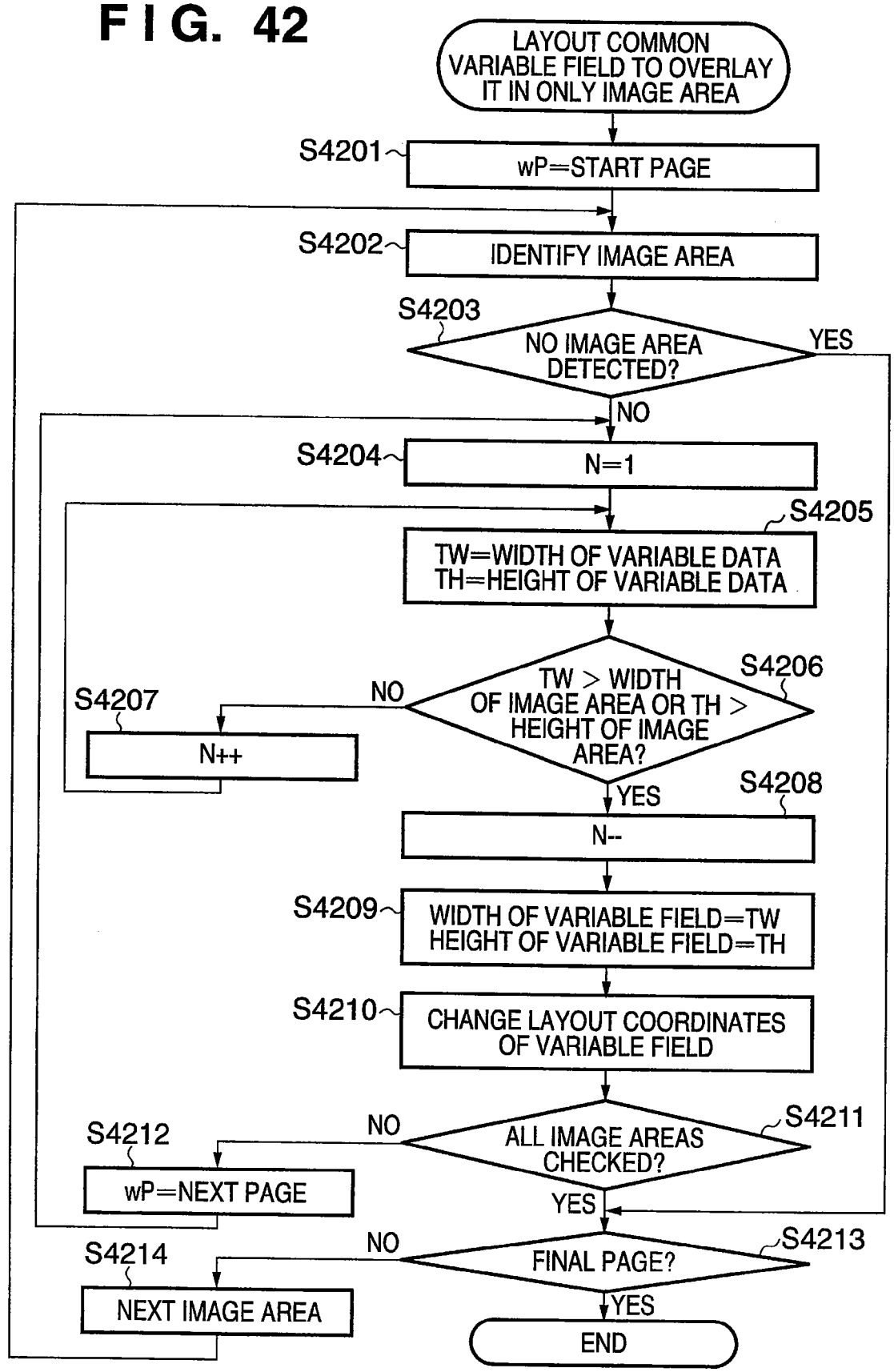
FIG. 42 is a flowchart showing processing to overlay a common variable field (text variable field) on only specific document contents (image)

FIG. 42 is a flowchart showing processing to overlay a common variable field (text variable field) on only specific document contents (image). The bookbinding application 104 stores the start page in the variable wP, and checks objects of the start page (S4201). Then, the bookbinding application 104 analyzes the document page wP to identify an image area (S4202). If the document page wP does not contain any image area, the bookbinding application 104 determines whether the document page wP is the final page (S4213). If the document page wP is not the final page, the bookbinding application 104 stores the next page in wP (S4214). If the document page wP contains an image area, the bookbinding application 104 performs subsequent processing for one target image area.

The bookbinding application 104 stores 1 in the font size value N (S4204). The bookbinding application 104 stores, in TW, a width obtained when variable data of the currently displayed record has the font size N, and stores, in TH, a height (S4205). If TW or TH does not reach the width or height of the image area, the bookbinding application 104 increments the font size by one (S4207). If TW or TH becomes larger than the width or height of the image area, the bookbinding application 104 decrements the font size by one (S4208), and sets TW or TH at that time as the width or height of the common variable field (S4209). The bookbinding application 104 resets the X-coordinate value to 0, when the common variable field is adjusted to the width of the document page, and the Y-coordinate value to 0, when the common variable field is adjusted to the height (S4210). The bookbinding application 104 executes the processes in steps S4204 to S4210 for all image areas in the document page. Further, the bookbinding application 104 performs the above processing for all document pages.

Processing to overlay a common variable field in a text area is also the same as the above one, and a description thereof will be omitted. An image variable field is adjusted to image and text areas by enlarging or reducing the image to the document page size.

This processing is executed when the user designates processing "overlay common variable field on only specific document contents".

FIG. 43 is a flowchart of procedures to read out data of each document page from the electronic document file 103 by the electronic document despooler 105 and transmit the readout data to the printer driver 106. First, the electronic document despooler 105 reads out document data (electronic document file 103) (S4301), and creates print setting information on the basis of properties information (book and chapter properties) (S4302). The print setting information is settings saved in the electronic document file 103, and is created in, e.g., a standardized format called a job ticket. Then, the electronic document despooler 105 reads out data of a document page in the layout order (S4303), and edits the document page in accordance with the print setting information (S4304). The electronic document despooler 105 transmits the edited document page as output data to the printer driver (S4305). In step S4304, if the variable field is defined with a page property, the electronic document despooler 105 fetches a record from the database in accordance with the properties of the variable field, and overlays the fetched record on the page at the position and size of the variable field. In overlaying, image data itself may be composited, or an image to be overlaid and a page and position where the image is to be overlaid may be associated with each other and transmitted as 1-page data to the printer driver. In the latter case, the printer driver or printer executes composition. A variable record may be fetched from the database not for each page but for each copy. In this case, a record to be inserted into the common variable field is a record common throughout one copy. For example, if the name or the like of a person who is to receive a document is defined in the record, the name of the recipient can be printed on the front page of the document of one copy.

Finally, the electronic document despooler 105 determines whether all document pages contained in document data to be output have been output (S4306). If not all document pages have been output, the electronic document despooler 105 repeats the processing from step S4303 for the next document page.

The printer driver 106 converts the received output data into a format interpretable by the printer, and transmits the converted data to the printer. The printer prints out the document data.

In the above-described manner, the document processing system according to the embodiment can set and save, for each page, a variable field (variable area) as an area to be inserted into or overlaid on a document page. The properties of the variable field can be shared throughout document data. When a variable field is designated as a common variable field and the properties of the variable field defined for one page change, the changed properties of the variable field apply to all pages to or on which the same common variable field is inserted or overlaid.

[Other Embodiments]

The common variable field is defined for each document in the above embodiment, but may be defined for a smaller unit, i.e., for each chapter. In this case, addition, change, and deletion of the common variable field are executed for each chapter.

When an object in the variable field protrudes from the page, the position of the variable field is moved so that the object falls within the page (as much as possible when the size is too large). However, not only the variable field, but also another field such as a watermark can also be moved.

The variable field is overlaid on a document page, but may be inserted into it.

In the above embodiment, the electronic document despooler 105 inserts data into the variable field, but the bookbinding application 104 or printer driver may insert the data.

In the above embodiment, an instruction to overlay a variable field in an object area of a designated type is input from the user interface of the variable field editor, and is not saved as properties information of the variable field. However, this instruction may be saved as properties information. In this case, even if the document page changes by reread or the like, the variable field can be laid out again in accordance with the change of the document page.

The present invention may be applied to a system including a plurality of devices (e.g., a host computer, interface device, reader, and printer) or an apparatus (e.g., a copying machine or facsimile machine) formed by a single device. The object of the present invention is also achieved by supplying a storage medium which stores program codes for implementing the functions of the above-described embodiments to a system or apparatus, and reading out and executing the program codes stored in the storage medium by the computer of the system or apparatus. In this case, the program codes read out from the storage medium implement the functions of the above-described embodiments, and the program codes and the storage medium which stores the program codes constitute the present invention.

Also, the present invention includes a case in which an OS (Operating System) or the like running on the computer performs some or all of actual processes on the basis of the instructions of the program codes and thereby implements the functions of the above-described embodiments. Furthermore, the present invention is applied to a case in which the program codes read out from the storage medium are written in the memory of a function expansion card inserted into the computer or the memory of a function expansion unit connected to the computer. In this case, the CPU of the function expansion card or function expansion unit performs some or all of actual processes on the basis of the instructions of the written program codes, and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-135998, filed on May 16, 2006, which is hereby incorporated by reference herein in its entirety.

What is claimed is:

1. An information processing apparatus which performs variable printing processing by inserting contents data into a variable area, comprising:
a CPU coupled to a memory,
wherein the CPU functions as:
a first arranging unit configured to arrange the variable area on a first page of a plurality of pages of document data;
a setting unit configured to set common attribute for the variable area arranged on the first page;
a second arranging unit configured to arrange the variable area to which the common attribute is set on each page other than the first page after the common attribute is set to the variable area by said setting unit;
a selecting unit configured to select a second page different from the first page from the plurality of pages after the variable area to which the common attribute is set is arranged on each page other than the first page;
a canceling unit configured to cancel the common attribute of the variable area arranged on the second page selected by said selecting unit; and
a deleting unit configured to delete the variable areas of the pages other than the second page in accordance with cancellation of the common attribute of the variable area arranged on the second page,
wherein the variable area in which the contents data is inserted and which is arranged on the second page is left arranged.

2. The apparatus according to claim 1, wherein positions of variable areas on the pages other than the second page are changed in accordance with a position of the variable area on the second page.

3. The apparatus according to claim 2, wherein when variable areas on the pages other than the second page are arranged outside the pages in accordance with a change of the position of the variable area on the second page, the variable areas on the pages other than the second page are moved so that the variable areas are arranged inside the pages.

4. The apparatus according to claim 1, wherein sizes of variable areas on the pages other than the second page are changed in accordance with a change of a size of the variable area on the second page.

5. The apparatus according to claim 1, further comprising a document editing unit configured to add and insert a new page to document data, wherein when a variable area having the common attribute is arranged in document data before addition of a new page upon the new page being added to the document data by said document editing unit, the variable area having the common attribute is added to the newly added page.

6. An information processing method of performing variable printing processing by inserting contents data into a variable, comprising:
a first arranging step of arranging the variable area on a first page of a plurality of pages of document data;
a setting step of setting common attribute for the variable area arranged on the first page;
a second arranging step of arranging the variable area to which the common attribute is set on each page other than the first page after the common attribute is set to the variable area in the setting step;
a selecting step of selecting a second page different from the first page from the plurality of pages; pages after the variable area to which the common attribute is set is arranged on each page other than the first page;
a canceling step of canceling the common attribute of the variable area arranged on the second page selected in the selecting step; and
a deleting step of deleting the variable areas of the pages other than the second page in accordance with cancellation of the common attribute of the variable area arranged on the second page,
wherein the variable area in which the contents data is inserted and which is arranged on the second page is left arranged.

7. A non-transitory computer-readable recording medium which records a program to cause a computer to execute an information processing method of performing variable printing processing by inserting contents data into a variable, the method comprising:
a first arranging step of arranging the variable area on a first page of a plurality of pages of document data;
a setting step of setting common attribute for the variable area arranged on the first page;
a second arranging step of arranging the variable area to which the common attribute is set on each page other than the first page after the common attribute is set to the variable area in the setting step;
a selecting step of selecting a second page different from the first page from the plurality of pages; pages after the variable area to which the common attribute is set is arranged on each page other than the first page;
a canceling step of canceling the common attribute of the variable area arranged on the second page selected in the selecting step; and
a step of deleting the variable areas of the pages other than the second page in accordance with cancellation of the common attribute of the variable area arranged on the second page,
wherein the variable area in which the contents data is inserted and which is arranged on the second page is left arranged.

* * * * *